(12) United States Patent
Abouelseoud et al.

(10) Patent No.: US 11,297,481 B2
(45) Date of Patent: *Apr. 5, 2022

(54) MULTI-BAND MILLIMETER WAVE DISCOVERY IN WLAN DISTRIBUTION NETWORKS

(71) Applicant: SONY CORPORATION, Tokyo (JP)

(72) Inventors: Mohamed Abouelseoud, San Francisco, CA (US); Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,326

(22) Filed: Jun. 25, 2020

(65) Prior Publication Data
US 2020/0396583 A1  Dec. 17, 2020

Related U.S. Application Data

(63) Continuation of application No. 15/968,329, filed on May 1, 2018, now Pat. No. 10,728,733.
(Continued)

(51) Int. Cl.
*H04W 8/00* (2009.01)
*H04B 7/08* (2006.01)
(Continued)

(52) U.S. Cl.
CPC .......... *H04W 8/005* (2013.01); *H04B 7/0695* (2013.01); *H04B 7/088* (2013.01);
(Continued)

(58) Field of Classification Search
CPC ..... H04W 16/28; H04W 16/10; H04W 16/30; H04W 84/18; H04W 48/12; H04W 48/14;
(Continued)

(56) References Cited

U.S. PATENT DOCUMENTS

2010/0214169 A1  8/2010  Kafle
2015/0189545 A1  7/2015  Morita
(Continued)

FOREIGN PATENT DOCUMENTS

CN    102215061 A    10/2011
CN    102318392 A    1/2012
(Continued)

OTHER PUBLICATIONS

Park, Hyunhee et al., "Multi-band Directional Neighbor Discovery in Self-Organized mmWave ad-hoc Networks", IEEE Transactions on Vehicular Technology, vol. 64, Issue 3, Mar. 2015, published Jun. 5, 2014, pp. 1143-1155.
(Continued)

*Primary Examiner* — Phong La
(74) *Attorney, Agent, or Firm* — O'Banion & Ritchey LLP; John P. O'Banion

(57) ABSTRACT

A wireless communication apparatus/system/method utilizing directional transmission over a mmW band performing transmission of signals on a sub-6 GHz band that aids scanning for mmW mesh network discovery. A new node sends an assistance request on the sub-6 GHz band. The network node responds to the assistance request by sending an assistance response on the sub-6 GHz band. Upon exchanging the discovery assistance request and response with the network node on the sub-6 GHz band, the new node switches to the mmW band to discover neighbor(s). The network node upon exchanging the discovery assistance request and response on the sub-6 GHz band switches to mmW band to discover new nodes. Implementations can provide assistance directly or in response to cooperation between network stations.

20 Claims, 49 Drawing Sheets

Related U.S. Application Data

(60) Provisional application No. 62/636,982, filed on Mar. 1, 2018, provisional application No. 62/616,817, filed on Jan. 12, 2018.

(51) Int. Cl.
| | | |
|---|---|---|
| *H04B 7/06* | (2006.01) | |
| *H04W 16/28* | (2009.01) | |
| *H04W 48/12* | (2009.01) | |
| *H04W 72/04* | (2009.01) | |
| *H04W 88/10* | (2009.01) | |
| *H04W 84/18* | (2009.01) | |
| *H04W 88/06* | (2009.01) | |
| *H04W 8/24* | (2009.01) | |
| *H04W 48/14* | (2009.01) | |

(52) U.S. Cl.
CPC ........... *H04W 16/28* (2013.01); *H04W 48/12* (2013.01); *H04W 72/0453* (2013.01); *H04W 8/24* (2013.01); *H04W 48/14* (2013.01); *H04W 84/18* (2013.01); *H04W 88/06* (2013.01); *H04W 88/10* (2013.01)

(58) Field of Classification Search
CPC . H04W 48/10; H04W 48/08; H04W 72/0453; H04W 72/046; H04W 8/005; H04W 8/02; H04W 8/24; H04W 8/245; H04W 8/22; H04B 7/0695; H04B 7/0686; H04B 7/088; H04B 7/0868
See application file for complete search history.

(56) References Cited

U.S. PATENT DOCUMENTS

| | | | |
|---|---|---|---|
| 2015/0201368 A1 | 7/2015 | Cudak | |
| 2015/0289147 A1* | 10/2015 | Lou | H04B 7/0452 |
| | | | 370/329 |
| 2015/0319700 A1 | 11/2015 | Oteri | |
| 2015/0351135 A1* | 12/2015 | Schmidt | H04W 76/10 |
| | | | 455/450 |
| 2015/0373572 A1 | 12/2015 | Sahin | |
| 2015/0382171 A1* | 12/2015 | Roy | H04W 48/16 |
| | | | 370/329 |
| 2016/0044711 A1 | 2/2016 | Lou | |
| 2016/0191132 A1 | 6/2016 | Rajagopal | |
| 2016/0380685 A1 | 12/2016 | Kasher | |
| 2017/0086211 A1* | 3/2017 | Sahin | H04W 48/16 |
| 2017/0223587 A1 | 8/2017 | Trainin | |
| 2017/0346525 A1 | 11/2017 | Stirling-Gallacher | |
| 2018/0098366 A1 | 4/2018 | Cohn | |
| 2018/0123660 A1 | 5/2018 | Jung | |
| 2018/0206139 A1 | 7/2018 | Wang | |
| 2019/0007822 A1* | 1/2019 | Wee | H04B 7/0695 |

FOREIGN PATENT DOCUMENTS

| | | | | |
|---|---|---|---|---|
| CN | 105052235 A | | 11/2015 | |
| CN | 105981310 A | | 9/2016 | |
| EP | 3046378 | | 7/2016 | |
| JP | 2014520445 A | | 8/2014 | |
| JP | 2017188836 A | | 10/2017 | |
| WO | 2016086144 | | 6/2016 | |
| WO | 2016210302 | | 12/2016 | |
| WO | 2017063496 | | 4/2017 | |
| WO | WO2017/063496 | * | 4/2017 | ............ H04W 48/04 |

OTHER PUBLICATIONS

Deng, Junquan et al., Resource Allocation and Interference Management for Opportunistic Relaying in Integrated mmWave/sub-6GHz 5G Networks, IEEE Communications Magazine, vol. 55, Issue 6, Jun. 12, 2017, pp. 94-101.

ISA/EP, European Patent Office (EPO), International Search Report and Written Opinion dated Apr. 5, 2019, related PCT international application No. PCT/IB2018/060465, pp. 1-17, claims searched, pp. 18-23.

China Patent Office, Official Action dated Oct. 11, 2021, related Chinese patent application No. 201880081476.9, pp. 1-10, English-language translation, pp. 11-20, claims, pp. 21-26.

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

**FIG. 4
(Prior Art)**

| Frame control | Duration | RA | TA | SSW | SSW Feedback | FCS |
|---|---|---|---|---|---|---|

Octets:　　2　　　　2　　　6　　6　　3　　　3　　　　4

**FIG. 7
(Prior Art)**

| B0 | B1　　　B9 | B10　　　B15 | B16　B17 | B18　B23 |
|---|---|---|---|---|
| Direction | CDOWN | Sector ID | DMG Antenna ID | RXSS Length |

Bits:　　1　　　　9　　　　　6　　　　　2　　　　6

**FIG. 8
(Prior Art)**

| B0　　　　B8 | B9　　B10 | B11　　B15 | B16 | B17　　B23 |
|---|---|---|---|---|
| Total sectors in ISS | Number of RX DMG antennas | Reserved | Poll Required | Reserved |

Bits:　　　9　　　　　2　　　　　5　　　　1　　　　7

**FIG. 9A
(Prior Art)**

| B0　　　　B5 | B6　　B7 | B8　　　B15 | B16 | B17　　B23 |
|---|---|---|---|---|
| Sector select | DMG Antenna select | SNR report | Poll Required | Reserved |

Bits:　　　6　　　　　2　　　　　8　　　　1　　　　7

**FIG. 9B
(Prior Art)**

FIG. 32 (590): Element ID | Length | Request/response DN discovery assistant | Total number of TX training sectors | Total number of RX training sectors | Number of training cycles | DMG antenna Reciprocity | Connection Capability | Operating class | Band ID | Channel Number | BSSID | Other mmW discovery/channel access/scheduling information (optional)

FIG. 33 (600): Category | Public Action | Total number of TX training sectors | Total number of RX training sectors | Number of training cycles | DMG antenna Reciprocity | Connection Capability | Operating class | Band ID | Channel Number | BSSID | Other mmW discovery/channel access/scheduling information (optional)

FIG. 34 (610): Category | Public Action | Total number of TX training sectors | Total number of RX training sectors | Number of training cycles | DMG antenna Reciprocity | Connection Capability | Operating class | Band ID | Channel Number | BSSID | Other mmW discovery/channel access/scheduling information (optional)

| Element ID | Length | STA Address | AID | DMG STA Capability Information | DMG AP or PCP Capability Information | DMG STA BeamTracking TimeLimit | Extended SC MCS Capabilities | Maximum Number of Basic A-MSDU Subframes In A-MSDU | Maximum Number of Short A-MSDU Subframes In A-MSDU |
|---|---|---|---|---|---|---|---|---|---|
| 1 | 1 | 6 | 1 | 8 | 2 | 2 | 1 | 1 | 1 |

Octets:

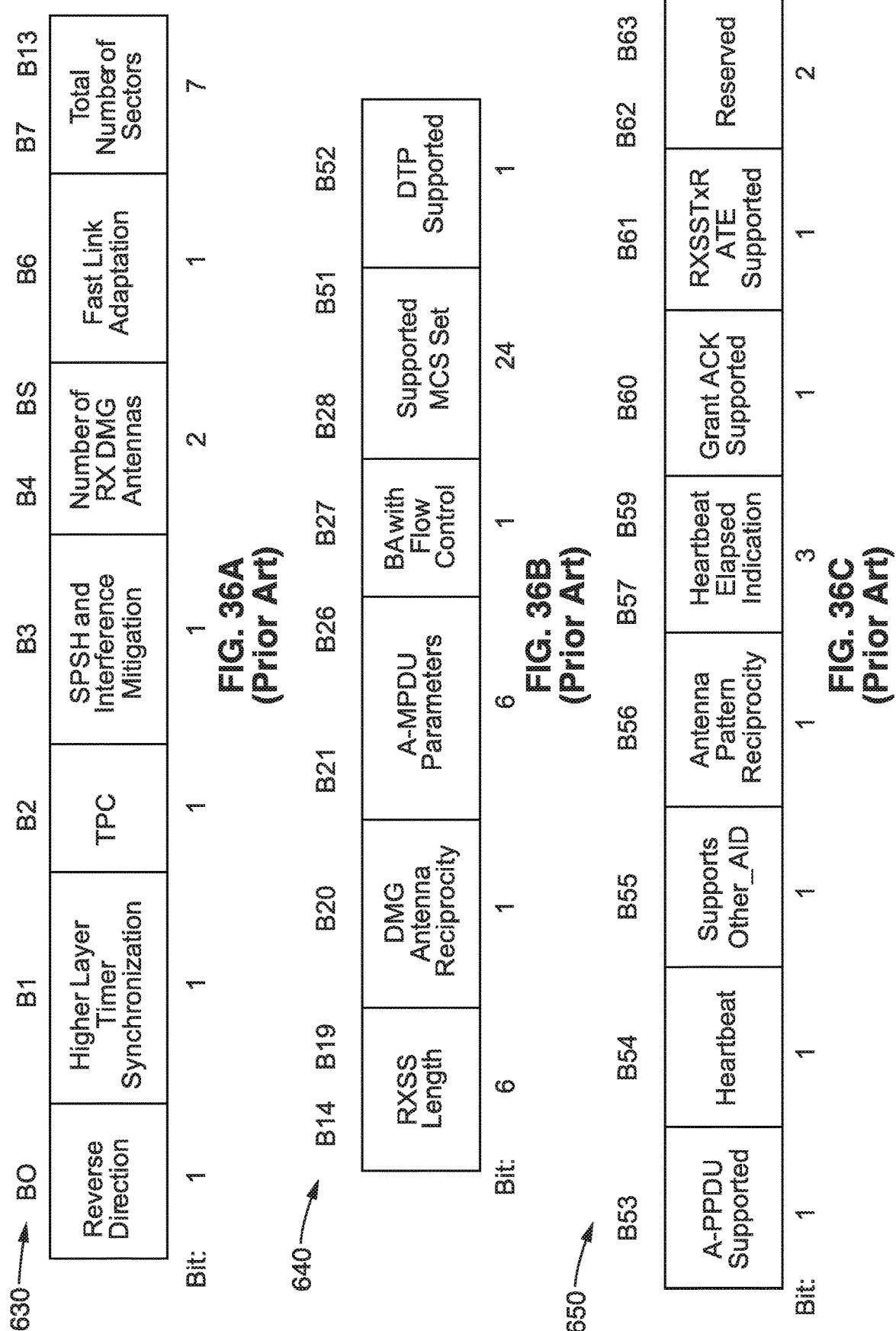

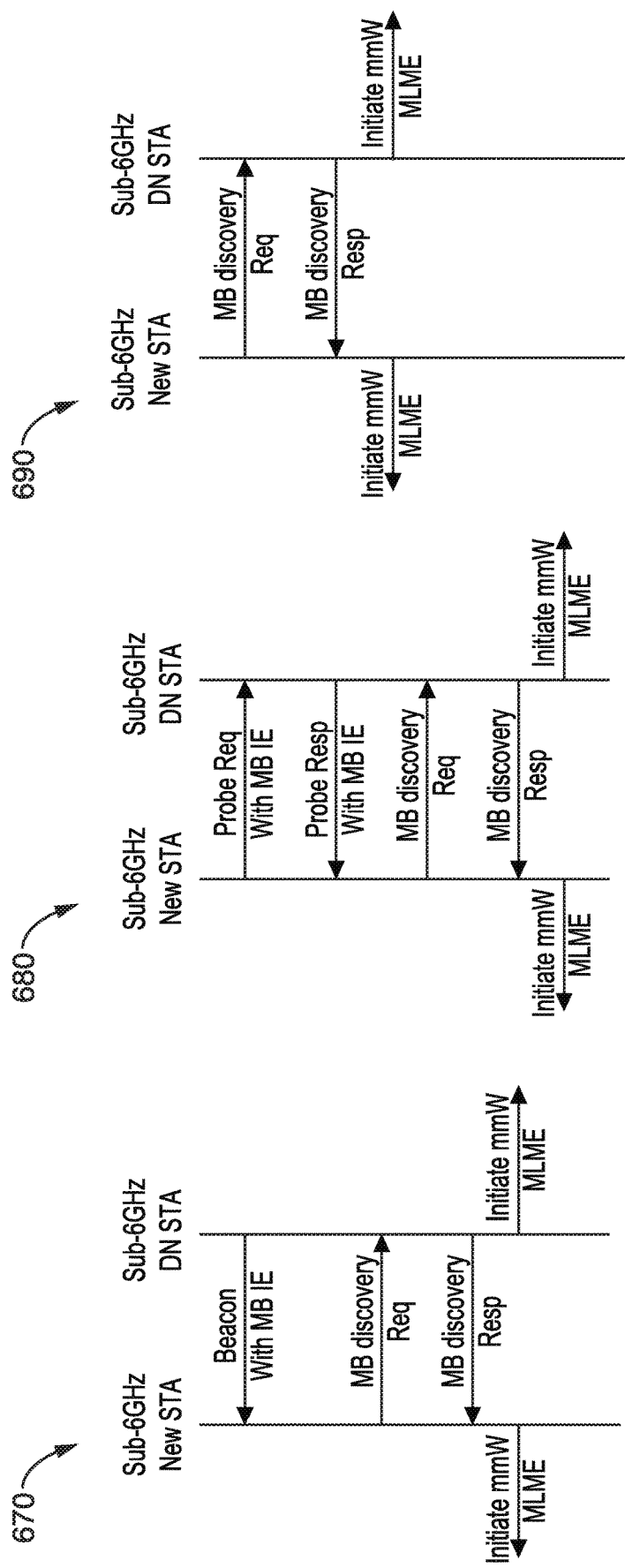

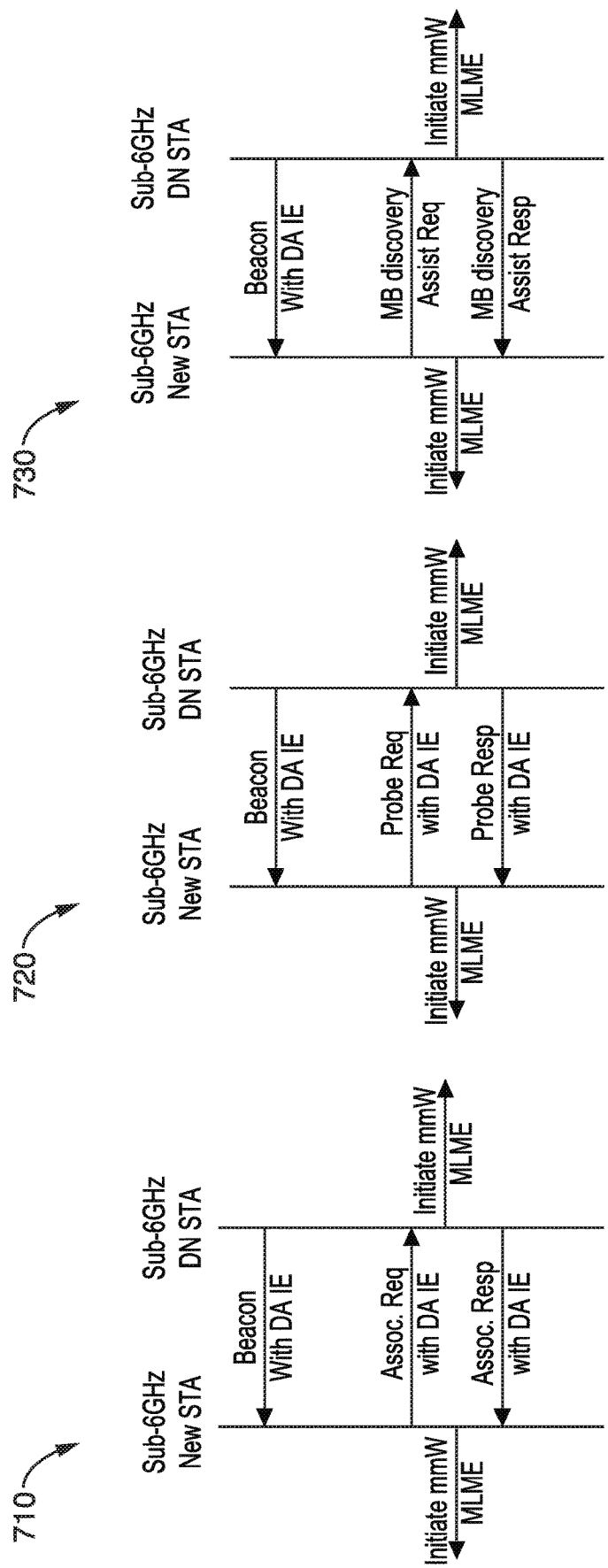

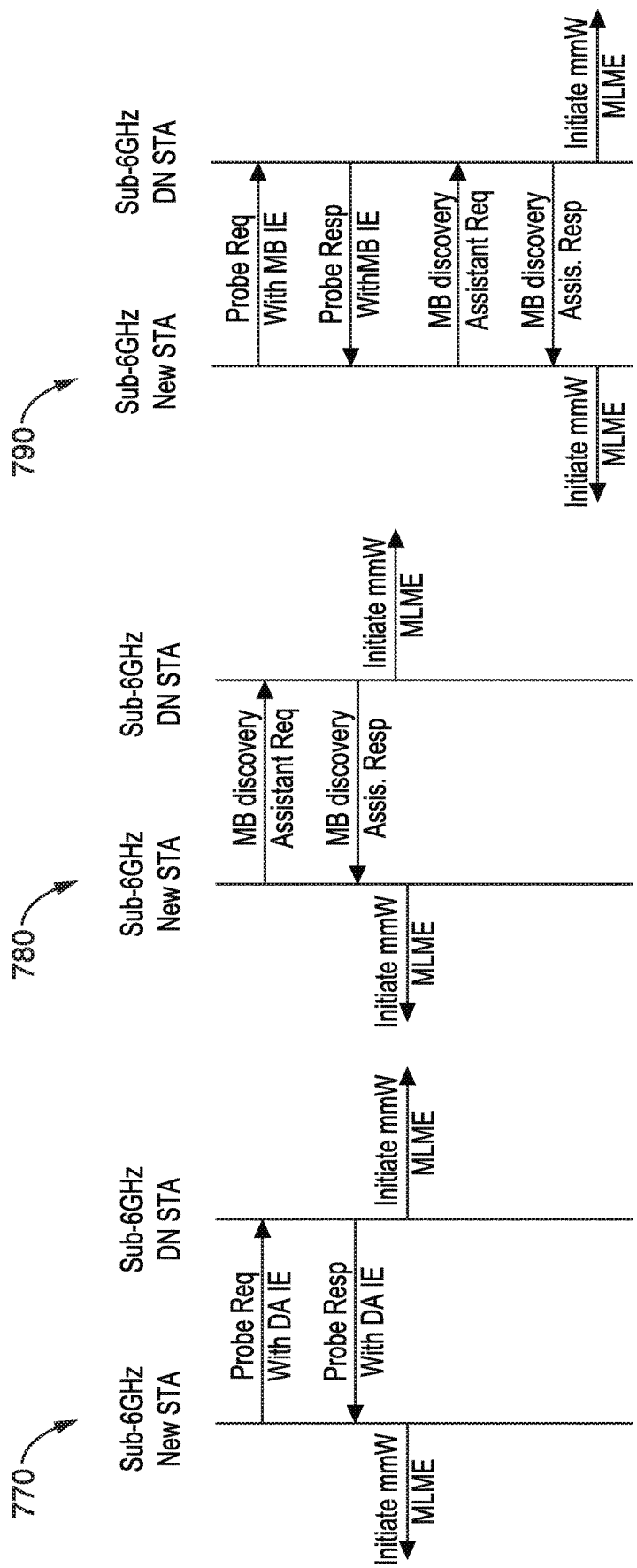

830 ⟶

| Category | FST Action | Tunneled MMPDU Length | Tunneled MMPDU Frame Control | Discovery assistant request frame | Multi-band element |

| Category | FST Action | Tunneled MMPDU Length | Tunneled MMPDU Frame Control | Discovery assistant response frame | Multi-band element |

| Element ID | Length | Multi-band Control | Band ID | Operating Class | Channel Number | BSSID | Beacon Interval |
| --- | --- | --- | --- | --- | --- | --- | --- |
| Octets: 1 | 1 | 1 | 1 | 1 | 1 | 6 | 2 |

| TSF Offset | Multi-band Connection Capability | FSTSessionTimeout | STA MAC Address (optional) | Pairwise Cipher Suite Count (optional) | Pairwise Cipher Suite List (optional) |
| --- | --- | --- | --- | --- | --- |
| Octets: 8 | 1 | 1 | 0 or 6 | 0 or 2 | 4 x m |

| B0   B2 | B3 | B4 | B5 | B6   B7 |
|---|---|---|---|---|
| STA Role | STA MAC Address Present | Pairwise Cipher Suite Present | Discovery Assistant Enabled | Reserved |

Bits:      3              1                    1                    1              2

| Element ID | Length | Discovery Assistant Request Control | STA MAC Address | Number of TX training Sectors | Number of RX training Sectors | Antenna Reciprocity |
|---|---|---|---|---|---|---|

Bits:    8         8              3                         48              7              6              1

| Band ID (Optional) | Operating Class (Optional) | Channel Number (Optional) | BSSID (Optional) | Scanning Mode (Optional) | Discovery Assistant Window Length Request (Optional) | Reserved |
|---|---|---|---|---|---|---|

Bits:    8              8              8              48              2              16              x

| BSSID Information Present | Scanning Mode Present | Discovery Assistant Window Length Request Present | Reserved |
|---|---|---|---|
| 1 | 1 | 1 | 5 |

Bits:

| Element ID | Length | Discovery Assistant Response Map | STA MAC Address | Number of TX training Sectors | Number of RX training Sectors | Antenna Reciprocity |
|---|---|---|---|---|---|---|
| 8 | 8 | 2 | 48 | 7 | 6 | 1 |

Bits:

| Band ID | Operating Class | Channel Number | BSSID | Scanning Mode | Discovery Assistant Window Length | Scan sweep time | Reserved |
|---|---|---|---|---|---|---|---|
| 8 | 8 | 8 | 48 | 2 | 16 | 16 | 4 |

Bits:

| Category | FST Action | Multi-band | DMG capability | Multi-band discovery assistant request |
|---|---|---|---|---|

| Category | FST Action | Multi-band | DMG capability | Multi-band discovery assistant response |
|---|---|---|---|---|

FIG. 50

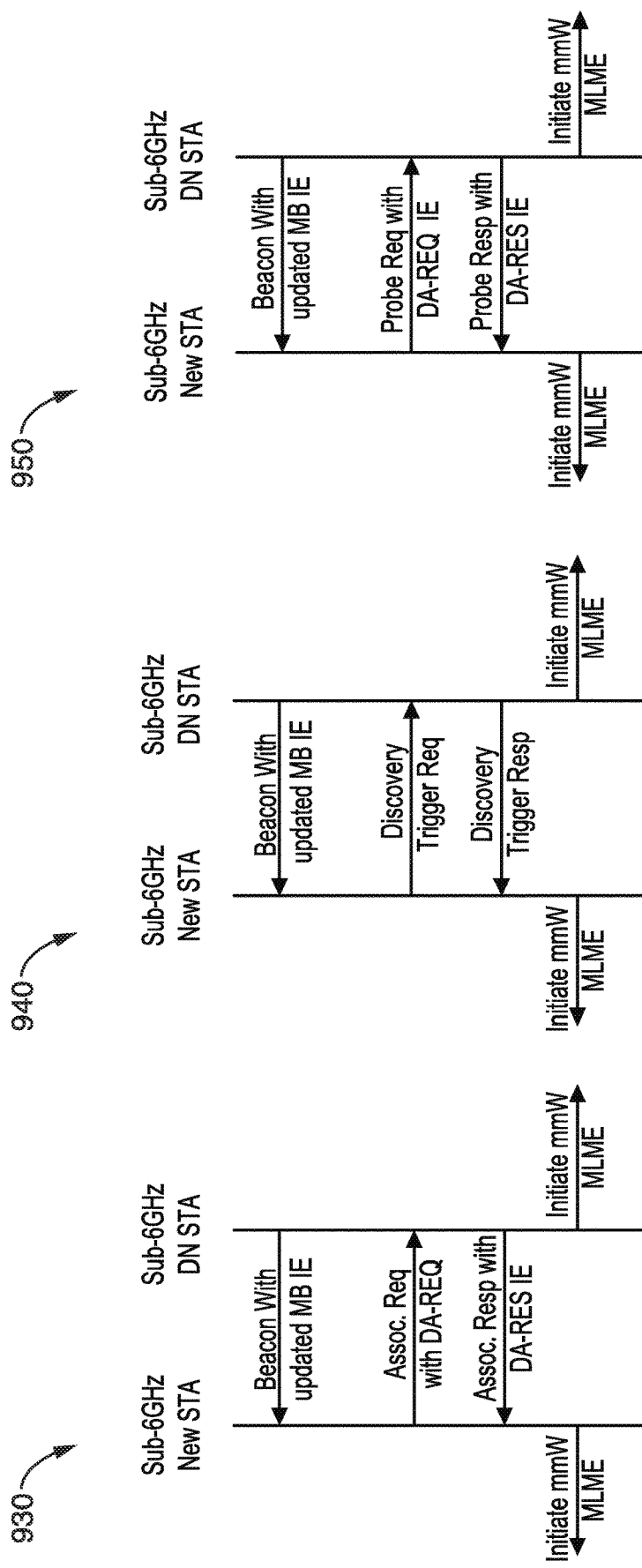

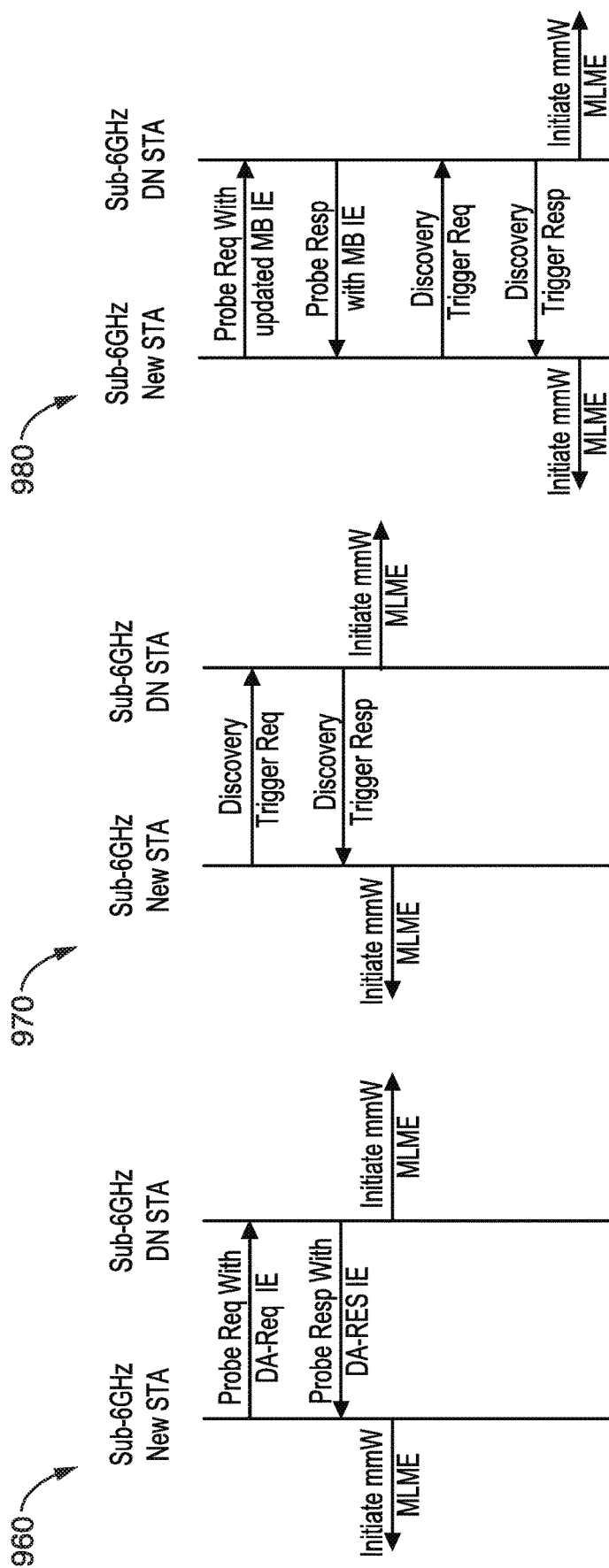

MULTI-BAND MILLIMETER WAVE DISCOVERY IN WLAN DISTRIBUTION NETWORKS

CROSS-REFERENCE TO RELATED APPLICATIONS

The application is a continuation of U.S. patent application Ser. No. 15/968,329 filed on May 1, 2018, incorporated herein by reference in its entirety, which claims priority to, and the benefit of, U.S. provisional patent application Ser. No. 62/616,817 filed on Jan. 12, 2018, incorporated herein by reference in its entirety. This application also claims priority to, and the benefit of, U.S. provisional patent application Ser. No. 62/636,982 filed on Mar. 1, 2018, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to utilizing multiple-bands for communicating network announcements and maintaining peer communications.

2. Background Discussion

Wireless networking, including mesh networks and mixtures of mesh and non-mesh networks, are becoming increasingly important, especially in the millimeter wavelength (mm-wave or mmW) regimes. In response to the need of higher capacity, network operators have begun to embrace concepts to achieve densification. Current sub-6 GHz wireless technology is not sufficient to cope with high data demands. One alternative is to utilize additional spectrum in the 30-300 GHz band, millimeter wave band (mmW).

Utilizing mmW wireless systems generally requires properly dealing with channel impairments and propagation characteristics of these high frequency bands. High free-space path loss, high penetration, reflection and diffraction losses reduce the available diversity and limit non-line-of-sight (NLOS) communications. The small wavelength of mmW enables the use of high-gain electronically steerable directional antennas of practical dimensions. This can provide enough array gain to overcome path loss and ensure high Signal-to-Noise Ratio (SNR) at the receiver. Directional distribution networks (DNs) in dense deployment environments using mmW bands are an efficient way for achieving reliable communications between stations (STAs) and overcoming line-of-sight channel restrictions.

When a new station (STA) is starting up it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A STA connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmWave communications due to directional transmissions. The challenges in this process can be summarized as: (a) knowledge of surrounding STAs IDs; (b) knowledge of best transmission pattern for beamforming; (c) channel access issues due to collisions and deafness; and (d) channel impairments due to blockage and reflections. Designing a neighborhood discovery method to overcome some or all of the above is of utmost importance to enable pervasiveness of mmWave D2D and DN technologies.

Most existing technologies for DN address discovery for networks operating in broadcast mode are not targeted to networks with directional wireless communications. In addition, those technologies which utilize directional wireless network communications often have very high overhead demands in regards to the generation of beacon signals.

Accordingly, a need exists for enhanced mechanisms for announcement and beaconing within a mmWave network. The present disclosure fulfills that need and provides additional benefits over previous technologies.

BRIEF SUMMARY

This wireless communication apparatus/system/method utilizes stations configured for performing directional transmission over a mmW band and also communicating on a sub-6 GHz band. In this embodiment the sub-6 GHz band aids the process of scanning for mmW mesh network discovery. A new node sends an assistance request on the sub-6 GHz band. The network node responds to the assistance request by sending an assistance response on the sub-6 GHz band. Upon exchanging the discovery assistance request and response with the network node on the sub-6 GHz band, the new node switches to the mmW band to discover neighbor(s). The network node upon exchanging the discovery assistance request and response on the sub-6 GHz band switches to mmW band to discover new nodes. The discovery assistance request and response may comprise a separate request and response frame, or be contained within an existing form of request and response form (e.g., probe, beacon, discovery trigger, multi-band discovery, association, on-channel tunnel, or other frames). In addition, any form of request and response frame can be configured to trigger communications of some form of discovery assistance. Embodiments are described in which network stations coordinate amongst one another to provide assistance to the new station.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 32 is a data field diagram depicting an option A of a sub-6 GHz to mmW assistance information element according to an embodiment of the present disclosure.

FIG. 33 is a data field diagram depicting an action frame for option A according to an embodiment of the present disclosure.

FIG. 34 is a data field diagram depicting an action frame option A according to an embodiment of the present disclosure, with its public action field referring to a different frame type than in FIG. 33.

FIG. 35 is a data field diagram of an option A DMG capability information element according to an embodiment of the present disclosure.

FIG. 36A through FIG. 36C are an option A DMG STA capability information fields according to an embodiment of the present disclosure.

FIG. 37A through FIG. 37C are a message passing diagram for an option A sub-6 GHz discovery for mmW bands using multi-band discovery assistance request and response frames according to an embodiment of the present disclosure.

FIG. 38A through FIG. 38C are message passing diagrams for option A in a first example of sub-6 GHz passive mmW discovery according to an embodiment of the present disclosure.

FIG. 40A through FIG. 40C are message passing diagrams for option A in an example of sub-6 GHz band active mmW discovery according to an embodiment of the present disclosure.

FIG. 42 is a data field diagram for an option A On-channel Tunnel request frame with discovery assistant request frame associated with it, as utilized according to an embodiment of the present disclosure.

FIG. 43 is a data field diagram for an option A On-channel Tunnel request frame with discovery assistant response frame associated with it, as utilized according to an embodiment of the present disclosure.

FIG. 44A and FIG. 44B is a data field diagrams for option A of a multi-band element according to an embodiment of the present disclosure.

FIG. 45 is a data field diagram for an option A multi-band control field according to an embodiment of the present disclosure.

FIG. 46A and FIG. 46B are a data field diagram for an option A multi-band discovery assistance request control field according to an embodiment of the present disclosure.

FIG. 47 is a data field diagram of an option A discovery assistance request control field format according to an embodiment of the present disclosure.

FIG. 48A and FIG. 48B is a data field diagram of an option A multi-band discovery assistance response control field according to an embodiment of the present disclosure.

FIG. 49 is a data field diagram of a discovery trigger request (DT-REQ) action frame according to an embodiment of the present disclosure.

FIG. 50 is a data field diagram of a discovery trigger response (DT-RES) action frame according to an embodiment of the present disclosure.

FIG. 51A through FIG. 51F are message passing diagrams for a first example of an option B frame format and WLAN implementation according to an embodiment of the present disclosure.

DETAILED DESCRIPTION

Figure 1:
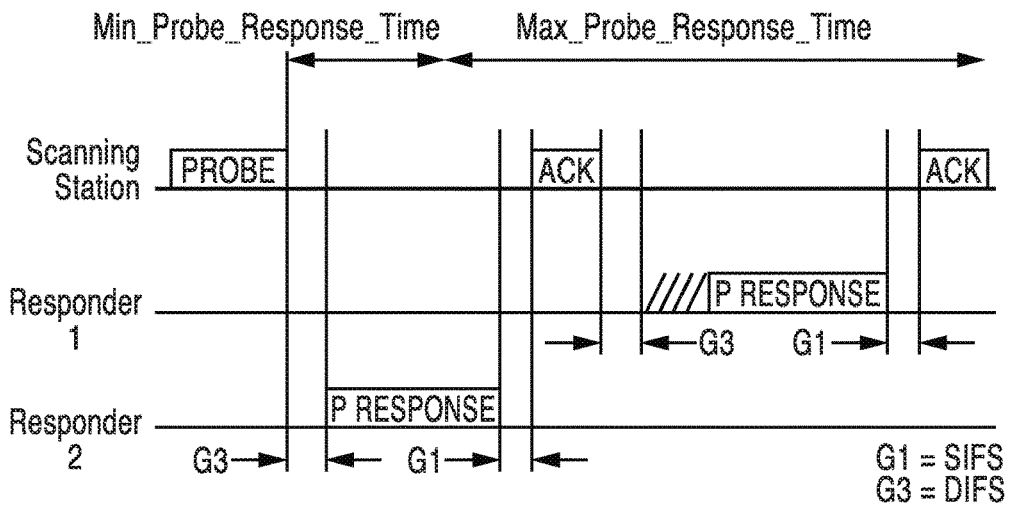
FIG. 1 is a timing diagram of active scanning performed in an IEEE 802.11 wireless local area network (WLAN).

A number of terms are utilized in the disclosure whose meanings are generally described below.

A-BFT: Association-Beamforming Training period; a period announced in the beacons that is used for association and BF training of new stations (STAs) joining the network.

AP: Access Point; an entity that contains one station (STA) and provides access to the distribution services, through the wireless medium (WM) for associated STAs.

Beamforming (BF): a directional transmission that does not use an Omni-directional antenna pattern or quasi-Omni antenna pattern, and is used at a transmitter to improve received signal power or signal-to-noise ratio (SNR) at an intended receiver.

BSS: Basic Service Set; a set of stations (STAs) that have successfully synchronized with an AP in the network.

BI: the Beacon Interval is a cyclic super frame period that represents the time between beacon transmission times.

BRP: BF Refinement protocol; a BF protocol that enables receiver training and iteratively trains the transmitter and receiver sides to optimize (achieve the best possible) directional communications.

BTI: Beacon Transmission Interval, is the interval between successive beacon transmissions.

CBAP: Contention-Based Access Period; the time period within the data transfer interval (DTI) of a directional multi-gigabit (DMG) BSS where contention-based enhanced distributed channel access (EDCA) is used.

DMG: Directional Multi-Gigabit (DMG).

DTI: Data Transfer Interval; the period in which full BF training is permitted followed by actual data transfer. The DTI can include one or more service periods (SPs) and contention-based access periods (CBAPs).

LOS: Line-of-Sight, a communication in which the transmitter and receiver are ostensibly within sight of one another, and not the result of communication of a reflected signal.

MAC address: a Medium Access Control (MAC) address.

MBSS: DN Basic Service Set, a basic service set (BSS) that forms a self-contained network of distributed network (DN) Stations (DN STAs), and which may be used as a distribution system (DS).

MCS: Modulation and Coding Scheme; defines an index that can be translated into the physical (PHY) layer (e.g., OSI model) data rate.

MLME: MAC Layer Management Entity.

MMPDU: MAC protocol Data Unit.

DN STA: distributed network (DN) station (DN STA): a station (STA) that implements the DN facility. A DN STA that operates in the DN BSS may provide the distribution services for other DN STAs.

OCT: On-Channel Tunnel.

Omni-directional: a mode of transmission utilizing a non-directional antenna.

Quasi-Omni directional: mode of communication utilizing a directional multi-gigabit (DMG) antenna with the widest beamwidth attainable.

Receive sector sweep (RXSS): Reception of Sector Sweep (SSW) frames via (across) different sectors, in which a sweep is performed between consecutive receptions.

RSSI: Receive Signal Strength Indicator (in dBm).

SLS: Sector-level Sweep phase: a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period; The SP that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SSID: service Set Identifier; the name assigned to a WLAN network.

STA: Station; a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

Transmit Sector Sweep (TXSS): transmission of multiple Sector Sweep (SSW) or Directional Multi-gigabit (DMG) Beacon frames via different sectors, in which a sweep is performed between consecutive transmissions.

1. Existing Directional Wireless Network Technology 1.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

1.2. IEEE 802.11s DN WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
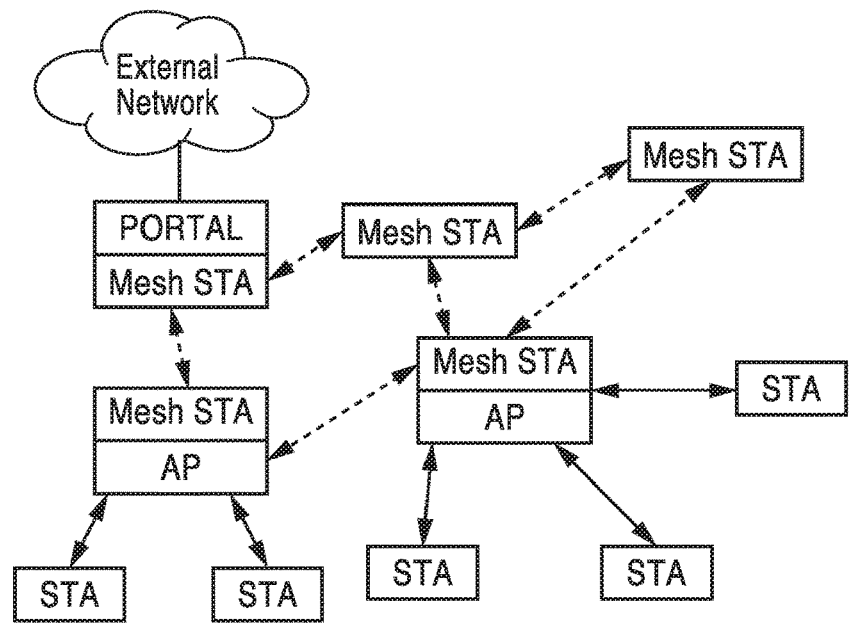
FIG. 2 is a STA diagram for a distributed network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
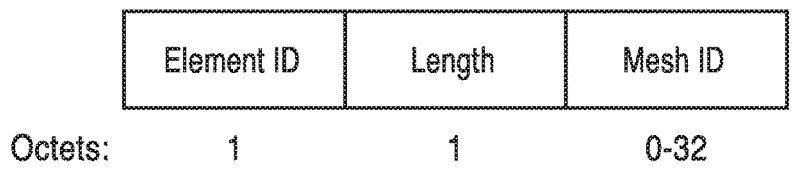
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11 ay define procedures for scanning and beamforming for directional transmission and reception over the millimeter wave band.

1.4. IEEE 802.11ad Scanning and BF Training

An example of a mmWave WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-Omni directional pattern. The responder determines the antenna array sector from the initiator which provided the best link quality (e.g. SNR).

Figure 5:
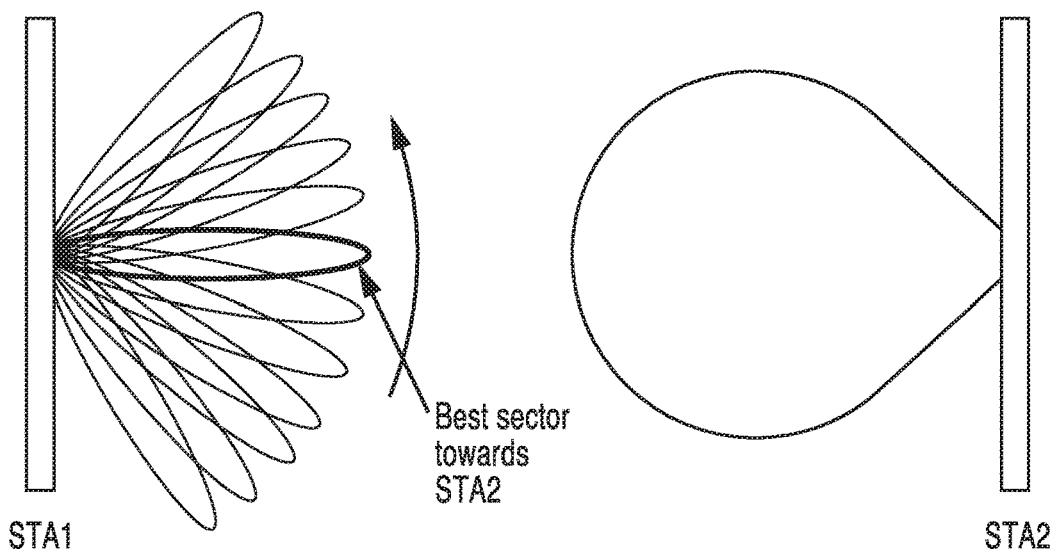
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
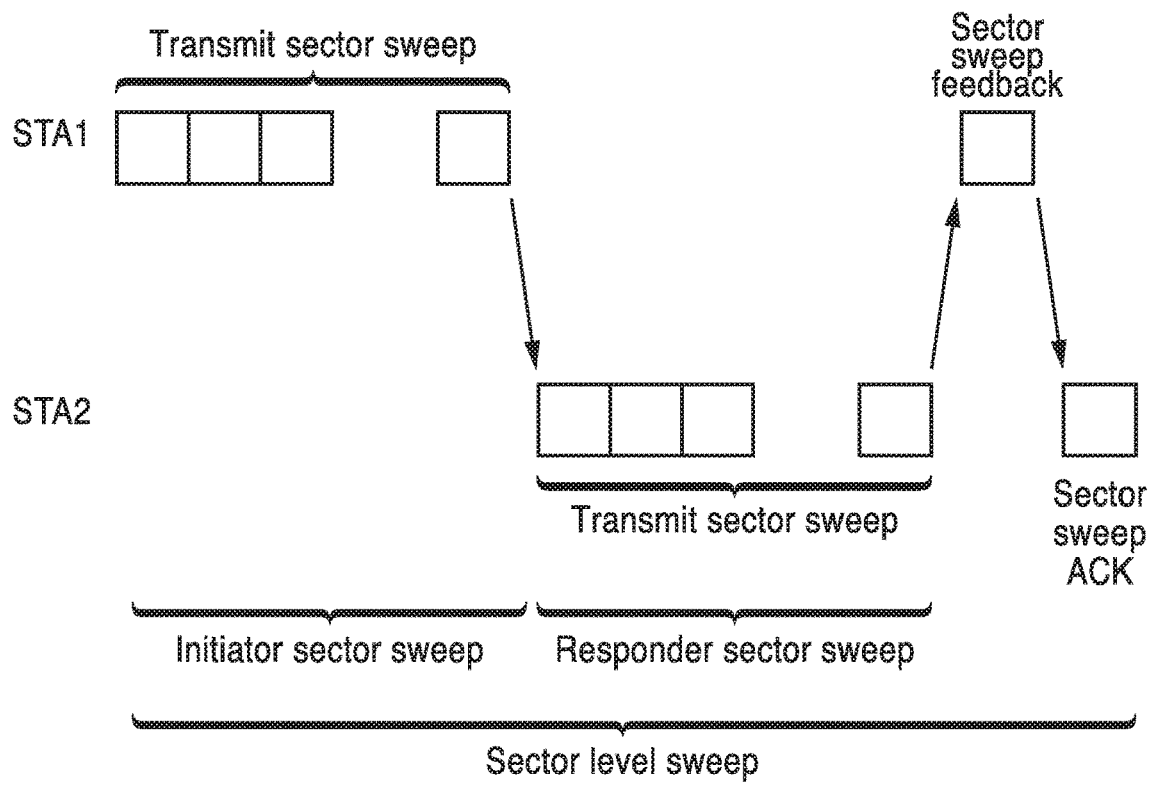
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Problem Statement

Current millimeter wave (mmWave) communication systems, as described in section 5.3, typically need to rely heavily on directional communication to gain sufficient link budget between transmitter and receiver. In current systems, this process of determining the proper beam for use requires significant signaling overhead. For example, the AP transmits multiple beacon frames with transmit beam forming.

The beacon frames are used for network discovery purposes, i.e., passive scanning. For this reason, beacon frames are transmitted periodically, so that a new STA can recognize the existence of the network by performing passive scanning in a certain time period. Network discovery can also be achieved using active scanning in which the new STA transmits probe requests in all directions to make sure it is receivable by a nearby STA in the network.

To further complicate the situation, current technology is trending toward the use of finer beam forming, which allows higher antenna gain to secure a higher link budget. However, the overhead problem is further exacerbated when the STA employs finer beams, because the STA is then transmitting a larger number of beacon frames to cover a sufficient transmission angle. Beacons are transmitted all the time in all directions, as well as periodically, to announce the network, maintain synchronization and manage the network resources.

In view of the above, an important trade-off exists between beaconing overhead and network discovery delay. If beacons are transmitted frequently, then the beaconing overhead increases, although this allows a new STA to find the existing network more quickly. If beacons are transmitted less frequently, the beaconing overhead can be decreased, however, it would be difficult for a new STA to find the existing network in a rapid manner.

When considering the task of forming a DN utilizing mmWave PHY technology, this overhead dilemma becomes even worse. A STA connecting to a DN needs to discover all neighboring STAs to decide on the best way to reach gateway/portal STAs and the capabilities of each of these neighboring STAs. This means that all the STAs joining a DN should have the capability of beaconing which leads to significant signaling overhead.

Accordingly, the present disclosure is configured for addressing these current and future beacon overhead challenges.

3. Benefits of mmWave Multi-Band Network Discovery

In the disclosed network protocol, STAs participating in the multi-band network discovery are expected to have multi-band (MB) capabilities, comprising mmWave band capability, and also including a lower frequency communication band, such as sub-6 GHz. MB STAs are capable of using sub-6 GHz band for network announcement and discovery in addition to the mmW band. By utilizing the proposed technologies, mmWave communication STAs can form a DN topology network without being subject to significant signaling overhead or network discovery delay.

The disclosure describes a mechanism for utilizing the already established sub-6 GHz network for aiding new STAs in finding other neighbors. A network STA announces the mmW network on the sub-6 GHz band with a reduced power message sent periodically from a Quasi-omni antenna. Once the new STA discovers at least one neighbor through the sub-6 GHz band, this DN station (DN STA) can assist the new STA, and can also coordinate with other DN STAs to assist the new STA in the mmW band to beamform and join the network.

In the present disclosure, stations (STAs) are not sending beacons in all directions all the time in the mmW band. STAs are triggered to send the discovery beacons in all directions upon a new STA requesting assistance, whereas the overhead and interference associated with continuous beacon transmission in all directions is limited.

4. Multi-Band Network Discovery Embodiments

4.1. Topology Under Consideration

Figure 10:
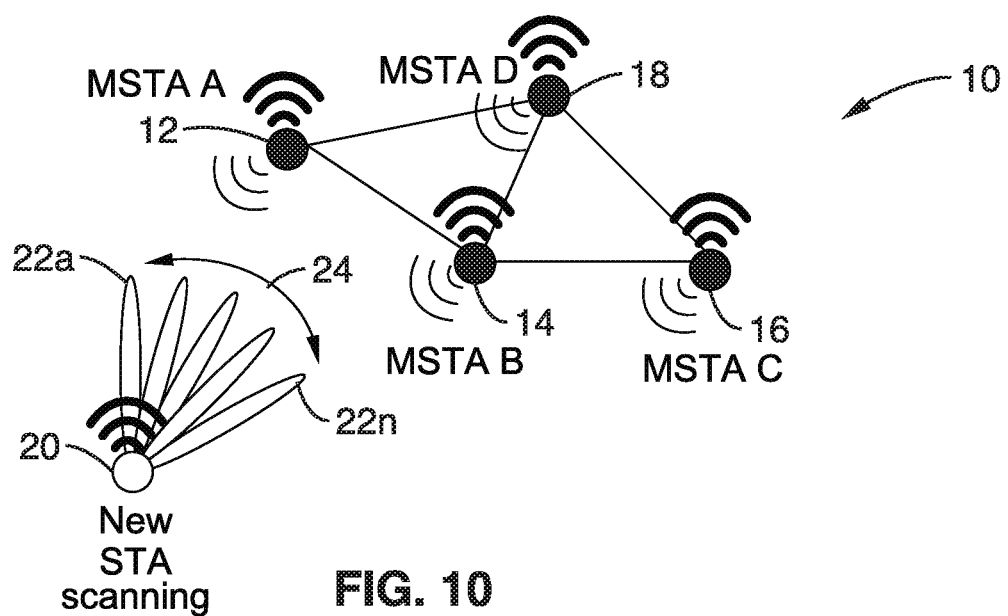
FIG. 10 is a wireless STA topology example of wireless mmWave STAs in a wireless network as utilized according to an embodiment of the present disclosure.

FIG. 10 illustrates an example embodiment 10 of a network of mmW wireless STAs, in which DN STAs 12, 14, 16 and 18 are connected in a DN topology with each other. A new STA 20 is scanning 24, depicting directions 22a-22n, the communication medium for potential neighboring DN STA and pair STAs. In the example shown, STAs are capable of communicating on a sub-6 GHz band as well as mmWave and can use this band to send control signals between each other. STAs that are connected to the mmW DN can access each other through the mmW links or through the sub-6 GHz band.

The new STA is scanning the medium for potential neighboring DN

STA and pair STAs. For the mmW wave, directional transmission or reception is not required at all times at both sides. One side for example may be using directional transmission/reception while the other side does not. This case may be the result of limited device capabilities or application requirements where there is no need for directional transmission from both sides (limiting interference/small distance).

New STAs can use Omni/Quasi Omni directional, or directional antennas, for transmission and reception in the mmW band. DN STAs can use Omni/Quasi Omni directional, or directional antennas, for transmission and reception in the mmW band. For the mmW communications, at least one DN STA or the new STA should use the directional antenna to provide sufficient gain to account for path loss and provide enough SNR for the link. The new STA scans for neighbors using either passive or active scanning. The new STA is configured to keep scanning until it finds all neighboring STAs. After the list of available neighbors is constructed by the new STA, a decision about which neighbor to connect to is made. This decision preferably takes into account application demands, traffic loading in the network and wireless channel status.

4.2. STA Hardware Configuration

Figure 11:
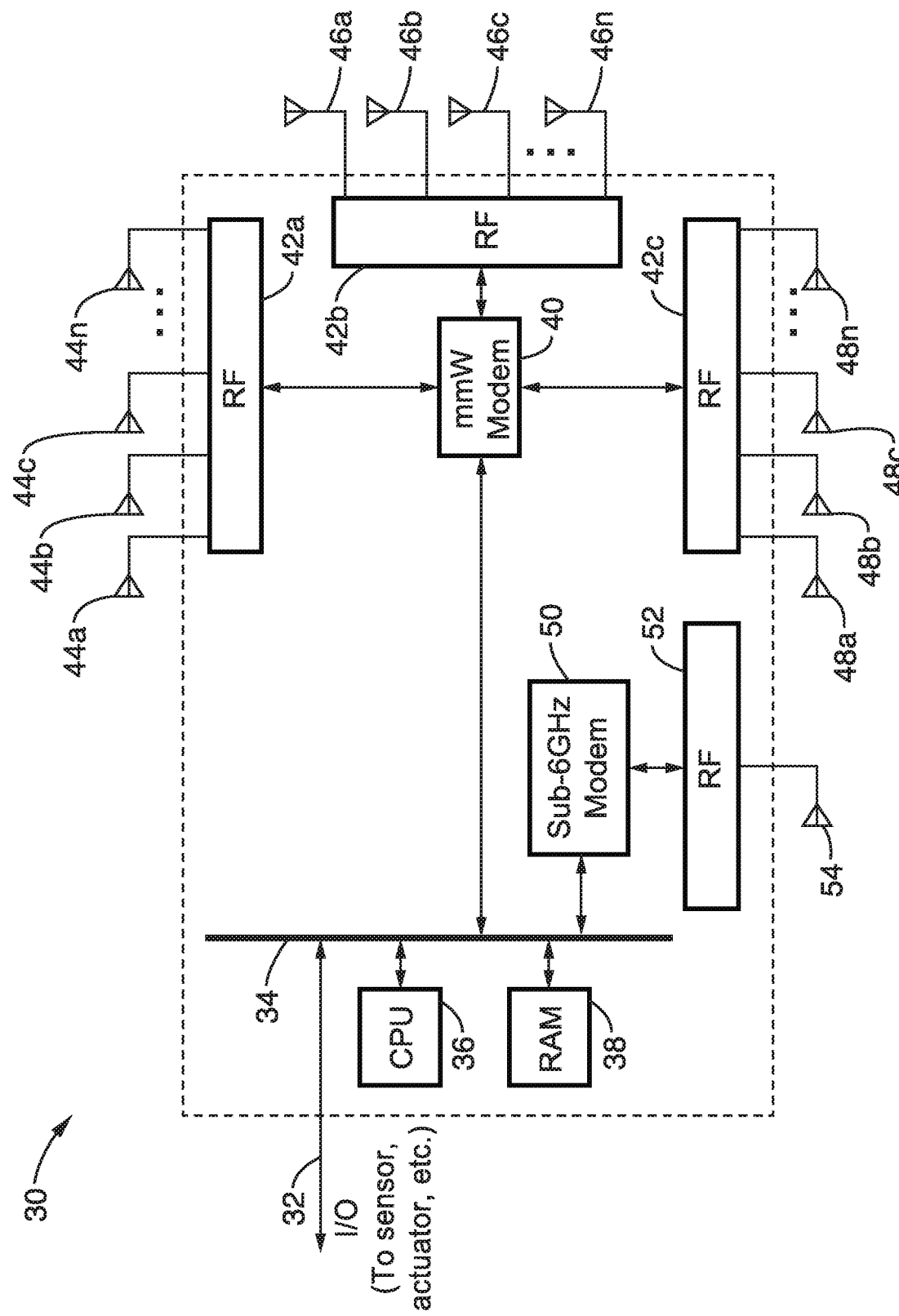
FIG. 11 is a block diagram of station hardware as utilized according to an embodiment of the present disclosure.

FIG. 11 depicts an example embodiment 30 of STA hardware configuration. In this example a computer processor (CPU) 36 and memory (RAM) 38 are coupled to a bus 34, which is coupled to an I/O path 32 giving the STA external I/O, such as to sensors, actuators and so forth. Instructions from memory are executed on processor 36 to execute a program which implements the communication protocols. This host machine is shown configured with a mmW modem 40 coupled to radio-frequency (RF) circuitry 42a, 42b, 42c to a plurality of antennas 44a-44n, 46a, 46n, 48a-48n to transmit and receive frames with neighboring STAs. In addition, the host machine is also seen with a sub-6 GHz modem 50 coupled to radio-frequency (RF) circuitry 52 to antenna(s) 54.

Thus, this host machine is shown configured with two modems (multi-band) and their associated RF circuitry for providing communication on two different bands. The mmW band modem and its associated RF circuitries are transmitting and receiving data in the mmW band. The sub-6 GHz modem and its associated RF circuitry are transmitting and receiving data in the sub-6 GHz band.

Although three RF circuits are shown in this example for the mmW band, embodiments of the present disclosure can be configured with modem 40 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
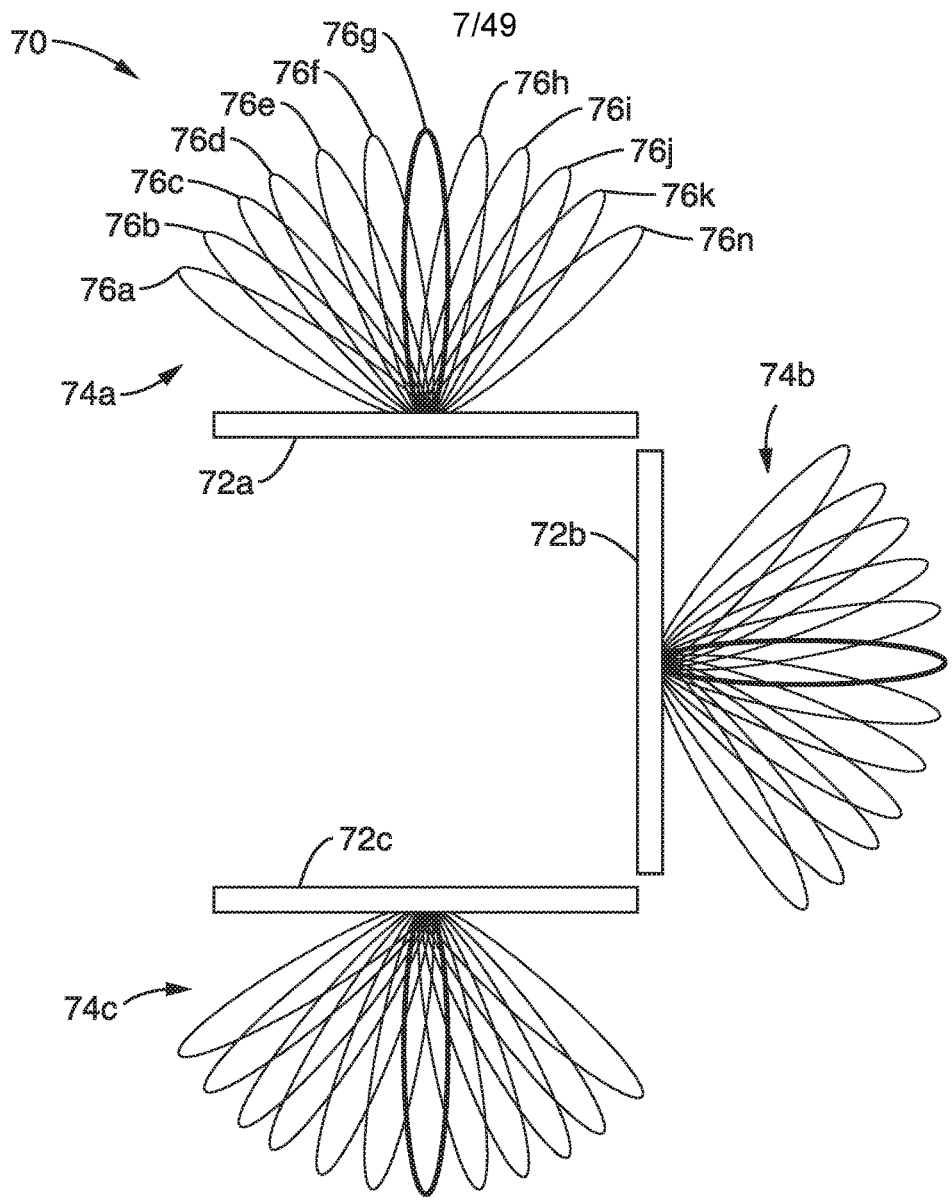
FIG. 12 is a mmW beam pattern diagram for the station hardware of FIG. 11 as utilized according to an embodiment of the present disclosure.

FIG. 12 illustrates an example embodiment 70 of mmWave antenna directions which can be utilized by a STA to generate a plurality (e.g., 36) of mmWave antenna sector patterns. In this example, the STA implements three RF circuits 72a, 72b, 72c and connected antennas, and each RF circuitry and connected antenna generate a beamforming pattern 74a, 74b, 74c. Antenna pattern 74a is shown having twelve beamforming patterns 76a, 76b, 76c, 76d, 76e, 76f, 76g, 76h, 76i, 76j, 76k and 76n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmWave RF circuitry and beamforming commanded by the mmWave array antenna controller. Although it is possible that STA hardware components have different functional partitions from the one described above, such configurations can be deemed to be a variant of the explained configuration. Some of the mmWave RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 13:
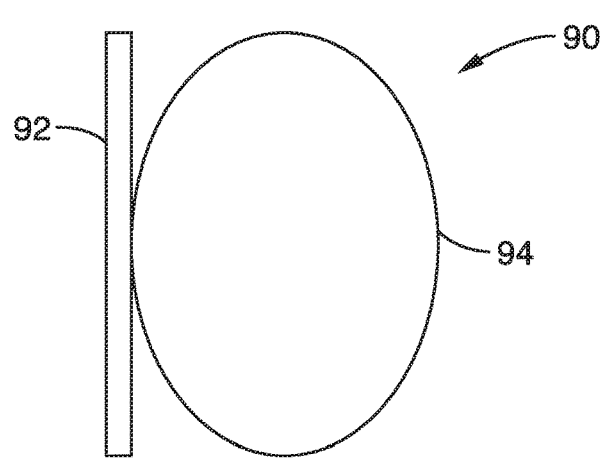
FIG. 13 is a beam pattern diagram for a secondary band communications antenna (i.e., sub-6 GHz), according to an embodiment of the present disclosure.

FIG. 13 illustrates an example embodiment 90 of antenna pattern for the sub-6 GHz modem assumed to use a Quasi-Omni antenna 94 attached to its RF circuitry 92.

4.3. Multi-Band Network Discovery Architecture

Wireless receivers and transmitters are expected to be shipped with multi-band chips that include for example, the use of the mmW band as well as a sub-6 GHz band. Operation in the mmWave band can benefit from using sub-6 GHz coverage in STA discovery and neighbor scanning. The characteristics of signal propagation in the sub-6 GHz band can allow a STA to more simply discover the existence of mmW operating wireless STAs, however localization of neighbors and finding the right sector or beam is still an issue.

To use multi-band network discovery, wireless STAs are assumed to be able to transmit and receive signals on the sub-6 GHz band. This is in the form of sending messages to all STAs of the network or sending a message to a specific STA. This can be performed through direct communication between STAs or through multi-hop communication between STAs. New STAs are equipped with sub-6 GHz access as well, and can access the WLAN network or communicate with DN STAs through sub-6 GHz communication. Discovery and network announcement can utilize the sub-6 GHz band, while forming the connectivity and maintaining the link is preferably carried out utilizing the mmW network. It should be appreciated that other control signaling can be moved from the mmW band to the sub-6 GHz, but that is not the focus of the present disclosure.

In WLAN and DNs, beacons are utilized for: (a) network discovery and association for new DN STAs; (b) synchronization; (c) spectrum access and resource management. For discovery and network announcement at mm wavelengths, the beacons have to be transmitted in all directions all the time to enable passive scanning. It will be appreciated that the meaning of "all the time" in the above statement only indicates a continued periodic nature of the beacons, while "all directions" only refers to using a sweep of directions to any desired angular resolution. In the case of active scanning, STAs transmit probe requests in all directions.

In the proposed system, for forming a mmW distribution network,

STAs are using sub-6 GHz band for discovery and network announcement, while synchronization, spectrum access and resource management information are still communicated through the mmW DN. STAs that are already connected to each other in the mmW network may or may not send beacons in all directions in every beacon transmission interval (BTI). Also, the frequency of sending beacons to neighboring peers might be adjusted according to the use case.

Three general options are defined for the previously described multi-band WLAN to use sub-6 GHz band for discovery and network announcement of a mmW distribution network. These options are: (a) sub-6 GHz passive mmW DN announcement scanning; (b) sub-6 GHz active mmW DN announcement scanning; and (c) sub-6 GHz on-channel tunneling (OCT) mmW DN announcement.

For option (a) beacon frames are sent through the sub 6-GHz band indicating multi-band capability, the existence of a mmW distribution network in the vicinity and DMG capabilities. Other frames can be used as well instead of the beacon frame and broadcasted with the same information. The transmit power of this frame is preferably adjusted (e.g., dynamically or statically) to only reach STAs within reach of the associated mmW signal, so as not to draw in STAs which are beyond the network in terms of mmWave communications. If this is not possible, the new STA can filter the received beacons from the distribution network STAs by RSSI to only consider beacons from nearby STAs where the mmW signal within reach.

The reception of the sub-6 GHz beacon frame by the new STA can trigger a mmW discovery campaign by STAs in the vicinity of the new STA to help finding the right sectors and neighbors for the new STA to join the mmW network. The mmW discovery campaign involves other STAs around (in proximity) within the new STA sending DMG beacons concurrently or in sequential order to aid the new STA in discovering the neighbors and their directionality information.

Figure 14:
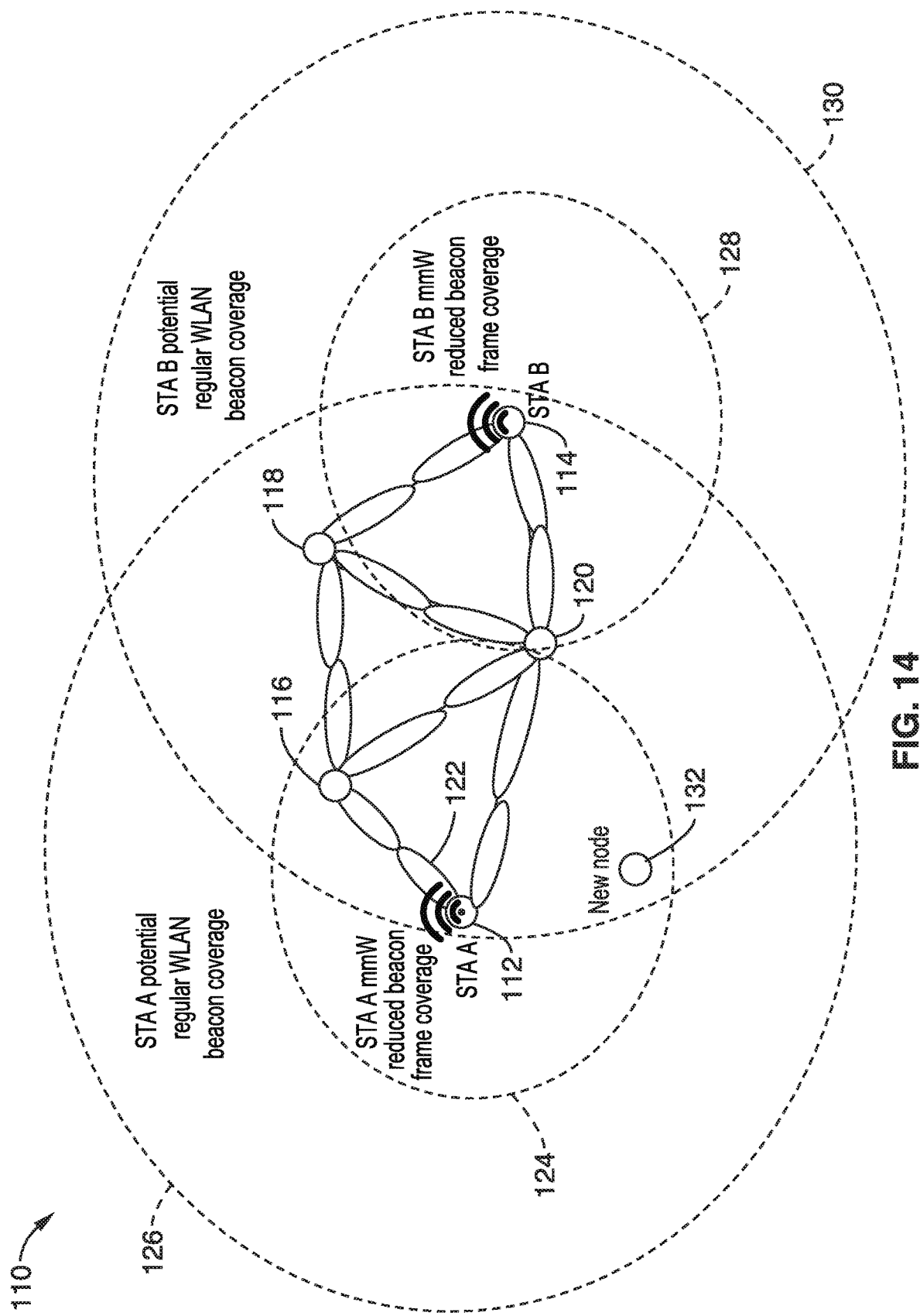
FIG. 14 is an antenna pattern map of a coverage area for sub-6 GHz beacon frames sent by DN STAs according to an embodiment of the present disclosure.

FIG. 14 illustrates an example embodiment 110 of utilizing the sub-6 GHz band to send beacon frames to other STAs to announce multi-band capability, the existence of a mmW distribution network and DMG capabilities. It is shown, for illustration purposes only, two DN STAs (STA A 112 and STA B 114). each being shown with full power beacons 126, 130 and reduced power beacon coverage areas 124, 128. If STA A and STA B transmit reduced power beacons, the new STA 132 will only receive a signal from STA A where the mmW band signal is in-range and will not receive the beacon from STA B where the mmW band signal is out of range. However, if both STAs are using full power beacon transmission, new STA 132 receives the beacons from both STA A and STA B. New STA 132 filter out the communication from the station with received lower power, RSSI, since this implies that the STA is out of mmW signal range.

For option (b), new STA 132 sends a probe request on the sub-6 GHz band indicating multi-band capability, and an interest in joining the mmW distribution network in the vicinity and some DMG capabilities. Other frames can be used as well instead of the probe request frame and broadcasted with the same information. The transmit power output of this frame is preferably adjusted (e.g., dynamically or statically) to only reach STAs within reach of the associated mmW signal, so as not to draw in STAs which are beyond the network in terms of mmWave communications. If this is not possible, the DN STAs can filter the received probe requests from the new STAs by RSSI to only consider request from nearby STAs where the mmW signal within reach.

Figure 15:
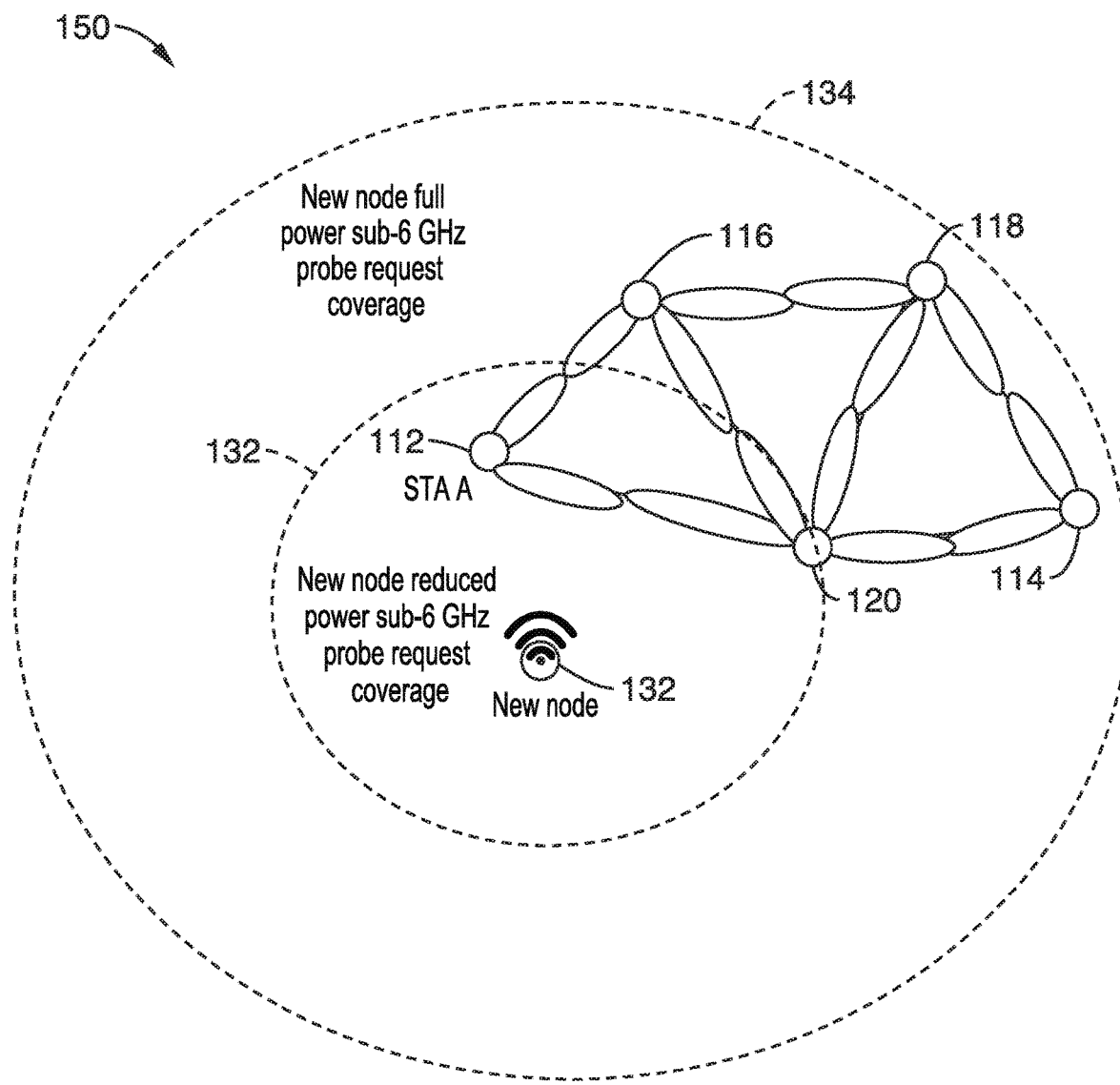
FIG. 15 is an antenna pattern map of a coverage area for sub-6 GHz probe request frames sent by a new STA seeking to join the DN according to an embodiment of the present disclosure.

The reception of the sub-6 GHz probe request frame from the new STA at a DN STA can trigger a mmW discovery campaign by STAs 112, 114, 116, 118, 120 in the vicinity of new STA 132 to help finding the right sectors and neighbors for the new STA to join the mmW network, with their mmW communications sectors 122 shown wirelessly interconnecting the stations. The mmW discovery campaign involves other STAs around the new STA sending DMG beacons concurrently or in sequential order to aid the new STA in discovering the neighbors and their directionality information. The figure depicts FIG. 15 illustrates an example embodiment 150 of utilizing the sub-6 GHz band to send a probe request from a new STA 132 to other STAs 112, 114, 116, 118. 120 to announce its existence, and its interest in joining a mmW distribution network in the vicinity which has some DMG capabilities. It is shown, for illustration purposes only, that the new STA full power probe request 132 and reduced power probe request 134 coverage area. If new STA 132 transmits a reduced power probe request, DN STAs whose mmW signal is in range will be the only STAs receiving the signal from new STA 132 and DN STAs whose mmW signal is out of range will not receive signal the probe request from new STA 132. However, if new STA is using a full power probe request transmission 134, then the DN STAs receiving the probe requests may be out of mmW signal range. Each DN STA filters the received probe requests and exclude the one request with low received power, RSSI, from mmW network discovery assistance since this implies that the STA is out of mmW signal range.

For option (c), new STA 132 should join the sub-6 GHz band network first (BSS or DN). Once the new STA is already part of the sub-6 GHz band network, on-channel tunneling (OCT) is established between the new STA and a DN STA. Both STAs have multi-band capability and the OCT is used to send MMPDUs from the new mmW STA to the DN mmW STA through the established OCT between the new sub-6 GHz STA and the DN sub-6 GHz STA.

It is noted that in option (a) and (b), it is not necessarily required for the new STA to join or finalize the joining process to trigger mmW channel discovery if it using information in the beacon or probe request for discovery. It is still beneficial to complete the connection with the discovered STA on the sub-6 GHz band for extending the discovery of the network and for other possible off-loading of mmW control signals that are not the subject of this disclosure. If the discovery is being performed through using frames, other than the beacon or the probe request/response frame, then the new node might need to finalize joining the sub-6 GHz network first.

4.4. Beaconing in the mmWave Network

Beaconing in the mmW network may or may not be used as usual. Three cases we consider for beaconing in the mmW band network.

(a) Regular beaconing is can be performed in which beacons are transmitted in all direction every BTI. The current proposed discovery protocols over the sub-6 GHz band can provide a means to quicken the discovery process in addition to regular all-direction beacon transmission. This should be very beneficial especially when the number of directional beams is very large.

(b) Beaconing is taking place only towards the peer STAs using communication or peer beacons. The communication or peer beacons are utilized for communication between peers with already established (setup) connections. This beacon can be utilized for carrying out functions related to maintaining synchronization, performing beam tracking and managing channel access and resources between DN STAs in the network. Each DN STA sweeps beacons in sectors corresponding to directions of neighbor STAs only and transmits beacons to its neighbors only.

Figure 16A:
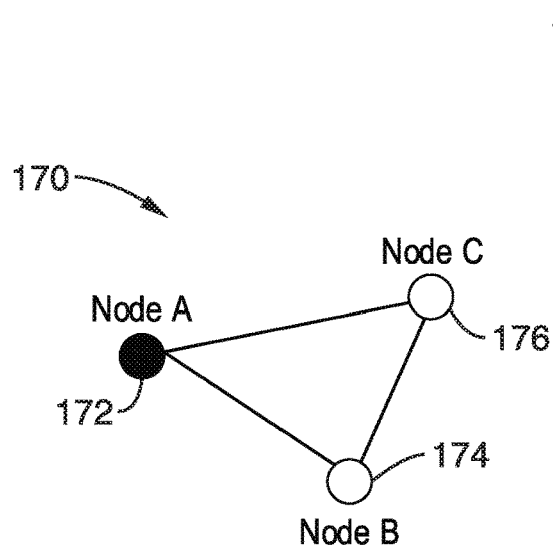
FIG. 16A through FIG. 16C is a wireless STA topology and associated discovery beacon sweeping according to an embodiment of the present disclosure.
Figure 16B:
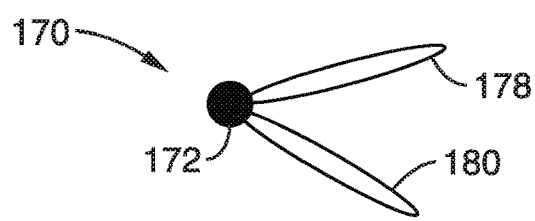
Figure 16C:
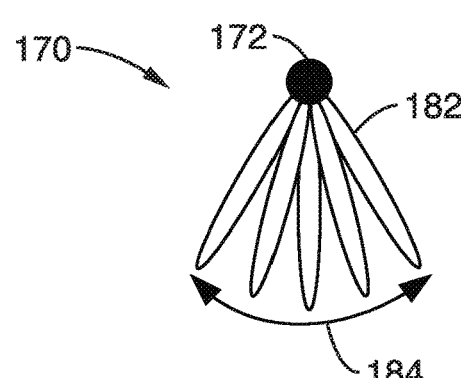

FIG. 16A through FIG. 16C illustrate aspects of a simple mmW network embodiment 170 considered by way of example and not limitation. In FIG. 16A three STAs 172, 174 and 176, are depicted by way of example. In FIG. 16B beacons are shown transmitting from STA A 172, showing peer beacons being swept 178, 180 in directions corresponding to best sectors towards STAs 174 and 176. In FIG. 16C STA A 172 sweeps 184 discovery beacons 182 to cover a specific spatial area. The present disclosure utilizes these beacons only in the directions from STA A corresponding to STAs C and B as shown in FIG. 16B compared to what is traditionally utilized.

Figure 17A:
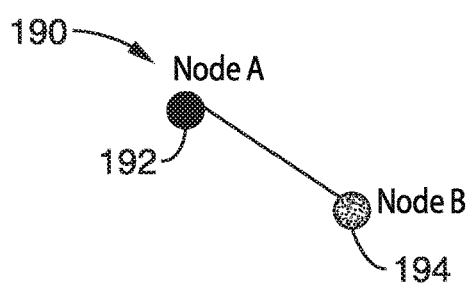
FIG. 17A and FIG. 17B is a wireless STA topology upon which bracketing of best sector communications directions are performed according to an embodiment of the present disclosure.
Figure 17B:
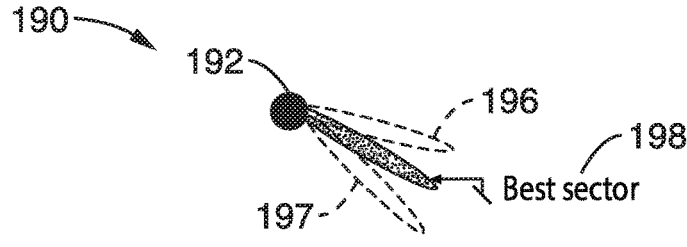

FIG. 17A and FIG. 17B illustrate an example embodiment 190 of providing additional robustness by performing transmissions on one or more sectors around (bracketing) the determined best sector. In FIG. 17A STA A 192 is seen in relation to STA B 194 with the best sector (path) being direction 198, depicted with adjacent sectors 196, 197 as seen in FIG. 17B. So although STA A in communicating with STA B has best sector 198, the presented protocol also selects one or more additional sectors 196, 197, on each side of this best sector to improve communications robustness, especially in view of the fact that STA B may be moving in relation to STA A.

It should be appreciated that the above peer beacons should be easily coordinated since the direction and the timing is known for each peer link. This results in limiting and managing interference due to the transmission of beacons in all directions.

Figure 18:
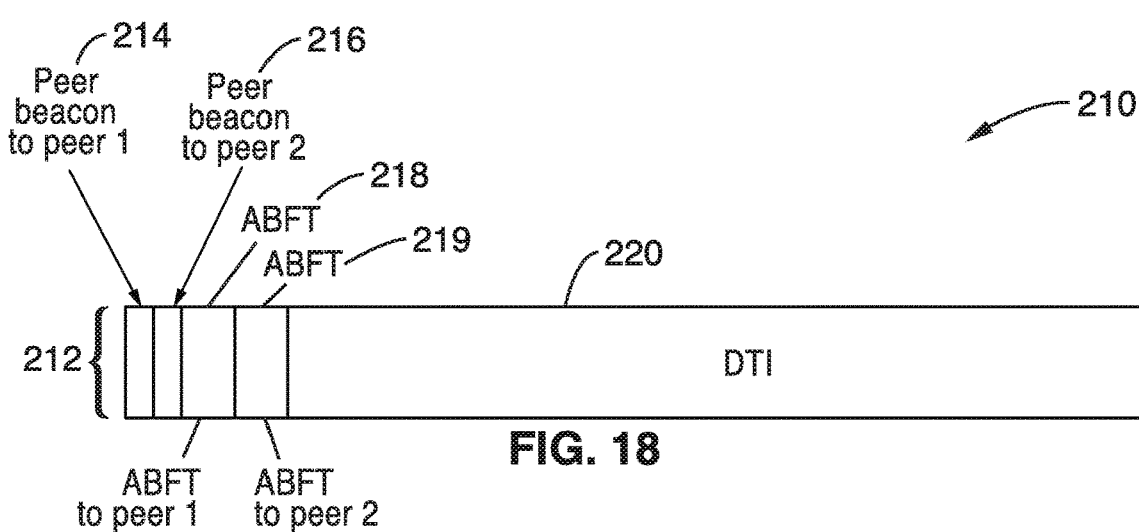
FIG. 18 is a communication period diagram showing a peer DMG beacon super frame format as utilized according to an embodiment of the present disclosure.

FIG. 18 illustrates an example embodiment 210 of a mmWave peer DMG beacon super frame format for the present disclosure in which beacons are only transmitted in the direction of these two peer STAs, thus making the BTI process significantly shorter. In the figure the transmission 212 includes peer beacons shown exemplified for two peers as a beacon 214 to peer 1 and a beacon 216 to peer 2, followed by an association-beamforming training (ABFT) period 218 to peer 1, and an ABFT period 1219 to peer 2, after which the data transfer interval (DTI) 220 commences. The ABFT period in this case can be pre-assigned to the peers associated with the transmitted beacons since no other STAs are expected to use this period of time.

(c) In this case there is no beacon transmission at the mmW network at all. Beacon transmission or other forms of synchronization and beamforming can be triggered when a new STA is discovered on the sub-6 GHz band. In such a case synchronization and beamforming maintenance should be handled in the DTI period or through frames other than the beacon frames. Once a new STA is discovered, uni-cast frames, or alternatively multi-cast frames, are transmitted from the discovered STA or other surrounding STAs to the discovered STA are triggered (informed) to help the new STA beamform and join the mmW network.

4.5. Out of Band Discovery

The use of the sub-6 GHz band can be performed through the following: (1) scanning the sub-6 GHz channel for a STA with multi-band capability and mmW network existence announcement; and (2) establishment of an OCT on the sub-6 GHz channel to communicate between the MLME of the new mmW STA and the MLME of the network mmW STA.

The first option enables the discovery of the STA even if the sub-6 GHz STA is not joining the BSS or the MBSS. The use of the sub-6 GHz band does not require the STA to be associated to a specific STA or service set. However, a new STA can join BSS or MBSS on the sub-6 GHz band and use it to provide additional coordination to facilitate other functionality in the mmW band or for increasing security to the discovery and boarding process.

The second option however, requires that the STA is associated or connected to the STA it tries to establish an OCT with. Hence for a new STA, the connection on the sub-6 GHz band needs to be established first before discovery through the OCT is occurring.

If the STA already has an established connection over the sub-6 GHz band, the speed of establishment of an OCT determines which option can more readily provide discovery to the STA.

4.5.1. Out of band Discovery Through Scanning

New STAs can use the sub-6 GHz band to scan for STAs with multi-band capability. If a STA with multi-band capability is found, the new STA checks if there is a mmW distribution network to join through this STA and exchange the mmW hardware capability of those STAs. A new STA utilizes passive scanning for mmW networks on the sub-6 GHz band, or active scanning for mmW networks on the sub-6 GHz band.

4.5.1.1. Passive Scanning

A new STA listens to the sub-6 GHz band awaiting a beacon frame sent from one of the STAs. The transmission and reception preferably uses Quasi-Omni antennas. The beacon frame should carry information about the multi-band capability of the STA, assistance enablement support to join an existing mmW distribution network, and the DMG capability of the mmW STA associated with this STA. Once a beacon frame stating multi-band capability is received indicating that assistance to joining a mmW distribution network is enabled, the new STA informs the discovered STA of its existence and its DMG capability of its associated mmW STA. Upon the reception of a confirmation from the DN node recognizing the new STA discovery request, the new STA switches to the mmW band to connect to the discovered STA and/or distribution network. The discovered STA starts transmitting beacons in the mmW band to beamform with the new STA. The discovered STA can use directionality information from the sub-6 GHz band, such as the direction of the (line-of-sight) LOS or the strongest reflecting ray, to only send beacons through some of the beams in the mmW band.

If DN assistance is enabled, the discovered STAs trigger other STAs in the surrounding area of the new STA to start sending beacons or beamforming frames to the new STA and perform beamforming therewith. The transmission of the beacons can be coordinated between the DN STAs to achieve quick connectivity and discovery of STAs.

Figure 19:
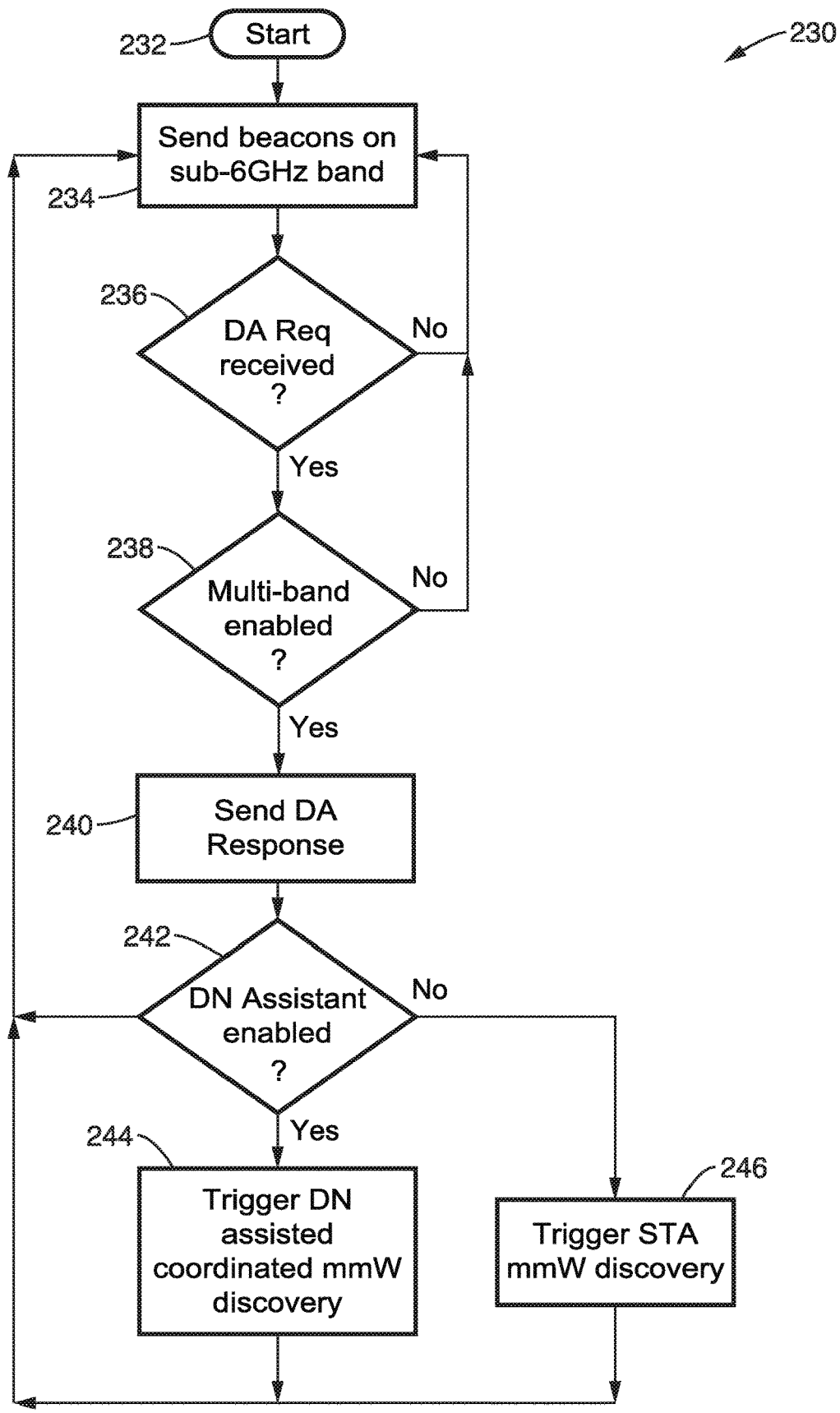
FIG. 19 is a flow diagram of sub-6 GHz assisted DN STA passive scanning according to an embodiment of the present disclosure.

FIG. 19 illustrates an example embodiment 230 of a process in which STAs are handling new STAs according to a passive scanning process. The routine starts 232 and STA sends 234 a beacon frame on the sub-6 GHz band at the time dedicated for beacon transmission with multi-band and DN/DMG capability indication. A check is made 236 for DA request received. If no response is received from a new STA, then the STA continues transmitting beacon frames 234 at their scheduled time. Otherwise, if a response is received from a new STA, then a determination is made if multi-band and DN is enabled. First a check is made if multi-band is enabled. If not enabled execution returns to block 234 to send beacons. Otherwise, with multi-band enabled execution moves to block 240 to send a DA response. A check is then made 242, if DN assistance is enabled. If DN is not enabled, then execution moves 246 to triggers STA mmW discovery for this specific STA, before continuing transmitting beacons. Otherwise, if DN assistance is enabled, execution moves to block 244 to trigger DN assisted coordinated mmW discovery. Thus, in the case when multi-band and DN are enabled, then it triggers assisted coordinated mmW discovery, before returning back and continuing transmitting beacons.

4.5.1.2. Active Scanning

In active scanning, the new STA sends probe request frames over the sub-6 GHz band and awaits a probe response frame sent from one of the STAs. The transmission and reception preferably uses Quasi-Omni antennas. The probe request frame preferably carries information about the multi-band capability of the new STA, requests for assistance to join an existing mmW distribution network, and the DMG capability of the mmW STA associated with this STA. Once a probe request frame stating multi-band capability is received with a request to join a mmW distribution network, then the STA responds to the new STA with a probe response. The probe response includes information about the mmW STA capability and DN enablement. Other frames can be utilized to relay this information to the new STA as well. The new STA switches to the mmW band to connect to the discovered STA and/or distribution network. The discovered STA starts transmitting beacons or beamforming frames in the mmW band to beamform with the new STA. The discovered STA can use directionality information from the sub-6 GHz band, like the direction of the LOS or the strongest reflecting ray, to only send beacons through some of the beams in the mmW band.

If DN assistance is enabled, the discovered STAs trigger other STAs in the vicinity of the new STA to start sending beacons or beamforming frames to the new STA and perform beamforming. The transmission of the beacons can be coordinated between the DN STAs to achieve quick connectivity and STA discovery.

Figure 20:
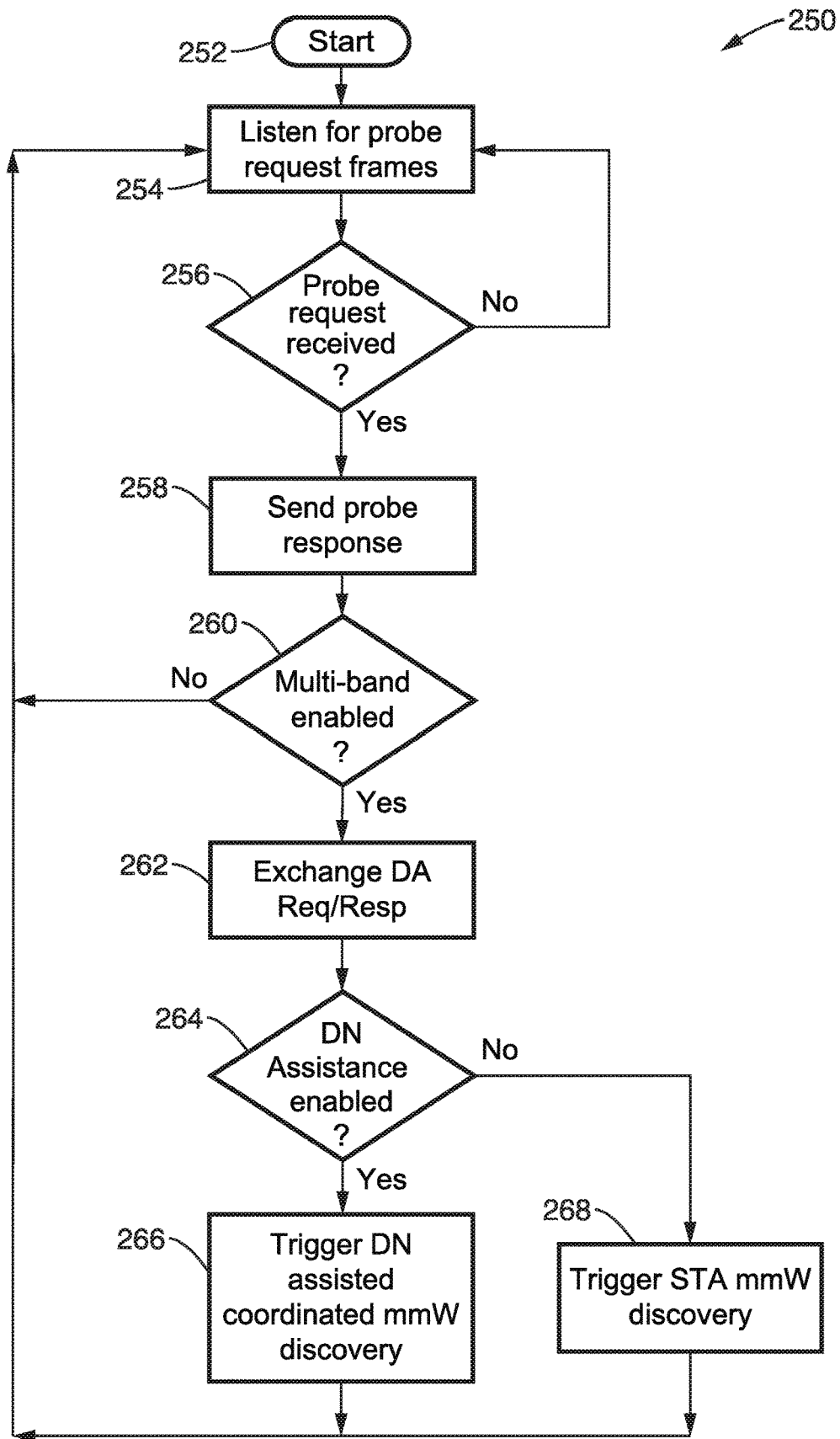
FIG. 20 is a flow diagram of sub-6 GHz assisted DN STA active scanning according to an embodiment of the present disclosure.

FIG. 20 illustrates an example embodiment 250 of a process in which a DN is handling new STAs according to active scanning process. The routine starts 252 and commences listening 254 for probe request frames. A check 256 is made if a probe request has been received. If one has not been received, then the process returns to block 254 and thus continues to listen. Otherwise, a probe request has been received to which a probe response is sent 258 to the new STA, after which a checks are made to determine if multi-band and DN assistance is enabled. At block 260 a check is made for multi-band enabled. If multi-band is not enabled, then execution returns to listening for probe requests at block 254. If multi-band enabled, then execution reaches block 262 which exchanges DA request or response. A check is then made 264 for DN assistance. If DN assistance is not enabled, then mmW STA discovery is activated 268, before returning to listen for announcement request frames at block 254. Otherwise, if DN assistance is enabled, then DN assisted coordinated mmW STA discovery 266 is activated, followed by returning to listen for announcement request frames at block 254.

For active and passive scanning, if DN assistance is enabled, the management of the mmW DN assistance and coordination can be distributed or through a central coordinator.

4.5.1.3. Range Management

To limit interference and to assure that only STAs that can be accessed with a direct mmW link are accessed, the beacon frames with multi-band indication enabled, or the probe request with multi-band indication enabled, can be sent with lower power to reflect (emulate, match) the mmW link budget. The required transmit power for the frames can be determined such that frames are only received by a STA if the link budget in the mmW band allows for a viable data link in the mmW network with that STA.

If the beacon frames or the probe requests are transmitted with full power, a threshold is then utilized in at least one embodiment in the receiving STA, to decide whether to respond to this frame, or not to respond if it is considered that it will be outside the mmW DN STA coverage area. The determination of this threshold can be performed such that frames are only considered if the link budget in the mmW band allows for a viable data link in the mmW network.

4.5.2 Out of Band Discovery Through Tunneling

Figure 21:
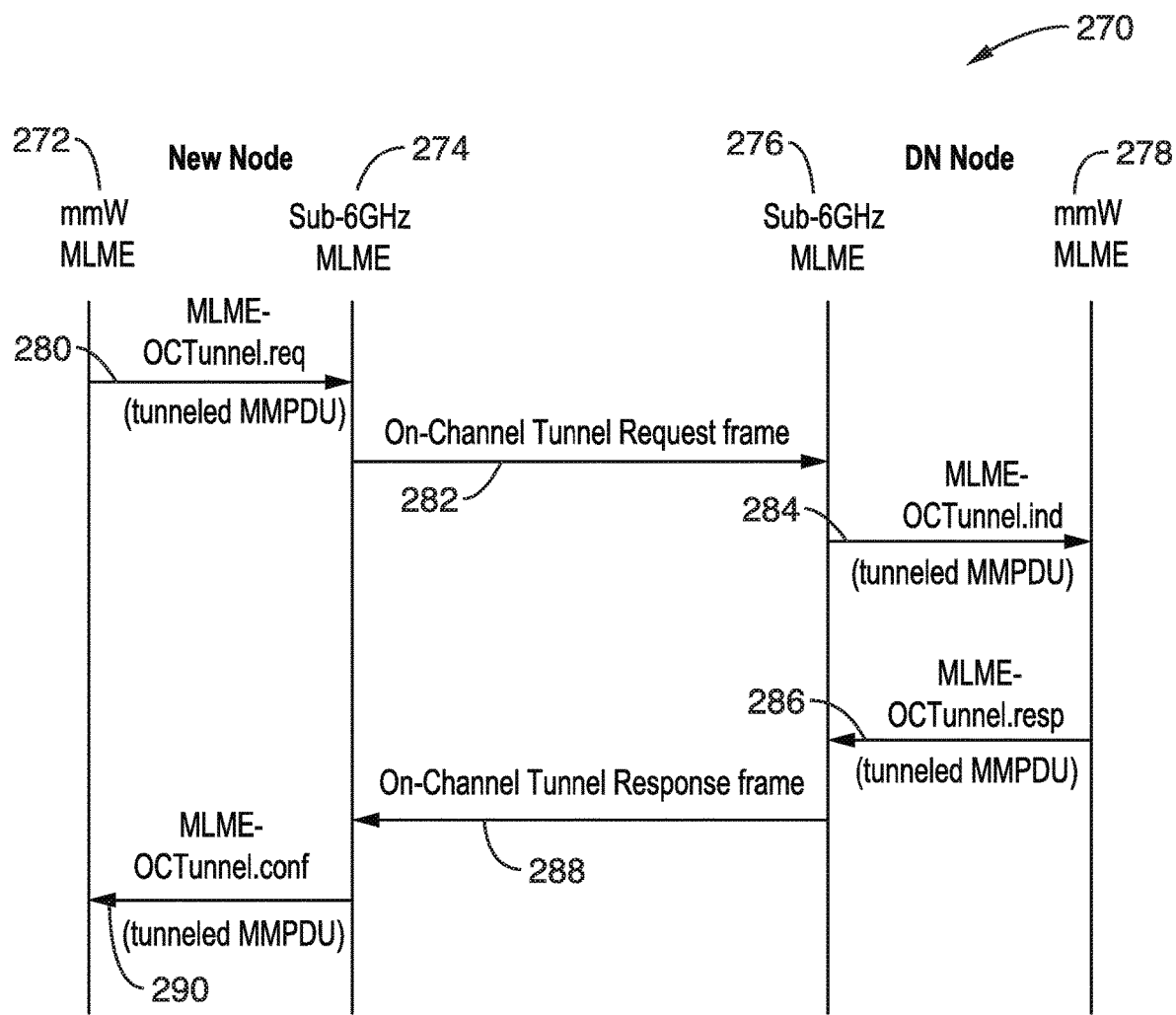
FIG. 21 is a message passing diagram showing mmW authentication on Sub-6 GHz according to an embodiment of the present disclosure.

FIG. 21 illustrates an example embodiment 270 of mmW discovery on Sub-6 GHz between a new node having both a mmW MLME 272 and sub-6 GHz MLME 274, and a DN node having a sub-6 GHz MLME 276 and a mmW MLME 278. OCT allows the sub-6 GHz STA to transmit a MAC protocol Data Unit (MMPDU) that was constructed by mmW STA. The MLME (MAC Layer Management Entity) of the mmW STA of the new STA or of the DN STA can initiate this tunnel after the sub-6 GHz link is already established between the new STA and the DN STA.

This mmW management frame is sent on the sub-6 GHz band by sending a request 280 from the mmW MLME 272 to the sub-6 GHz MLME 274 within the device. The sub-6 GHz MLME receiving that request is configured to transmit 282 an OCT request frame addressed to the peer sub-6 GHz MLME and includes the MMPDU. Upon receiving the OCT request frame, the sub-6 GHz MLME of that device (DN node) forwards 284 an OCT tunnel indication to the mmW MLME 278 and the attached MMPDU. The mmW STA processes this MMPDU as if it has been received over the air. The DN nodes mmW MLME 278 sends a tunnel response 286 back to its sub-6 GHz MLME 276, which then sends 288 an OCT response frame to the sub-6 GHz MLME of new node 274, which in turn sends 290 an OCT confirmation of tunneled MMPDU to the mmW MLME 272. Thus, a response might be sent to the initiating mmW MLME using the same technique where a new MMPDU is constructed and passed as shown in figure.

4.6. Performing mmW Authentication on Sub-6 GHz

Once a new STA discovers a neighboring STA through sub-6 GHz communication and decides to form a mmW link, it informs that neighbor about its existence and requests assistance through a probe request, probe response, action frame or any other frame.

The new STA might trigger authentication requests before switching to the mmW band to guarantee that the potential mmW link is authenticated before commencing the mmW discovery campaign, so as to avoid unnecessary beamforming on the mmW band. The new STA sends an authentication request and waits for an authentication response, and in at least one embodiment, the new STA acknowledges the authentication response. If the authentication response and acknowledgement both succeed then the new STA and the neighboring STAs(s) start the mmW discovery campaign.

In case of DN assistance being performed through geographical discovery zones of a STA, the DN STA lists all potential neighbors to the new STA in the authentication response if DN assistance was enabled. The new STA responds with a list of STAs of interest to potentially connect to. The DN STA considers only the list of STAs in the acknowledgement message for the discovery campaign. The authentication can be considered as a network wide authentication to simplify the multi-node authentication procedure.

4.7. Performing mmW Discovery and Beamforming

A new STA discovers a neighbor or a DN through scanning in the sub-6 GHz band or OCT. The new STA can act directly to check the mmW band and beamform with that neighbor. The new STA is expecting the DN node to start transmitting beamforming frames or beacons, while the DN node is expecting a new STA in the network. Active or passive scanning of the mmW band can be used to establish a connection between these two STAs.

4.7.1 Active mmW Discovery

Once the new STA discovers an STA on the sub-6 GHz band with multi-band capability or a mmW DN, the new STA gets information about the DMG capabilities of the discovered STA and starts active scanning on the mmW band. The new STA sends probe requests either using directional beams or a quasi-omni antenna. The discovered mmW STA is aware of the new STA attempts to form a mmW link or to join the DN. The discovered mmW STA is listening and waiting for probe requests using directional beams or a quasi-omni antenna. The new STA and the discovered STA exchange their DMG capabilities over the sub-6 GHz band and are expecting the frame exchange. The new STA and the discovered STA can also coordinate their transmission and reception based on data exchanged over the sub-6 GHz band.

The discovered STA is configured to respond to the probe request with a probe response and expects an ACK for the reception of such a frame. Proper beamforming should be scheduled afterwards.

The STAs are not synchronized over the mmW band so the transmission and reception of the frames preferably takes that into account. If the mmW band access is scheduled in such a way that the frames can't be transmitted without scheduling or contention access, passive mmW discovery should be considered instead.

4.7.2. Passive mmW Discovery

Once the new STA discovers on the sub-6 GHz band a STA with multi-band capability or a mmW DN, the discovered STA gets information about the DMG capabilities of the new STA and starts transmitting beamforming frames or beacons on the mmW band. The discovered STA sends beamforming frames or beacons either using directional beams or quasi-omni antenna. The new mmW STA is aware of the discovered STA attempts to form a mmW link or to assist in joining the DN. The new mmW STA is listening and waiting for beamforming frames or beacons using directional beams or quasi-omni antenna. The new STA and the discovered STA exchange their DMG capabilities over the sub-6 GHz band and are expecting the frame exchange. The new STA and the discovered STA preferably coordinate their transmission and reception based on data exchanged, such as over the sub-6 GHz too. The new STA preferably listens to (monitors) the mmW channel and once it finds the beamforming frames it will synchronize with the discovered STA and thus will be able to transmit frames synchronously.

The new STA should respond to the discovered STA and exchange beamforming information. Proper beamforming should be scheduled afterwards.

Figure 22:
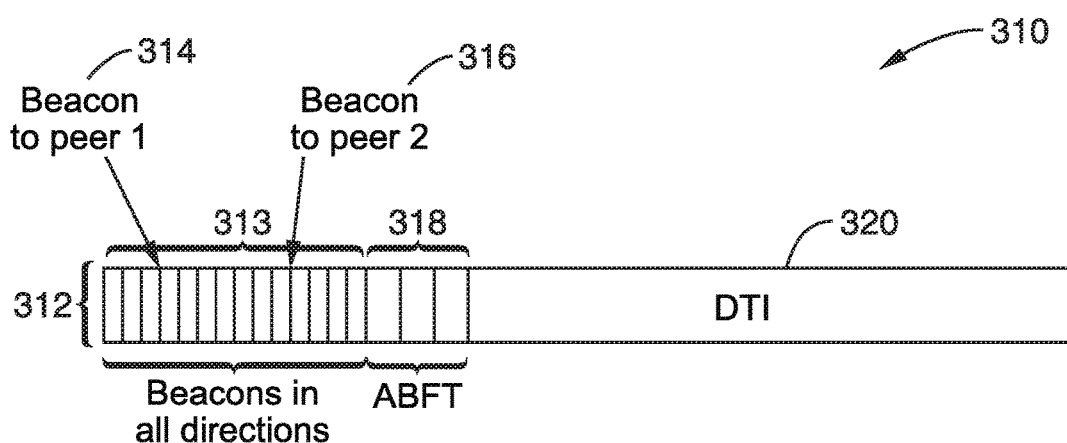
FIG. 22 is a communication period diagram showing passive scanning through beacon transmission according to an embodiment of the present disclosure.

FIG. 22 illustrates an example embodiment 310 of a WLAN superframe format which performs beacon transmissions in all directions, for use when discovery is performed through passive scanning. This superframe can be compared with the DMG peer beacons depicted in FIG. 18, which represents the time when discovery is not scheduled and there is no need to transmit the beacons in all directions. The STAs might transmit beacons to peer STAs only for maintaining synchronization or any other function related to beacon transmission. The STAs might not transmit any beacon at all as well.

In FIG. 22, the transmission includes data 312 with peer beacons 313 including example beacons peer 1 314 and a beacon to peer 2 316, with other beacons sent in all directions, followed by an association-beamforming training (ABFT) period 318. The ABFT slots 318 are associated with the peer STAs and are equal to the number of peer STAs and one is added to the new expected STA. After the ABFT period, the data transfer interval (DTI) 320 commences.

The new STA and the discovered STA exchange their mmW antenna capability through the communications that are performed in the sub-6 GHz band. Some directionality information, such as the direction of the LOS or the strongest beams, can be relayed to the new STA through the sub-6 GHz band as well to limit the beams over which the STAs are scanning in passive or active mode. Some directionality information, such as the direction of the LOS or the strongest x beams, can be used by the STAs as well to limit the directions over which it sends beacons, beamforming frames, or probe requests.

Figure 23:
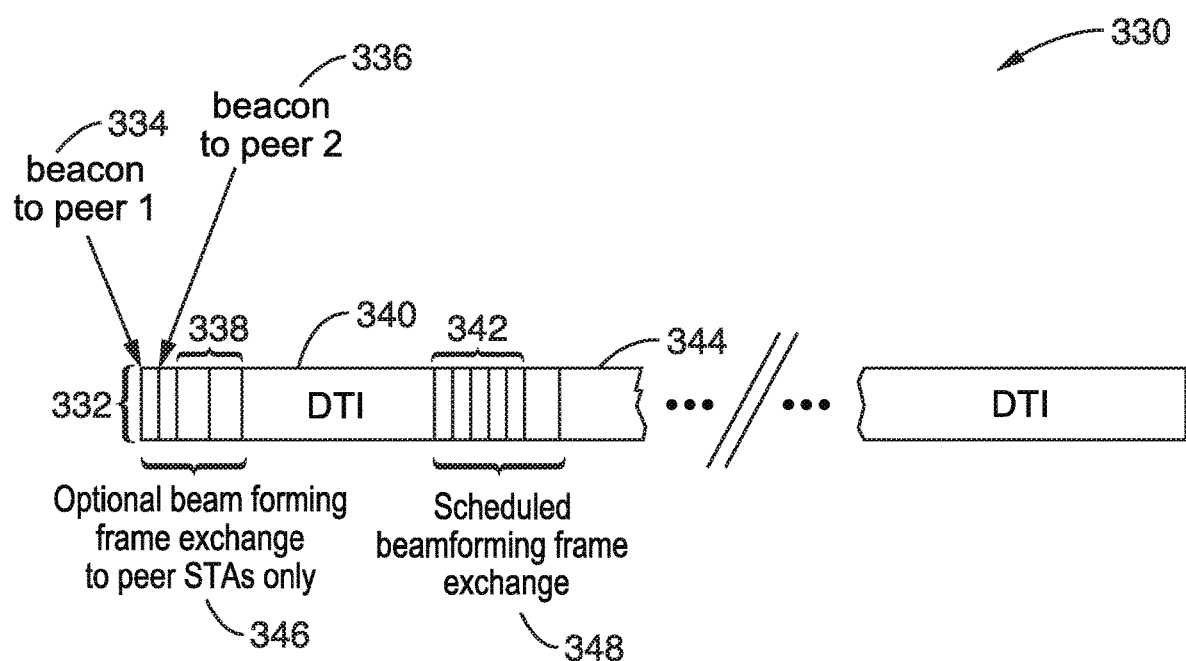
FIG. 23 is a communication period diagram showing discovery through passive scanning through scheduling beamforming frame exchange or scheduling beacons transmission according to an embodiment of the present disclosure.

FIG. 23 illustrates an example embodiment 330 of discovery through scheduled beacon or beamforming frame exchange. In the figure is seen the data 332, and beacons 334 and 336 to peer 1 and peer 2, respectively. This whole section involves an optional beamforming frame exchange 346 to peer STAs only, and include beamforming 338, followed by the DTI 340. The figure also shows that the DN STA can schedule a beamforming session 342 in DTI period 340 to beam form with the new STA, followed by more of the DTI data 344. Beacons to peer STAs and ABFT might or might not be allocated, followed by a data transfer interval (DTI) period. A scheduled beacon transmission and SSW frames period or any type of beamforming frames exchange take place during the DTI. In the figure, the DN STA continues transmitting beacons to its peers only in the beacon transmission period which can be omitted if not needed and on demand transmits beacons or beamforming frames in all direction upon finding a new STA through the sub-6 GHz scanning by scheduling that in the DTI period.

In the scheduled period, the SSW frame exchange can be dedicated to new STA discovery only, hence there is no need to have many SSW slots like the ABFT period defined in the IEEE 802.11 standard.

Once the new STA is discovered and connected to the network, the DN STA may start transmitting regular peer beacons to the new STA with each beacon transmission interval if it is desired.

Figure 24:
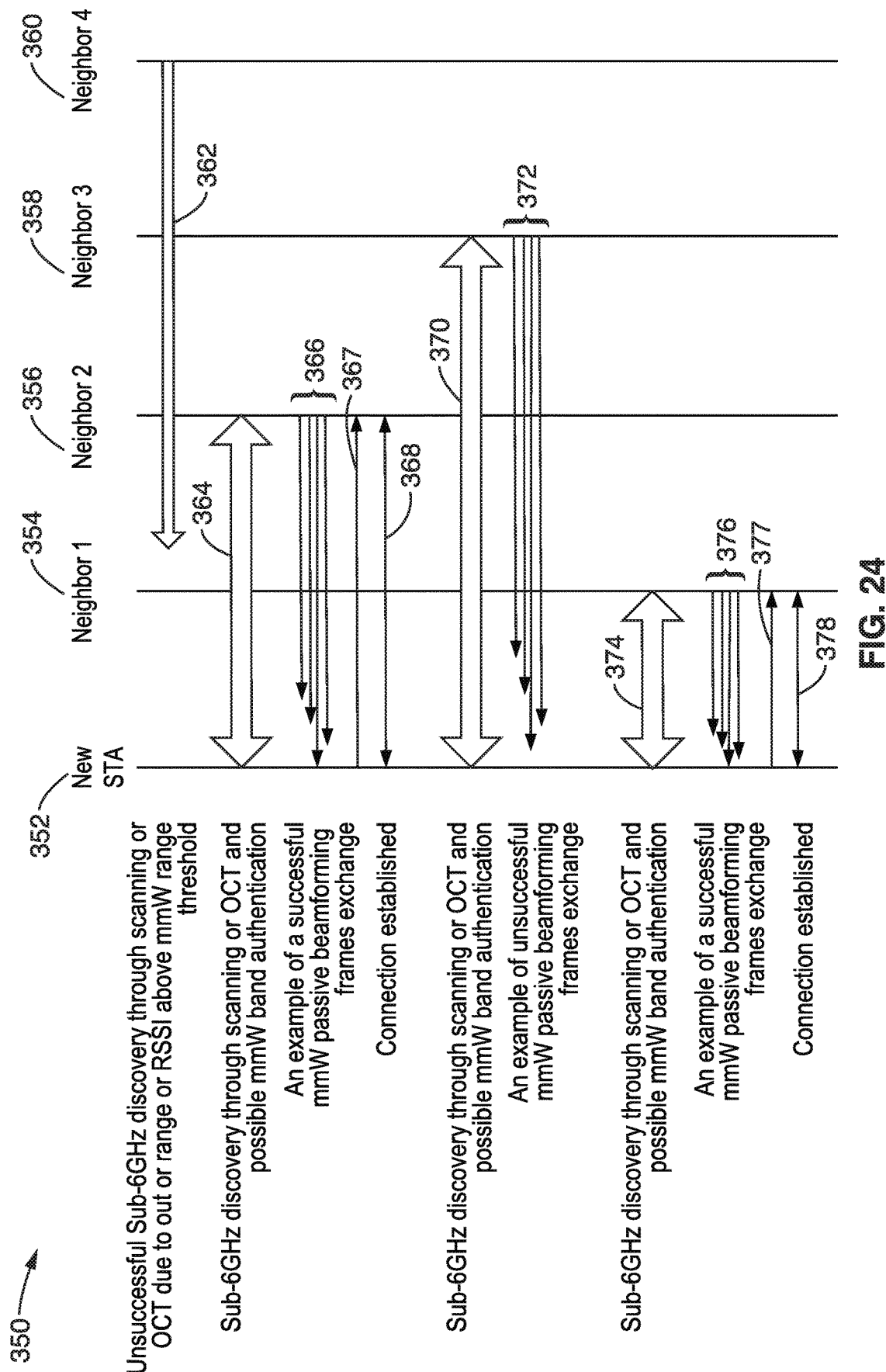
FIG. 24 is a message passing diagram for out of band STA passive discovery according to an embodiment of the present disclosure.

FIG. 24 illustrates an example embodiment 350 of signaling for out of band STA discovery using passive mmW scanning and directive antenna transmission and quasi-omni antenna for receptions. The example can be extended for active scanning and any antenna configuration in transmission and reception. In the figure the thick arrows represent signals sent over the sub-6 GHz band and thin arrows represent directional signals sent over the mmW band. The figure depicts communications between new STA 352, Neighbor-1 354, Neighbor-2 356, Neighbor-3 358 and Neighbor-4 360.

Discovery and possible authentication are being performed on the sub-6 GHz band. An unsuccessful sub-6 GHz discovery 362 is seen, which does not reach from Neighbor-4 360 to new STA 352. Once the new STA discovers a mmW STA through the sub-6 GHZ signal exchange 364, Neighbor 2 starts transmitting 366 beamforming frames to the new STA as mmW transmissions in all or some directions depending on the information available from the sub-6 GHz communication. Once new STA receives one of these frames, it sends 367 a response or link setup acknowledgement, and connection is established 368. In this example the beamforming process is considered for a symmetric channel. If the channel is not symmetric and both directions need to be beamformed, this should use the same technique.

The same process continues with other neighbors in the network; although it might fail to setup a link in the mmW band as seen with neighbor 3. The figure depicts Neighbor-3 358 and the new station 352 performing sub-6 GHz discovery 370, but the beamforming phase 372 failing. Neighbor-1 354 is also shown in discovery 374 with new neighbor 352 followed by successful mmW beamforming 376, response 377 from the new station and establishing a connection 378. In particular, in the example depicted, new STA successfully discovered the neighbor on the sub-6 GHz and might has successfully authenticated on the sub-6 GHz, but the beamforming frames were not received by new STA. This is why the new STA does not exchange frames with Neighbor-3 358.

4.8. Coordinated mmW Discovery

The new STA discovery of a DN STA through sub-6 GHz scanning (active or passive scanning) or OCT can trigger DN STA coordinated mmW discovery campaign. By way of example and not limitation, the mmW discovery campaign can be performed by contacted STA members, or all STAs in the vicinity of the new STA.

4.8.1 Coordination through sub-6 GHz STA Discovery

Figure 25:
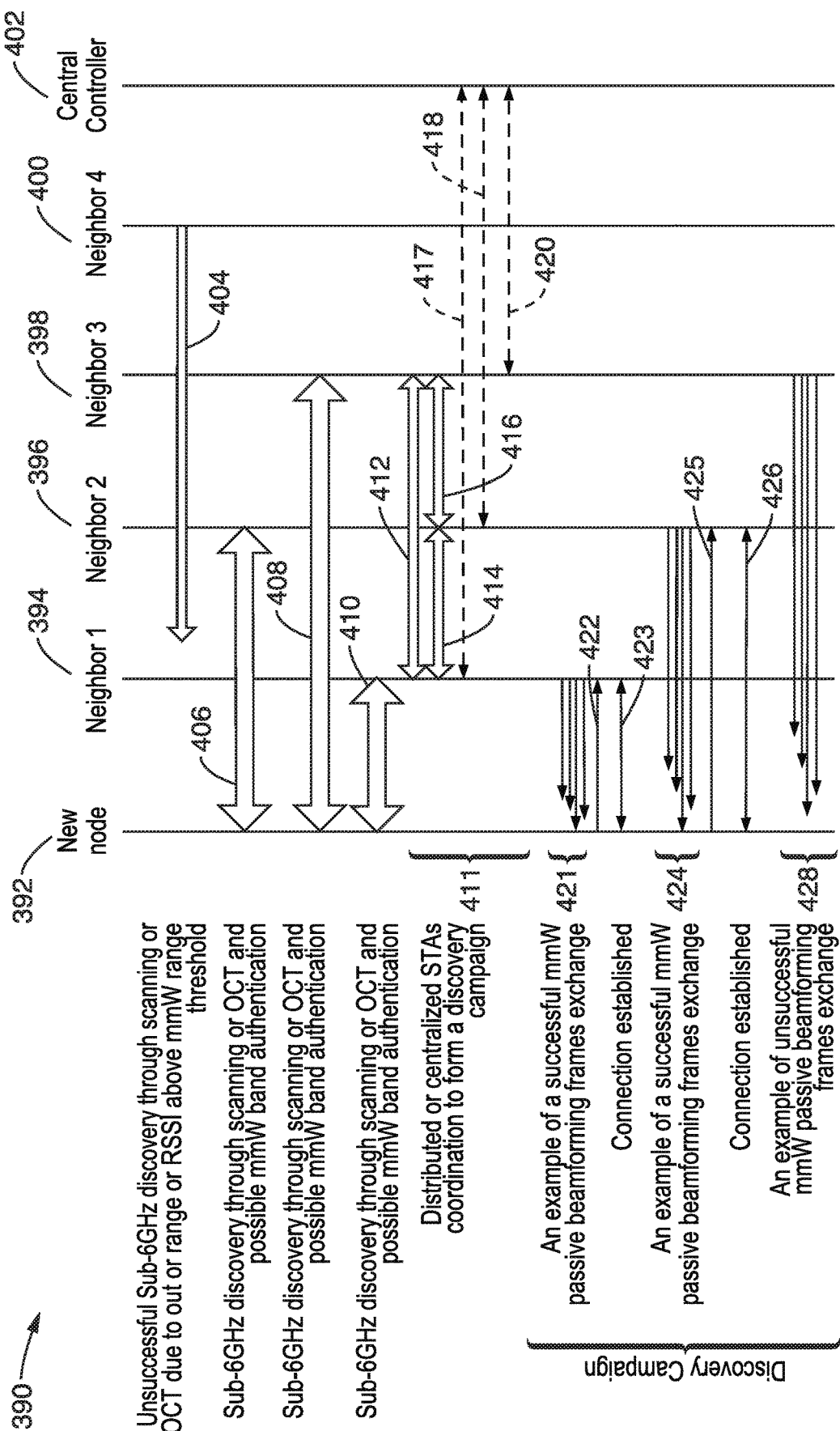
FIG. 25 is a message passing diagram for DN coordinated mmW STA discovery according to an embodiment of the present disclosure.

FIG. 25 illustrates an example embodiment 390 of coordinated mmW STA discovery, with a list of STAs 394, 396, 398, 400, 402 discovered by a new STA 392 on the sub-6 GHz band. The new STA 392 discovers Neighbors 1, 2 and 3 on the sub-6 GHz band for sufficient time to discover all neighbors. The new STA responds and informs each neighbor it has discovered about its existence and DMG capabilities. The STAs contacted by the new STA coordinate with each other to form a discovery campaign.

A sub-6 GHz discovery 404 of Neighbor-4 400 is unsuccessful where the STA is out of mmW range. The figure depicts sub-6 GHz STA discovery 406, 408, 410 for Neighbors 2, 3 and 1 being successful.

DN coordination between neighbors 2, 3 and 1 is performed 412, 414 and 416 to form a discovery campaign. The coordination is illustrated with an abstraction showing communications in the figure for the sake of simplicity. The coordination can be performed through sharing information about the new STA and deciding on a sequence, or order, over which STAs are reaching out to the new STA. Coordination should take interference and scheduling of resources into account. The present disclosure is also configured to allow a central controller 402 to be utilized for managing this coordination 417, 418, 420, or it can be performed in a distributed fashion.

Once the discovery campaign is completed, then the new STA can use mmW communications with the neighbors in the DN. In the figure Neighbor-1 394 is seen beamforming 421 with the new node (STA) by sending 421 mmW beamforming frames in all directions, some of which are received at the new STA which sends 422 a response back, after which a connection 423 can be established between these two nodes, which may include exchanging multiple frames in both directions. Similarly, Neighbor-2 396 is seen beamforming 424 with the new node (station) by sending mmW beamforming frames in all directions, some of which are received at the new STA which sends 425 a response back, after which a connection 426 can be established between these two nodes. Also in this manner, Neighbor-3 398 is seen beamforming 428 by sending mmW beamforming frames in all directions, but none of them is received by the new STA, and thus no response is generated by the new node.

4.8.2. Coordination through Potential Neighbors Knowledge

Figure 26:
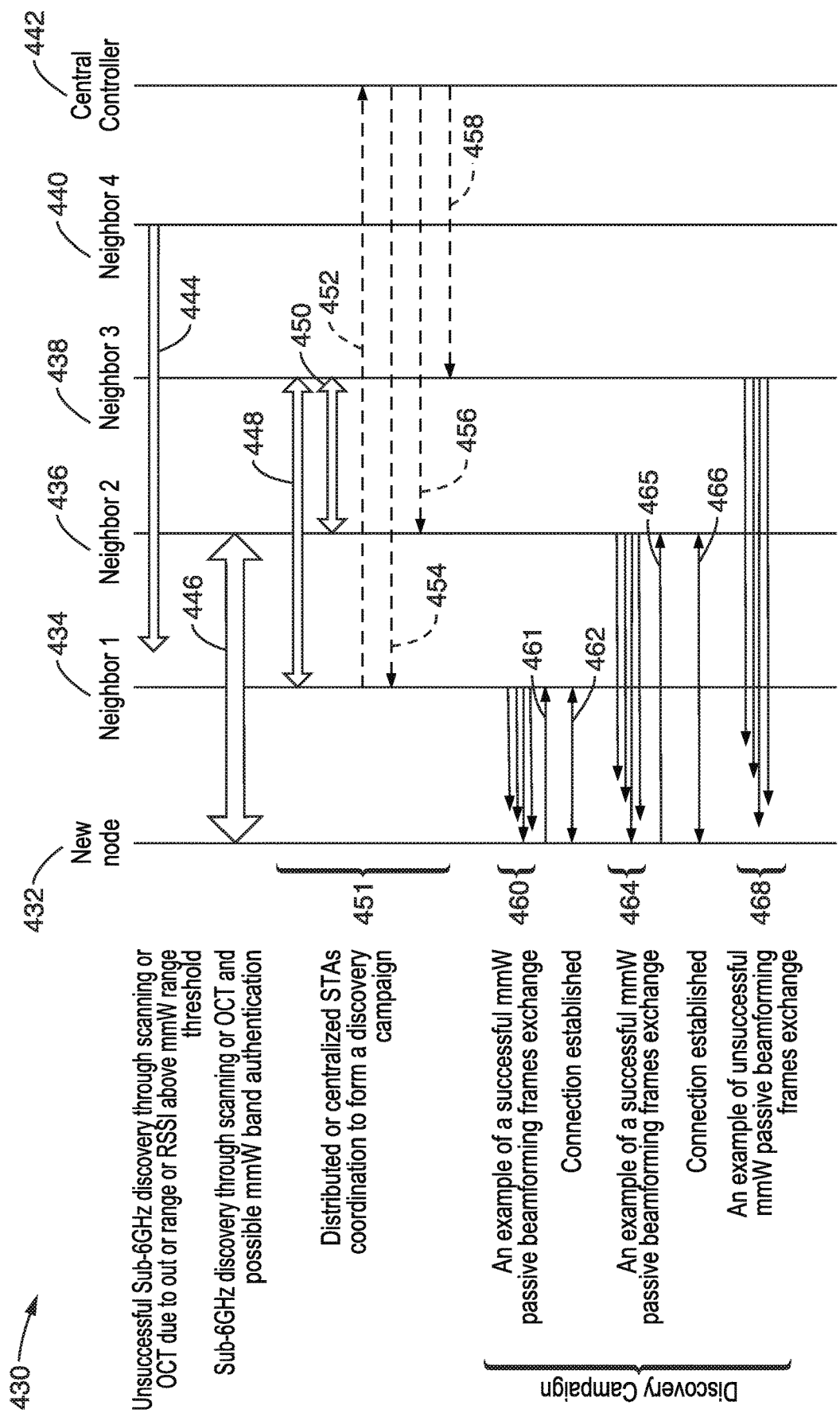
FIG. 26 is a message passing diagram for out of band DN assisted discovery performed through coordinated mmW discovery gained through potential neighbor knowledge according to an embodiment of the present disclosure.

FIG. 26 illustrates another example embodiment 430 of mmW discovery campaign with a new node 432, Neighbor-1 434, Neighbor-2 436, Neighbor-3 438, Neighbor-4 440, and Central Controller 442 (may be present in some instances). The discovered STA that is contacted by new STA coordinates with all STAs in the new STA geographical discovery zone to start a discover campaign for the new STA. The STAs contacted comprise all potential neighbors of the new STA based on an estimate that depends on the discovered STA(s) (STAs in its geographical discovery zone). The new STA listens to the sub-6 GHz band until it discovers at least one neighbor. The new STA responds to this neighbor on the sub-6 GHz band informing it about the interest to peer with it on the mmW band. Based on the data collected from sub-6 GHz scanning, the discovered STA coordinates a discovery campaign for the new STA. Coordination should take interference and scheduling of resources into account. A central controller can be used for managing this coordination or it can be performed in a distributed fashion.

A sub-6 GHz discovery 444 of Neighbor-4 440 is unsuccessful where the STA is out of mmW range. However, a sub-6 GHz STA discovery 446 for Neighbor-2 436 is successful.

DN coordination is performed 451 to form a discovery campaign. Neighbor-2 coordinates with potential neighbors to setup the discovery campaign. The coordination is illustrated with an abstraction showing communications 448, 450 for the sake of simplicity. This coordination can be through reaching out to all potential neighbors of the new STA and coordinating the sequence or the time over which each STA will start transmitting its discovery beacons. Coordination should take interference and scheduling of resources into account. If present and active, the present disclosure is configured to allow a central controller 442 to manage this coordination, such as by example communications 454, 456, 458, or it can be performed in a distributed fashion.

Once the discovery campaign is completed, then the new STA can use mmW communications with the neighbors in the DN. In the figure Neighbor-1 434 is seen sending 460 mmW beamforming frames in all directions, some of which are received at the new STA which sends a response 461 back, after which a communication connection 462 can be established. Similarly, Neighbor-2 436 is seen sending 464 mmW beamforming frames in all directions, some of which are received at the new STA which sends 465 a response back, after which a communication connection can be established 466. Also in this manner, Neighbor-3 438 is seen sending 468 mmW beamforming frames in all directions, but none of them is received by new STA 432.

4.8.3. Discovery Campaign Scheduling

In the following protocols and examples it is assumed that all DN STAs are synchronized but the BI of each need not strictly start and finish at the same time. The same protocol can be used when the BI starts and finishes at the same time without any loss of generality.

4.8.3.1. Discovery Assistance through mmW Discovery Beacons

Figure 27A:
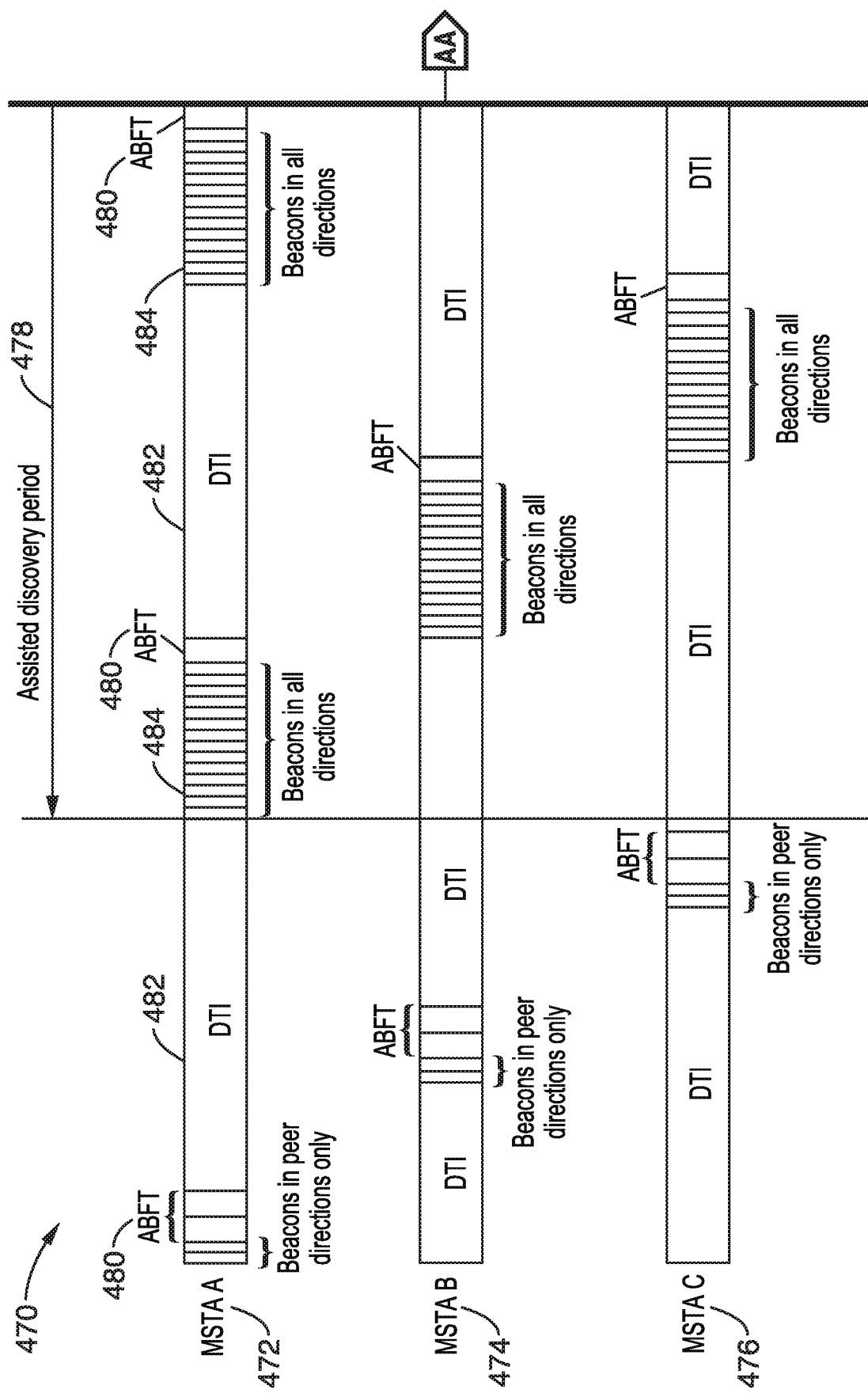
FIG. 27A and FIG. 27B is a communication period diagram depicting discovery assistance utilizing mmW discovery beacons according to an embodiment of the present disclosure.
Figure 27B:
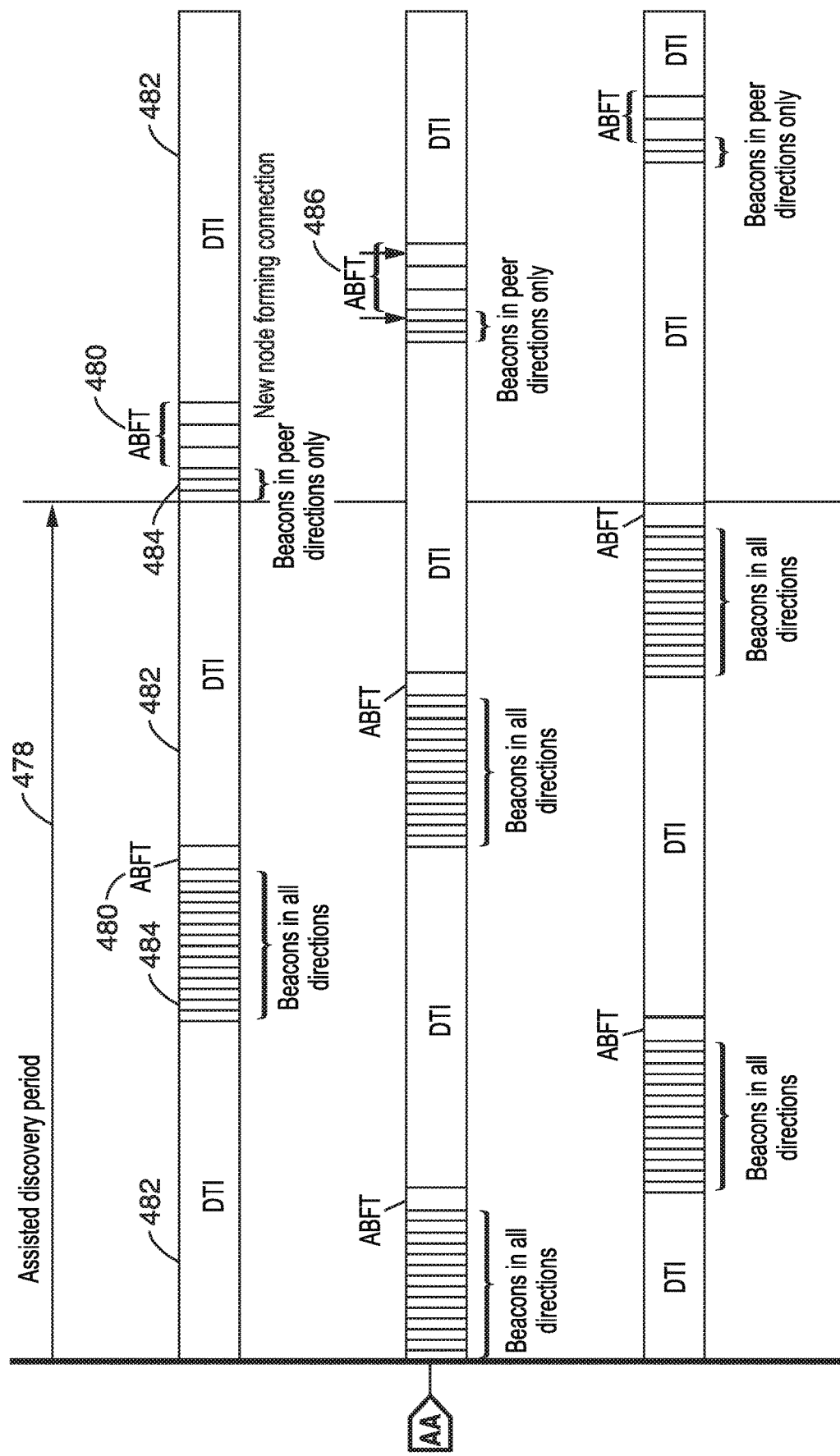

FIG. 27A and FIG. 27B illustrate an example embodiment 470 of discovery assistance through mmW discovery beacons. The example depicts transmissions for MSTA A 472, MSTA B 474 and MSTA C 476, and an assisted discovery period 478. STAs participating in the discovery campaign switch to discovery mode on the mmW band to allow beamforming their antennas in the mmW band with the new STA. In DN STA A 472, for example, are seen ABFT period 480, then DTI period 482, and it can be seen that beacons are sent 484 in all directions with additional ABFT 480 during the assisted discovery period. The assisted discovery period consists of number of BI where beacons are transmitted in all directions. Outside the assisted discovery period beacons might be transmitted only to peer STAs or not transmitted at all.

Thus, the figure shows switching to transmitting beacons through all antennas in the beacon transmission period. STAs will return back to transmitting only beacons to peer STAs or not transmit beacons at all after the assisted discovery period or after discovering the new STA. Before the STAs start transmitting beacons, the ABFT period for the DN STA comprises slots for each of the peer beacons transmitted. This makes the number of slots for SSW frame exchange equal to the number of peers. When the DN STA switches to sending discovery beacons, it adds one or more new slots for the new STA or STAs. At the end of the discovery phase the DN STA can end up with a connection with the new STA and it permanently allocates a slot for it in the ABFT as seen with DN STA B. In another design, the beacon might not be transmitted at all outside the assisted discovery period.

4.8.3.2. Discovery Assistance through Beamforming Scheduling

Figure 28:
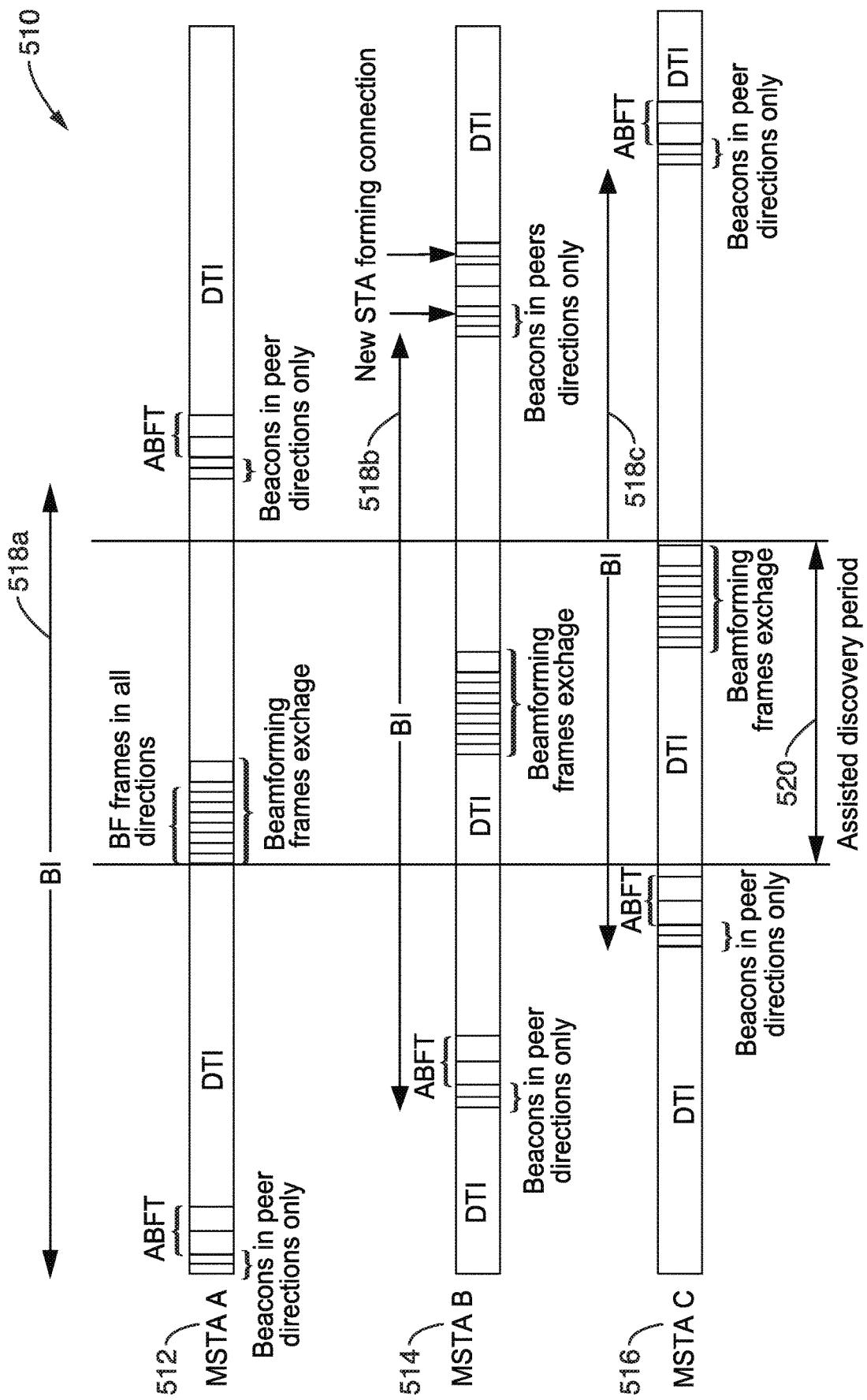
FIG. 28 is a communication period diagram depicting Discovery assistance through beamforming scheduling in a contiguous period according to an embodiment of the present disclosure.
Figure 29:
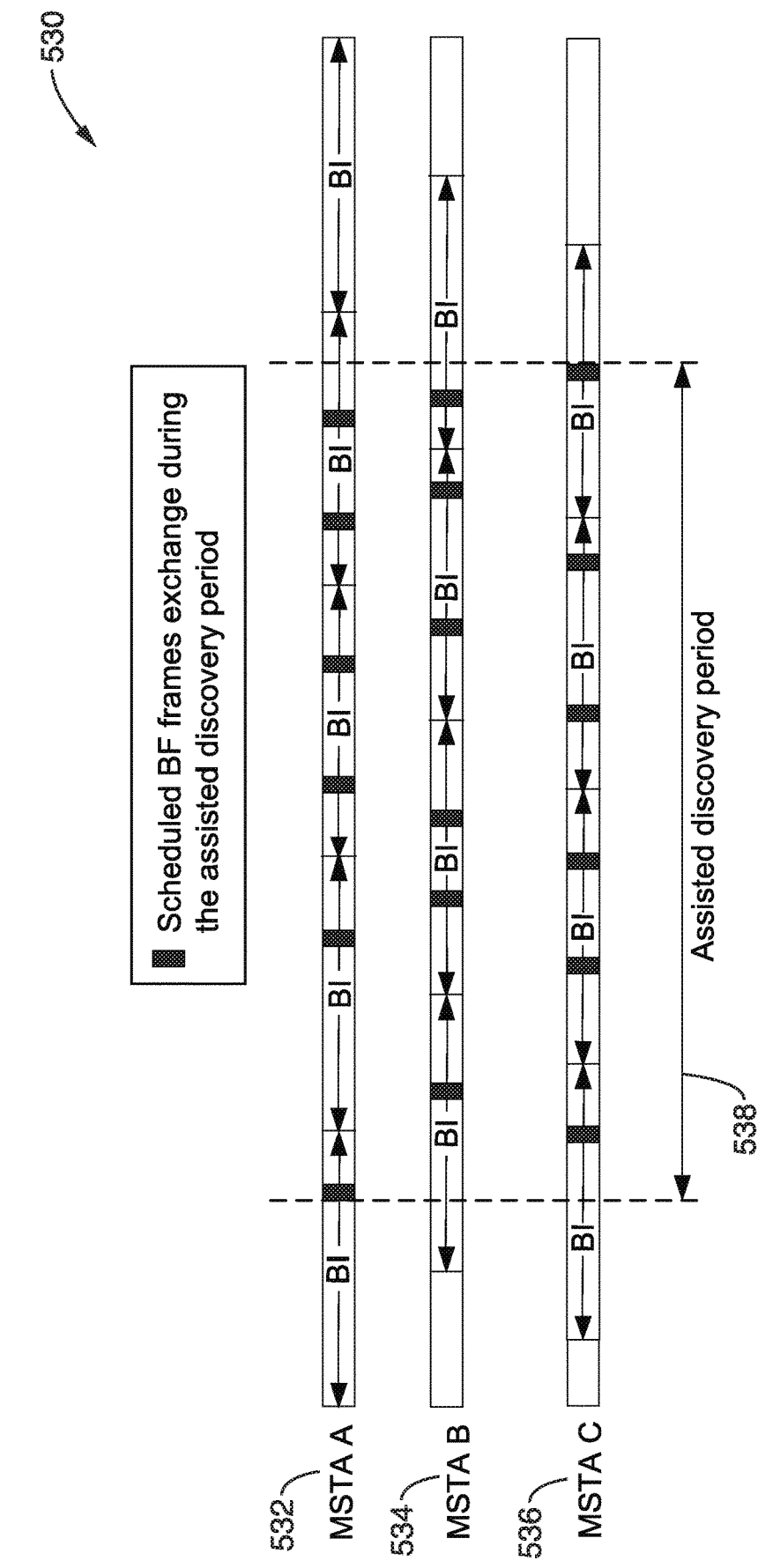
FIG. 29 is a communication period diagram depicting discovery assistance through beamforming scheduling in a non-contiguous period according to an embodiment of the present disclosure.

FIG. 28 and FIG. 29 illustrate example embodiments 510, 530 of discovery assistance through scheduling a beamforming campaign in the DTI period. In the figures transmissions are scheduled through all antenna sectors in the DTI period. The STAs might repeat the transmission of the beamforming frames for many cycles depending of the capabilities of the new STA as discovered over the sub-6 GHz band.

Each figure depicts transmissions for STA A (512, 532), STA B (514, 534), and STA C (516, 536). In STA A for example are seen ABFT period, then DTI period, with assisted discovery periods 520, 538 being scheduled during that DTI period. The assisted discovery period is scheduled such that STAs in the discovery campaign alternate the transmission of beamforming frames and listening for feedback from the new STA. STA A transmits beamforming frames in all directions followed by a period to receive a feedback from the new STA. After that STA B and STA C repeats the same procedure. This concludes the scheduled assisted discovery period. The transmission of the beamforming frames can be repeated more than once inside the assisted discovery period depending of the capabilities of the new STA as discovered by the sub-6 GHz and to achieve some reliability and make sure that the new STA will receive the beamforming frame if in range. The order over which STA A, STA B and STA C are scheduled and timing can be chosen to achieve any objective (interface avoidance or channel blocking). The transmission of the beamforming frames can also be noncontagious where some frames are scheduled to be transmitted from some directional beams at a period of time and other frames from other directional beams at another scheduled period of time.

Thus, as seen in the figure, at the end of each beamforming frames transmission cycle, transmitting BF frames from all antenna sectors, a slot is assigned for BF feedback frame exchanges (SSW frames for example). If peer beacons are required to be transmitted, at the time of beacon transmission in the regular frame, and the new STA got connected to the DN STA, a peer beacon and an assigned SSW slot is added to the DN STA and dedicated to the new STA as seen with DN STA B.

It will be noted that in FIG. 28 beacon intervals (BI) are staggered 518*a*, 518*b* and 518*c*, while the assisted discovery period 520 following in a period of time common to a portion of the BI of each STA. Then as seen in FIG. 29, to avoid blocking the DTI period for a long time, the assisted discovery period 538 is scheduled over multiple BIs and their associated DTIs. The BF frames exchange can be scheduled during the assisted discovery period and data transmission can also be scheduled in between when beamforming frames are not transmitted and channel not blocked.

4.8.3.3. Discovery assistance through active scanning

Discovery assistance according to the present disclosure can utilize active scanning to help the new STA connect with multiple STAs in the DN.

Two protocol are proposed here:

(a) Non-synchronized active scanning:

A new STA starts transmitting probe request over the mmW band in all direction and listens for feedback of a probe response from DN STAs. DN STAs are expecting the new STA and freeing themselves to listen to the new STA probe response. After a assisted discovery period, the new STA stops transmitting the probe requests.

Figure 30:
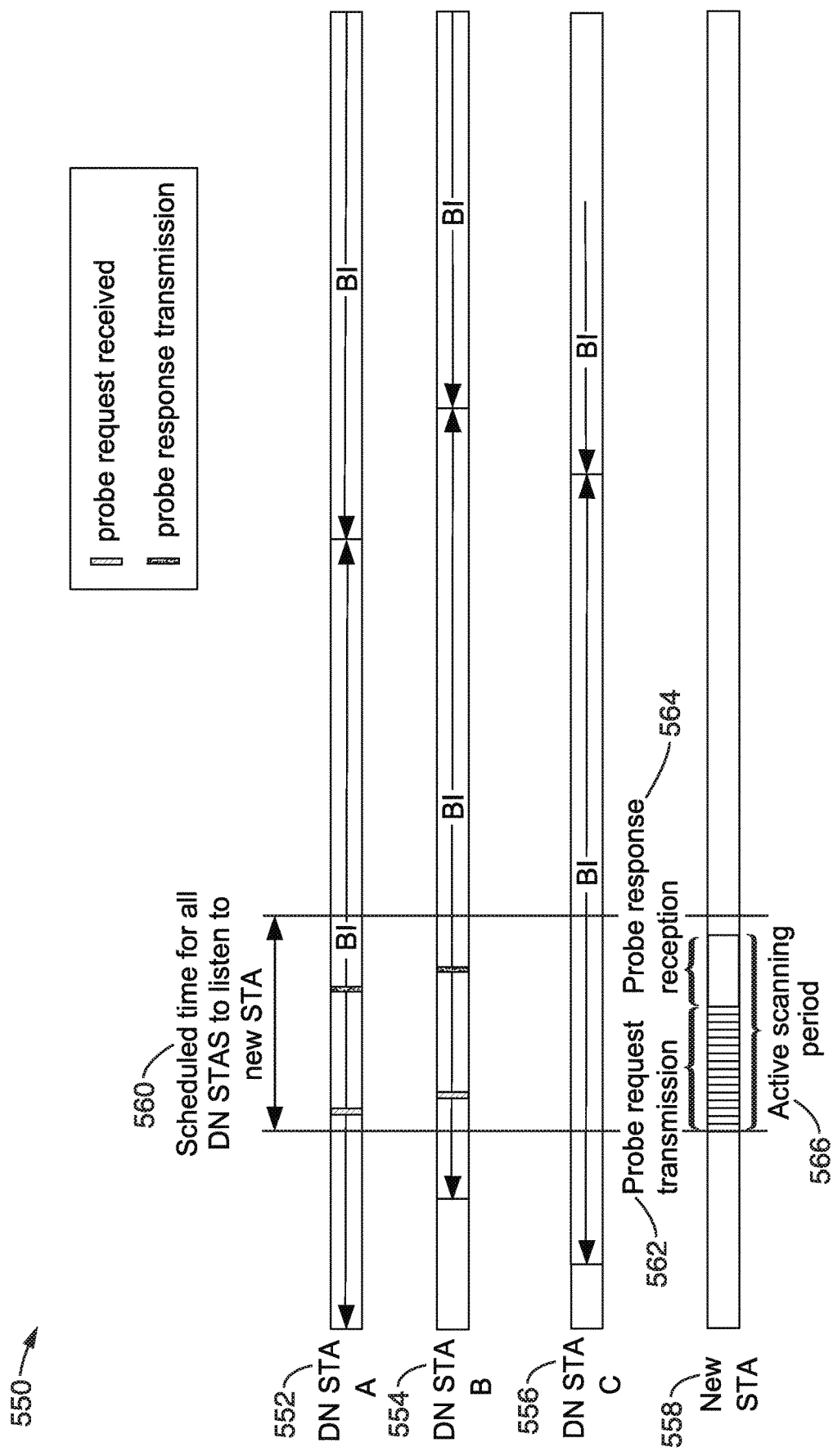
FIG. 30 is a communication period diagram depicting discovery assistance through non-synchronized active scanning according to an embodiment of the present disclosure.

FIG. 30 illustrates an example embodiment 550 of a new STA 558 transmitting probe requests 562 and listening 564 for probe responses from the other STAs, shown as DN STA A 552, DN STA B 554, and DN STA C 556, during an active scanning period 566. It will be noted that upon a probe request generated by the new station, that a scheduled time 560 is created for all DN STAs to listen to the new STA. DN STAS are thus setting aside a portion of their resources for listening for probe requests from the new STA. If the probe request is received from the new STA, the DN STA responds with a probe response.

(b) Synchronized Active Scanning:

Synchronized active scanning is described for preventing the new STA from blocking the channel for a long period of time, which can be important in the situation in which not all DN STAs may be willing to free their resources and only listen for the new STA probe request for the scheduled time. Through the information gathered from the sub-6 GHz band, one of the STAs discovered will transmit BF frames to the new STA on the mmW in all directions. The new STA will start passive scanning over the mmW band to search for the this STA. Once the STA is found and the new STA is synchronized with the DN, the new STA starts active scanning for more DN STAs. The DN can allocate some time for the new STA to transmit its probe requests to the DN STAs and other time for DN STAs response. This time can be allocated in a distributed manner (distributedly) or through a central controller to avoid interference and to make sure other DN STAs are free to listen. The DN STAs are expecting the STA and will free their resources at the scheduled time for the new STA probe request transmission and respond if received at dedicated time.

Figure 31:
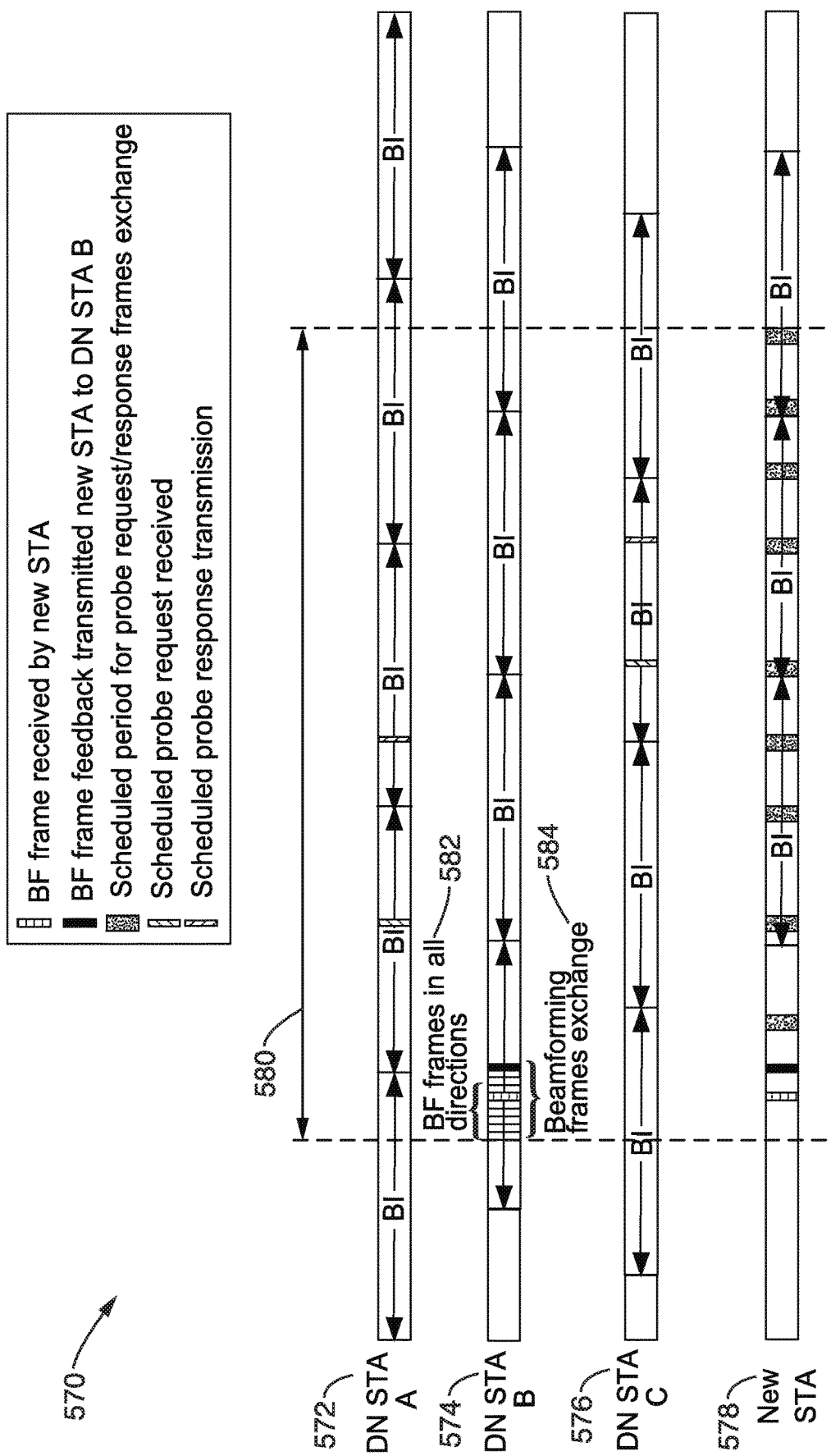
FIG. 31 is a communication period diagram depicting discovery assistance through synchronized active scanning according to an embodiment of the present disclosure.

FIG. 31 illustrates an example embodiment 570 of a number of stations DN STA A 572, DN STA B 574, DN STA C 576 and new STA 578. In the figure DN STA B 574 is transmitting 582 BF frames in all directions, and exchanging 584 BF frames with new STA 578. After Beamforming with the new STA, the new STA is informed about a schedule 580 to use the channel for transmitting and receiving probe request and probe response. Throughout this period 580 other DN STAs are aware of the schedule and will be listening for the new STA frames and respond if received. The transmission of the probe request can be in all directional beams or omni directional and can be repeated as many times as necessary to make certain that frames are received by all potential neighbors. The transmission of the frames can be non-contagious to avoid blocking the channel for long time.

4.9. Option A: Frames Format and WLAN Implementation 4.9.1 Multi-Band Discovery Assistance Information Element FIG. 32 illustrates an example embodiment 590 of a new information element configured for carrying information about DMG capability in devices operating on the sub-6 GHz band to assist in discovery on the mmW band. This information element comprises the following information:

Element ID: is the identification of this information element.

Length: is the length of this information element.

Request/response DN discovery assistant: a flag that if true indicates that a STA requesting discovery assistance on the band defined by the operating class, Band ID and channel number. This indicate that the STA sending this element is offering or willing to receive assistance to perform node discovery on the band defined by the operating class, Band ID and channel number. If false, this indicates that the frame is a response to a request for discovery assistance on the band defined by the operating class, Band ID and channel number, and that the STA sending this element is offering or willing to receive assistance to perform node discovery on the band defined by the operating class, Band ID and channel number.

Total number of transmitting training sectors: this value indicates the total number of transmit sectors used by the STA transmitting this element for beamform training in the band defined by the operating class, Band ID and channel number. This number is utilized by the receiving node to set the beamforming period and adjust beamforming parameters.

Total number of receiving training sectors: this value indicates the total number of receive sectors used by the STA transmitting this element for beamform training in the band defined by the operating class, Band ID and channel number. This number is utilized by the receiving node to set the beamforming period and adjust beamforming parameters.

Number of training cycles: this value indicates the number of cycles the training initiator will repeat the training pattern. This number is utilized by the receiving node to set the beamforming period and adjust beamforming parameters.

DMG antenna reciprocity: this value is utilized by the receiving node to set the beamforming period and adjust beamforming parameters. It will be noted that Antenna reciprocity is assumed, with sectors used for transmission being used for reception.

Connection capability: a value indicating the connection capability supported by the STA on the channel and band indicated in that element (DN, AP, PCP, IBSS, DLS, TDLS). This value is utilized to decide on the type of connection which will be setup on the band defined by the operating class, Band ID and channel number.

Operation Class: this value indicates the operating class of the channel set over which the multi-band applies and the node transmitting this element is operating on. The node receiving this element should support the band ID to be able to connect with the transmitting node.

Band ID: this value is an identification of the frequency band related to the operating class over which the node transmitting this element is operating on. The node receiving this element should support the band ID to be able to connect with the transmitting node.

Channel Number: this value indicates the number of the channel over which discovery will happen. The node transmitting this element is expected to transmit or receive discovery signal over this channel. The node receiving this element should support the band ID to be able to connect with the transmitting node.

BSSID: this value indicates the ID of the Basic Service Set (BSS), thus it is the BSSID of the BSS operating on the channel and frequency band indicated in the information element if a BSS is defined. The receiving node can search (look) for this BSSID once it starts discovery on the band defined by the operating class, Band ID and channel number.

Other mmW discovery/channel access/scheduling information (optional): this optional information is related to channel access and scheduling in the mmW band. This information is used to guide the receiving node to when and for how long to transmit, and for expecting the discovery signal on the band defined by the operating class, Band ID and channel number.

4.9.2. Multi-band Discovery Assistance Request Public Action Frame

FIG. 33 illustrates an example embodiment 600 for a new public action frame defined to carry information about DMG capability and operating bands in devices operating on the sub-6 GHZ band to assist in the discovery in the mmW band. The Multi-band Discovery Assistance Request Public Action Frame is used to request discovery assistance on the band defined by the operating class, band ID and channel number. This frame indicates that the STA sending this frame is offering or willing to receive assistance to perform node discovery on the band defined by the operating class, band ID and channel number. This action frame contains a category field, and a public action field which are defined in the 802.11 standard and are used to indicate the type of action frame the purpose of sending it, followed by fields which were defined already in regard to FIG. 32.

4.9.3. Multi-band Discovery Assistance Response Public Action Frame

FIG. 34 illustrates an example embodiment 610 of a new public action frame defined to carry information about DMG capability and operating band in devices operating on the sub-6 GHz band to assist discovery in mmW bands. The frame is a response to receiving a multi-band discovery assistance request public action frame. This frame is utilized to indicate approval to a discovery assistance on the band defined by the operating class, band ID and channel number, thus accepting the offer from the STA sending this frame which has offered to provide assistance for node discovery on the band defined by the operating class, band ID and channel number. This action frame contains the same fields as seen in FIG. 33, as the response frame can contain the same information as the request to declare the status on the other side. However, it should be noted that the frame type would be different for indicating that the frame is associated with response and not the request. In a typical implementation, some fields may be dropped from the request and/or the response, but all were added to this embodiment for the purpose of generalization.

4.9.4. Possible Modification to DMG Capability Element

The DMG capability element can be utilized to relay information about DMG capability related to the discovery in the mmW band if it is transmitted over the sub-6 GHz band and the multi-band element is transmitted along this element.

It is needed to add one bit that represents a DN assistance offer or request for discovery. This also will indicate that the DMG capability is not for this band but for other band defined in the multi-band element. This Element should be enabled to be sent with regular WLAN 802.11 frame FIG. 35 illustrates an example embodiment 620 of DMG capability information element. The frame has the following fields: Element ID, Length, STA address, AID, DMG STA capability information, DMG AP or PCP capability information, DMG STA beam tracking time limit, extended SC MCS capabilities, maximum number of basic A-MSDU subframes in A-MSDU, and maximum number of short A-MSDU subframes in A-MSDU.

These fields are not described further as they are from the IEEE 802.11 standard.

FIG. 36A through FIG. 36C illustrates an example embodiment 630, 640 and 650 for 5 DMG STA capability information field. These fields are not described further as they are from the IEEE 802.11 standard.

In a preferred embodiment of the present disclosure the data of B62 in FIG. 36C is being utilized as an indication of a sub-6 GHz to mmW discovery assistance request or offer. By way of example, if this bit is set to a first state (e.g., 1), then in addition to the availability of multi-band element being active it means that the node is operating in mmW and requests/offers mmW discovery assistance.

4.9.5. Multi-band discovery assistance request and response action frames usages.

FIG. 37A through FIG. 37C illustrate example embodiments 670, 680, 690 depicting various cases of sending MB discovery assistance frames with sub-6 GHz communication between a new STA and a DN STA. The following cases trigger the transmission of a Multi-band discovery assistance request from once WLAN device to the other.

In FIG. 37A the example 670 shows reception of a beacon frame with a multi-band information element (MB IE). The node is interested in forming connection on the band defined in the element, and new station sends an MB discovery request and receives an MB discovery response, wherein each side initiates an mmW MLME.

In FIG. 37B the example 380 shows the new STA sending a probe request with MB IE, to which the DN STA responds with a probe response containing MB IE. Upon reception of this probe response frame with a multi-band capability element (MB IE), the new STA sends an MB discovery request, to which the DN STA responds with an MB discovery response, after which both sides initiate an mmW MLME.

In FIG. 37C the example 390 shows a new node broadcasting the Multi-band discovery assistance request as an active scanning of nodes that can receive the frame and send back a multi-band discovery assistance response, after which both sides initiate an mmW MLME.

In these cases, once a multi-band discovery assistance request is received by the DN STA, a multi-band discovery assistance response frame is sent back to the initiator. Upon frame exchange completion the sub-6 GHz MLME in both STAs informs the mmW MLME to start (initiate) mmW discovery.

It should be appreciated that in at least one embodiment, the STAs on the sub-6 GHz band are configured for authenticating the new node first before initiating the mmW MLME to avoid any security concerns. This can be performed after receiving the MB discovery request or upon discovering the new STA on the sub-6 GHz band.

4.9.6. WLAN Implementation

4.9.6.1. Sub-6 GHz Passive mmW Discovery

FIG. 38A through FIG. 38C illustrate example beacons transmission options 710, 720 and 730 on the sub-6 GHz band with these options. In embodiment 710 of FIG. 38A beacons are transmitted with multiband discovery assistant Information element. In embodiment 720 of FIG. 38B beacons are transmitted with the modified DMG capability Information element and the multi-band information element. In embodiment 730 of FIG. 38C beacons are transmitted with the multi-band information element only.

A New node receiving the beacons gets information about the multi-band capability of the other node. The new node responds to the DN node to inform the DN node of the existence of the new node and the request to be assisted for discovery on the mmW band.

The response can be performed in a number of different ways, including the following. (a) Performing the response by sending the multi-band discovery assistance request public action frame to the DN node. (b) Performing the response by adding the multiband discovery assistance information element (DA IE) to a probe request frame and sending it to the DN node. (c) Performing the response by adding the multiband discovery assistance information element to an association request or reassociation request frame and sending it to the DN node. (d) Performing the response by adding the modified DMG capability information element and the multi-band information element to a probe request frame and sending it to the DN node. (e) Performing the response by adding the modified DMG capability Information element and the multi-band information element to an association request frame or reassociation request and sending it to the DN node.

Upon receiving any of these frames, if the beacon has already included the DMG capability of the DN node or the multi-band discovery assistance element, then the DN node sub-6 GHz MLME can directly inform the mmW MLME through a message to start discovery on the mmW band and forward DMG capability of the new node to the mmW MLME.

If the DN node sub-6 GHz beacon did not include the DMG capability element or the multi-band discovery assistance element, the DN sub-6 GHz STA has to respond to the new STA to inform it about its mmW band capability. The DN node sub-6 GHz MLME can inform the mmW MLME through a message to start discovery on the mmW band and forward DMG capability of the new node to the mmW MLME after sending the response to the new node.

This response can be provided in a number of ways, exemplified, but not limited to the following. (a) Responding by sending a multi-band discovery assistance response public action frame to the DN node if a Multi-band discovery assistance request public action frame was received. (b) Responding by sending a probe response with the multiband discovery assistance Information element if a probe request was received with that information element. (c) Responding by sending an association/reassociation response with the multiband discovery assistance Information element if an association/reassociation request was received with that information element. (d) Responding by sending a probe response with the modified DMG capability information element and the multi-band information element to a probe request frame, if a probe request was receive with that information element. (e) Responding by sending an association/reassociation response with the modified DMG capability information element and the multi-band information element to a probe request frame if an association/reassociation request was received with that information element.

FIG. 39A through FIG. 39C, and FIG. 40A through FIG. 40C illustrates these example embodiments 740, 750, 760, 770, 780 and 790. It should be appreciated that in each case using the discovery assistance information element (DA IE) is always equivalent to using the modified DMG capability and multi-band information (MB IE) elements.

Figures 39A, 39B, 39C:
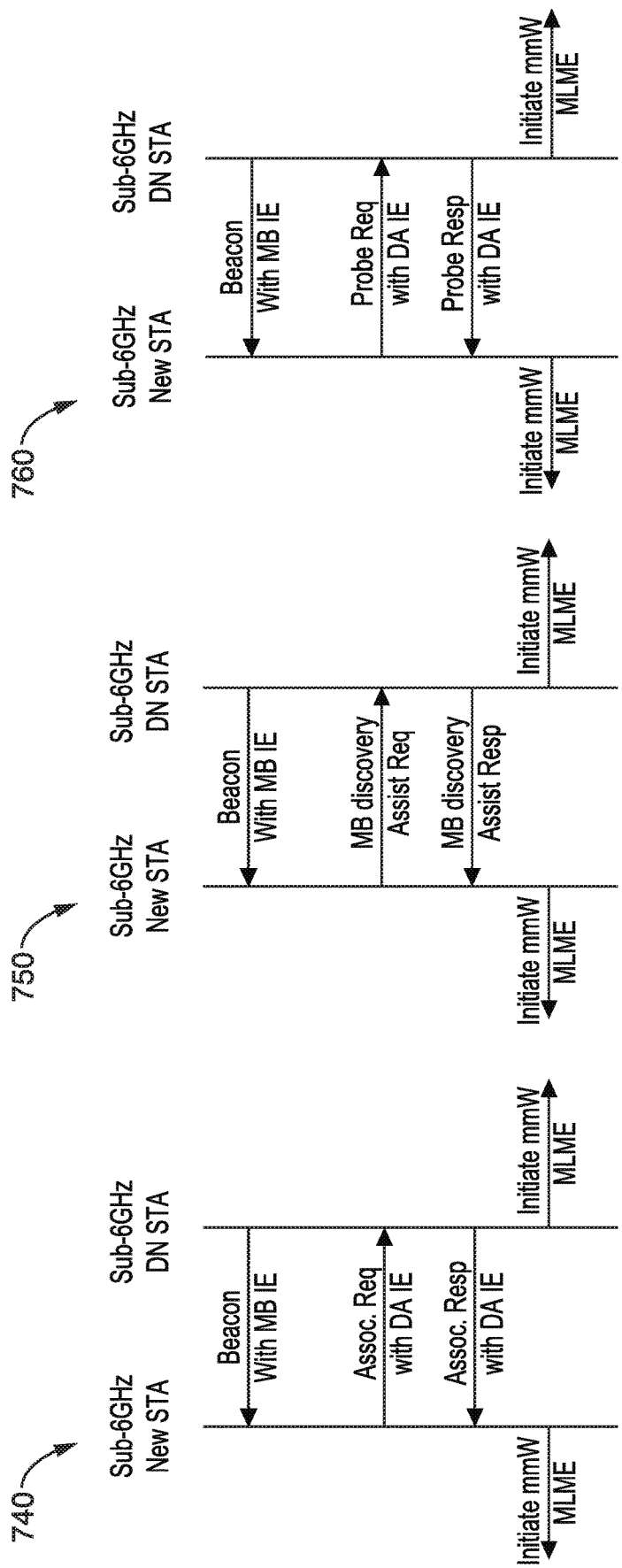
FIG. 39A through FIG. 39C are message passing diagrams for option A in a second example of sub-6 GHz passive mmW discovery according to an embodiment of the present disclosure.

In each of the FIG. 39A through FIG. 39C beacons are transmitted from the DN STA containing multiband information element (MB IE). In response to which the new STA sends and association request in FIG. 39A, an MB discovery assistance request in FIG. 39B, and a probe request with DA IE in FIG. 39C. In response to this, the new STA responds to the type of request sent while including a DA IE. After the exchange both sides initiate mmW MLME.

4.9.6.2. Sub-6 GHz Active mmW Discovery

A probe request in the present disclosure is transmitted on the sub-6 GHz band from a new STA with a number of options, such as the following. (a) A probe request is transmitted with a multiband discovery assistance information element (DA IE). (b) A probe request is transmitted with the modified DMG capability Information element and the multi-band information element. (c) A probe request is transmitted with the multi-band information element only.

A STA receiving the probe request receives information about the multi-band capability of the other node. A DN node responds to the new node to inform the new node of its existence and offer assistance for discovery on the mmW band.

The response to the probe request is preferably performed according to the present disclosure in one of the following manners. (a) Responding to the probe request by adding the multiband discovery assistance information element to a probe response frame and sending it to the new node if a probe request is received with a multiband discovery assistance Information element. (b) Responding to the probe request by adding the modified DMG capability Information element and the multi-band information element to a probe response frame and sending it to the new node if a probe request is received with the modified DMG capability information element and the multi-band information element. (c) Responding to the probe request by adding the multi-band information element to the probe response and sending it to the new node if a probe request is transmitted with the multi-band information element only. This should trigger the exchange of multi-band discovery request and response public action frames between the new node and the DN node.

Upon the completion of any of these frame exchanges, the DN node sub-6 GHz MLME can directly inform the DN node mmW MLME through a message to start discovery on the mmW band and forward DMG capability of the new node to the mmW MLME.

In each of the FIG. 40A through FIG. 40C the new station initiates the action by sending a communication that includes a discovery assistance (DA) request. In FIG. 40A a probe request is sent with DA IE, in FIG. 40B a MB discovery assistance request is sent, and in FIG. 40C, a probe request is sent with MB IE. Thus, according to the present disclosure active multi-band discovery assistance is sought by the new STA, after which it waits for a response to be received. In FIG. 40B this MB DA can occur without exchanging the probe request and probe response frames in case the node has no interest in forming a connection on the sub-6 GHz with other DN-nodes. In response to this, the DN STA responds to the type of request sent while including a DA IE or MB IE. It will be noted that in FIG. 40C the probe exchange is followed by an MB assistance request and response exchange. After these exchanges, both sides initiate mmW MLME.

4.9.6.3. Sub-6 GHz Band OCT mmW Discovery

As discussed in a previous section the new node forms a link with the DN node on the sub-6 GHz band and associates to that node. The new node is aware of the multi-band capability of the DN node as it is broadcasted in the beacon frame or other management frames.

Figure 41:
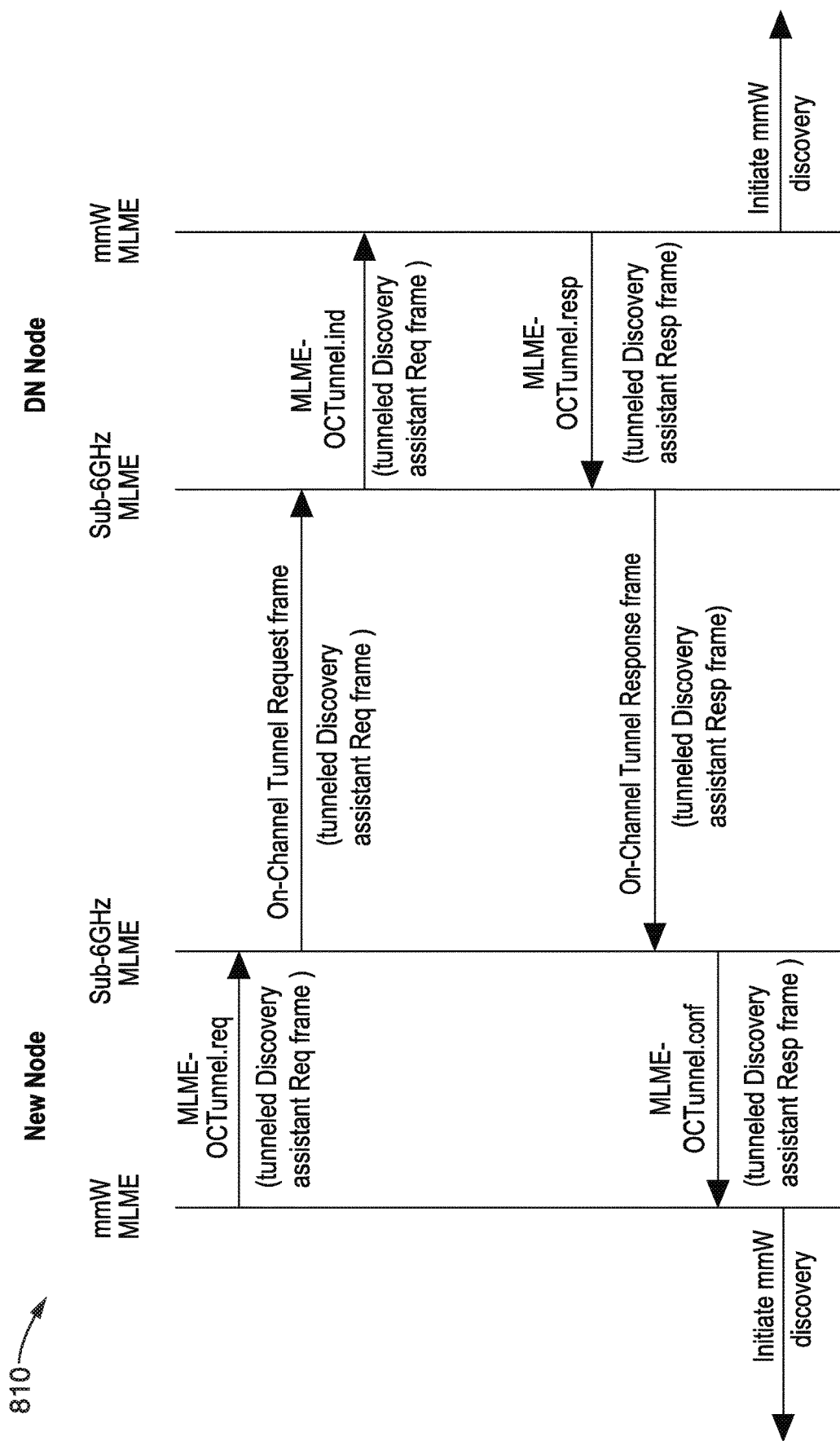
FIG. 41 is a message passing diagram for an option A example of sub-6 GHz band OCT mmW discovery according to an embodiment of the present disclosure.

FIG. 41 illustrates an example embodiment 810 of performing a sub-6 GHz OCT mmW discovery. In the figure it will be seen that a tunneled discovery assistance request (MLME-OCT. request) frame is sent from mmW MLME to the sub-6 GHz MLME, which sends and OCT request from to the sub-6 GHz MLME of the DN STA, which sends an MLME OCT indication to its mmW MLME, which responds back. The DN node sub-6 GHz MLME responds back by sending an OCT response frame to the sub-6 GHz MLME of the DN node, which sends an on-channel tunnel response frame to the sub-6 GHz MLME of the new node, and this is then passed as an OCT confirmation to the mmW MLME, which initiates mmW discovery along with the DN STA.

Thus, it is seen that the new node mmW MLME initiates an OCT MLME request with the new node sub-6 GHz MLME and sends the multi-band discovery assistance request public action frame as an MMPDU associated with the OCT request. The new node sub-6 GHz MLME sends an OCT request and associated with it the multi-band discovery assistance request public action frame to the DN node sub-6 GHz MLME. DN node sub-6 GHz MLME forwards an MLME OCT indication and associated with it the multi-band discovery assistance request public action frame to the DN node mmW MLME. The DN node mmW MLME initiates a OCT MLME request with the DN node sub-6 GHz MLME to send a response. This response is a multi-band discovery assistance response public action frame as an MMPDU associated with the OCT request. The DN node sub-6 GHz MLME sends an OCT request and associated with it the multi-band discovery assistance response public action frame to the new node sub-6 GHz MLME.

The new node sub-6 GHz MLME forward an MLME OCT indication and associated with it the multi-band discovery assistance response public action frame to the new node mmW MLME. After the completion of this hand shaking, the DN node and the new node switch to the mmW band and starts the discovery procedure.

FIG. 42 illustrates an example embodiment 830 of an on-channel tunnel (OCT) request frame, including a discovery assistance request frame associated with it. The fields are seen as Category, FST Action (a type of frame defined in IEEE802.11 standard with FST standing for fast session transfer), Tunneled MMPDU frame control, Discovery Assistance request frame, and Multi-band element.

FIG. 43 illustrates an example embodiment 840 of an on-channel Tunnel (OCT) response frame with discovery assistance response frame associated with it. It will be noted that the figure depicts the response frame containing the discovery assistance response frame attached to it, while the OCT request frame of FIG. 42 contains a discovery assistance request frame.

4.9. Option B Frames Format and WLAN Implementation 4.10.1. Possible Modification to the Multi-band Element FIG. 44A and FIG. 44B illustrate an example embodiment 850, 860 of a Multi-band element, having fields seen as: Element ID, Length, Multi-band Control, Band ID, Operating Class, Channel Number, BSSID, Beacon Interval, TSF Offset, Multi-band Connection Capability, FST Session Timeout, STA MAC address (optional), Pairwise Cipher Suite Count (optional), and Pairwise Cipher Suite List (optional). It will be seen in the figure that multiple "m" fields for Pairwise Cipher Suite List can be included.

FIG. 45 illustrates the Control field of the Multi-band element seen in FIG. 44A and FIG. 44B, and has the fields of STA Role, STA MAC Address Present, Pairwise Cipher Suite Present, Discovery Assistance Enabled, and a Reserved field.

In this option B frame format a new subfield is added to the Multi-band Control field in B5 which reduces the number of reserved bits from 3 to 2 bits. The Discovery Assistance Enabled subfield indicates whether the STA support discovery assistance trigger for the BSS defined by the BSSID subfield on the band defined by the Band ID, operating Class and Channel Number subfields. If the Discovery Assistance Enabled subfield is set to 1, the STA transmitting this multi-band element supports discovery assistance for the BSS defined by the BSSID subfield on the band defined by the Band ID, operating Class and Channel Number subfields. If the Discovery Assistance Enabled subfield is set to 0, the STA transmitting this multi-band element does not support discovery assistance for the BSS defined by the BSSID subfield on the band defined by the Band ID, operating Class and Channel Number subfields. The Discovery assistance enabled bit is used to trigger the STA discovery assistance procedure in the STA receiving this element if it is enabled. If this bit is enabled, the STA receiving this element can request discovery assistance from the STA sending this element.

4.10.2.4 Multi-band Discovery Assistance Request element

FIG. 46A and FIG. 46B illustrates an example embodiment 880, 890 of a Multi-band Discovery Assistance element Request format. The Multi-band Discovery Assistance Request element contains a STA identifier and several fields that are used to advertise the support of discovery assistance in the identified band and capabilities in the identified band. This element is present in Discovery Trigger Request frame and can be present in Probe Request, Association Request and Reassociation Request.

The Multi-band Discovery Assistance Request element contains the following fields. The Element ID and Length fields define the ID of the element and its length. The format of the Discovery Assistance Discovery Assistance Request Control field is shown in FIG. 47. The element also contains a STA MAC Address, Number of TX Training Sectors field, Number of RX Training Sectors field, Antenna Reciprocity field, Band ID, Operating Class (optional), Channel Number (optional), BSSID (optional), Scanning Mode (optional), Discovery Assistance Window Length Request (optional), and a Reserved field.

The STA Address field contains the MAC address of the STA at the 60 GHz band, which is an example frequency used in the mmW band. The STA address is used to verify the identity of the STA on the 60 GHz band if the request is accepted and for authentication purposes.

The Number of TX Training Sectors subfield indicates the total number of transmit sectors the STA uses in a transmit sector sweep combined over all DMG antennas, including any LBIFS (LBIFS—long beamforming interframe space, which represent a spacing between beamforming frames as found in IEEE 802.11 standard) required for DMG antenna switching. The value of this subfield is in the range 1 to 128, with the value being equal to the bit representation plus 1. The DN STA (recipient of the element) uses this field to calculate the beamforming period length, adjust the beamforming parameters, estimate the amount of time the new STA will be scanning each direction, and determine the periodicity and rate of transmitting the beamforming frames or beacons.

The Number of RX Training Sectors subfield specifies the total number of receive sectors combined over all receive DMG antennas of the STA, including any LBIFS required for DMG antenna switching. The value represented by this subfield is in the range 2 to 128 and is given by (RXSS Length+1)×2. The DN STA (recipient of the element) uses this field to calculate the beamforming period length, adjust the beamforming parameters, estimate the amount of time the new STA will be scanning each direction, and determine the periodicity and rate of transmitting the beamforming frames or beacons.

The DMG Antenna Reciprocity subfield is set to 1 to indicate that the best transmit DMG antenna of the STA is the same as the best receive DMG antenna of the STA and vice versa and the transmit antenna pattern associated with an antenna weight vector (AWW) is the same as the receive antenna pattern for the same AWW. Otherwise, this subfield is set to 0. If the antenna reciprocity field is set, the DN STA schedules beamforming in one direction only (transmit or receive beamforming) if its antennas are reciprocal too. If not set, the transmitter and the receiver beams should be scheduled by the DN STA to be beamformed independently.

The Band ID field provides the identification of the frequency band related to the Operating Class and Channel Number fields.

Operating Class indicates the channel set for which the Multi-band element applies. Operating Class and Channel Number together specify the channel frequency and spacing for which the Multi-band element applies. This field is set to 0 to indicate all operating classes within the frequency band specified by the value of the Band ID field.

The Channel Number field is set to the number of the channel the transmitting STA is operating on or intends to operate on. This field is set to 0 to indicate all channels within the frequency band specified by the value of the Band ID field.

The Band ID, Operating Class and Channel Number identify the frequency and band of operation of the requested discovery assistance. The DN STA receiving this request shall provide discovery assistance through initiating the discovery assistance procedure on this band and frequency if the request is accepted.

The BSSID field specifies the BSSID of the BSS operating on the channel and frequency band indicated by the Channel Number and Band ID fields. If the request is accepted the DN STA should provide assistance on that BSS through initiating the discovery assistance procedure for this BSS identified by the BSSID.

The Scanning Mode subfield indicates scanning mode that is confirmed by the transmitter of this element. A value of 01 (binary) indicates that the STA transmitting this element performs discovery assistance for passive scanning. A value of 10 (binary) indicates that the STA transmitting this element performs discovery assistance for active scanning. A value 11 (binary) indicates that the STA transmitting this element performs discovery assistance for TDD channel access. A value of 00 (binary) is reserved. The DN STA shall transmit beamforming frames or beacons on the identified band if the request is accepted and the scanning mode is passive. The new STA shall transmit Probe Request or beamforming frames on the identified band if the request is accepted and the scanning mode is active. If access mode is TDD, DN STA transmit beamforming frames in a TDD access mode.

Discovery Assistance (Assistance) Window Length Request field contains the discovery assistance window length in TU. The new STA scans the mmW band or transmits beamforming frames on the mmW band for a period of time equals to the requested window length in case the request is accepted. The DN STA scans the mmW band or transmits beamforming frames on the mmW band for a period of time equals to the requested window length in case the request is accepted.

FIG. 47 illustrates an example embodiment 900 of a control field format for a Discovery Assistance Request, as was seen in FIG. 46. The BSSID Information Present subfield indicates whether the BSSID Information subfields (Band ID, Operating Class, Channel Number and BSSID) are present in the Discovery Assistance Request element. If the BSSID Information Present subfield is set to 1, the Band ID, Operating Class, Channel Number and BSSID subfields are present. If the BSSID Information Present subfield is set to 0, the Band ID, Operating Class, Channel Number and BSSID subfields are not present.

The Scanning Mode Present subfield indicates whether the Scanning Mode is present in the Discovery Assistance Request element. If the Scanning Mode Present subfield is set to 1, the Scanning Mode subfield is present. If the Scanning Mode Present subfield is set to 0, the Scanning Mode subfield is not present.

The Discovery Assistance Window Length Request Present subfield indicates whether the Discovery Assistance Window Length Request is present in the Discovery Assistance Request element. If the Discovery Assistance Window Length Request Present subfield is set to 1, the Discovery Assistance Window Length Request subfield is present. If the Discovery Assistance Window Length Request Present subfield is set to 0, the Discovery Assistance Window Length Request subfield is not present.

4.10.3. Multi-band Discovery Assistance Response Element

FIG. 48A and FIG. 48B illustrates an embodiment 910, 920 of a Multi-band Discovery Assistance Response element containing an STA identifier and several fields that are utilized to respond to a discovery assistance request in the identified band and capabilities in the identified band. This element is present in Discovery Trigger Response frame and can be present in Beacon, Probe Response, Association Response and Reassociation Response. At least one embodiment of the Multi-band Discovery Assistance Response element is formatted as follows.

The Element ID and Length fields define the ID of the element and its length. The Discovery Assistance Response Map field specifies the response of the discovery assistance request. The possible values of the Discovery Assistance Response Map field are indicated below.

00: Reject a discovery assistance request on the band defined by the Band ID, operating class, channel number and BSSID, reason other. The STA receiving this element will have to abort the discovery assistance procedure and optionally restart it again.

10: Accept a discovery assistance request on the band defined by the Band ID, operating class, channel number and BSSID. The STA receiving this information element shall process the information in the element and continue on the discovery assistance procedure. This includes transmitting or receiving beamforming frames or beacons.

01: Reject a discovery assistance request on the band defined by the Band ID, operating class, channel number and BSSID, reason unauthorized access. The STA receiving this element will have to abort the discovery assistance procedure and optionally restart it again.

11: Reject the discovery assistance feature the band defined by the Band ID, operating class, channel number and BSSID, reason scanning mode not supported. The STA receiving this element will have to abort the discovery assistance procedure and optionally restart it again.

The STA Address field contains the MAC address of the STA at the 60 GHz band. The STA address is used to verify the identity of the STA on the 60 GHz band if the request is accepted and for authentication purposes.

The Number of TX Training Sectors subfield indicates the total number of transmit sectors the STA uses in a transmit sector sweep combined over all DMG antennas, including any LBIFS required for DMG antenna switching. The value of this subfield is in the range 1 to 128, with the value being equal to the bit representation plus 1. The new STA uses this field to calculate the beamforming period length, adjust the beamforming parameters, estimate the amount of time the new STA will be scanning each direction, and determine the periodicity and rate of transmitting the beamforming frames or beacons.

The Number of RX Training Sectors subfield specifies the total number of receive sectors combined over all receive DMG antennas of the STA, including any LBIFS required for DMG antenna switching. The value represented by this subfield is in the range 2 to 128 and is given by (RXSS Length+1)×2. The new STA uses this field to calculate the beamforming period length, adjust the beamforming parameters, estimate the amount of time the new STA will be scanning each direction, and determine the periodicity and rate of transmitting the beamforming frames or beacons.

The DMG Antenna Reciprocity subfield is set to 1 to indicate that the best transmit DMG antenna of the STA is the same as the best receive DMG antenna of the STA and vice versa and the transmit antenna pattern associated with an AWV is the same as the receive antenna pattern for the same AWV. Otherwise, this subfield is set to 0. The new STA depending on this value performs beamforming for transmit beams or receive beams only (in case reciprocity is enabled) or for both transmit and receive beams in case reciprocity is not enabled.

The Band ID field provides the identification of the frequency band related to the Operating Class and Channel Number fields.

Operating Class indicates the channel set for which the Multi-band element applies. Operating Class and Channel Number together specify the channel frequency and spacing for which the Multi-band element applies. Valid values of Operating Class are shown in Annex E. This field is set to 0 to indicate all operating classes within the frequency band specified by the value of the Band ID field.

The Channel Number field is set to the number of the channel the transmitting STA is operating on or intends to operate on. This field is set to 0 to indicate all channels within the frequency band specified by the value of the Band ID field.

The Band ID, Operating Class and Channel Number identify the frequency and band of operation of the discovery assistance. The STA receiving this response shall expect discovery assistance and initiate the discovery assistance procedure on this band and frequency if the request is accepted.

The BSSID field specifies the BSSID of the BSS operating on the channel and frequency band indicated by the Channel Number and Band ID fields. If the discovery assistance is accepted the STA should expect assistance on that BSS and initiate the discovery assistance procedure for this BSS identified by this BSSID.

The Scanning Mode subfield indicates scanning mode that is confirmed by the transmitter of this element. A value of 01 (binary) indicates that the STA transmitting this element performs discovery assistance for passive scanning. A value of 10 (binary) indicates that the STA transmitting this element performs discovery assistance for active scanning. A value 11 (binary) indicates that the STA transmitting this element performs discovery assistance for time-division duplex (TDD) channel access, which is a channel access mode defined in IEEE802.11ay standard amendment. A value of 00 (binary) is reserved. The DN STA shall transmit beamforming frames or beacons on the identified band if discovery assistance is accepted and the scanning mode is passive. The new STA shall perform passive scanning if discovery assistance is accepted and the scanning mode is passive. The new STA shall transmit a Probe Request or beamforming frames on the identified band if discovery assistance is accepted and the scanning mode is active. The DN STA shall expect the new STA frames. If access mode is TDD, the DN STA transmits beamforming frames in a TDD access mode.

Discovery Assistance Window Length field contains the discovery assistance window length in time units (TUs). The new STA scans the mmW band or transmits beamforming frames on the mmW band for a period of time equals to the indicated window length in case the request is accepted. The DN STA scans the mmW band or transmits beamforming frames on the mmW band for a period of time equal to the indicated window length in case the request is accepted.

The scan sweep time field contains the time in TU of which the new STA is sweeping each of its receiving beam in case the scanning mode is passive scanning or is TDD mode. In case the scanning mode is active, this might represent the time in TU between each probe request transmission or it might not be used and can be ignored.

4.10.4. Discovery Trigger Request Frame Format

FIG. 49 illustrates an example embodiment 924 of the Discovery

Trigger Request (DT-REQ) Action frame. The frame has the following fields: 1: Category; 2: FST Action; 3: Multi-band; 4: DMG capability; 5: Multi-band Discovery Assistance Request.

The Category field and FST Action field define the type of the frame. The Multi-band field contains the Multi-band element of the MLME to which the STA is requesting to trigger discovery. The channel, frequency band and MAC address contained in this element are used to inform the peer STA about the frequency and STA to assist.

The DMG Capabilities field contains the DMG Capabilities element defined in the 802.11 standard of the DMG STA to which the discovery assistance is requested.

The Multi-band Discovery Assistance Request field contains the Multi-band Discovery Assistance Request element of the STA which is requesting to trigger discovery on the channel, frequency band defined. The element also contains information that helps the peer STA to optimize the discovery process.

4.10.5. Discovery Trigger Response Frame Format

FIG. 50 illustrates an example embodiment 926 of the Discovery Trigger Response (DT-RES) Action frame with fields as follows. 1: Category; 2: FST Action; 3: Multi-band; 4: DMG capability; 5: Multi-band Discovery Assistance Response.

The Category field and FST Action field define the type of the frame. The Multi-band field contains the Multi-band element of the MLME to which the STA is requesting to trigger discovery. The channel, frequency band and MAC address contained in this element are used to inform the peer STA about the frequency and STA to assist.

4.10.6 WLAN Implementation 4.10.6.1 Implementation Examples

FIG. 51A through FIG. 51C illustrates an example embodiment 930, 940, 950 of WLAN Implementation examples for Option B frames format. Each example illustrates interaction on the sub-6 GHz band between a new STA and a DN STA.

In FIG. 51A beacons are transmitted on the sub-6 GHz band with Multi-band element (MB IE) with the Discovery Assistance indicator enabled. The new STA receiving this beacon can transmit a Association Request frame with Multi-band element and Discovery Assistance Request element. DN STA responds to that frame by sending Association Response frame with Multi-band element and Discovery Assistance Response element. If request is accepted, mmW MLMEs are initiated in both STAs.

In FIG. 51B beacons are transmitted on the sub-6 GHz band with Multi-band element with the Discovery Assistance indicator enabled. The new STA receiving this beacon can transmit a Discovery Trigger Request frame with Multi-band element and Discovery Assistance Request element. The DN STA responds to that frame by sending Discovery Trigger Response frame with Multi-band element and Discovery Assistance Response element. If the request is accepted, mmW MLMEs are initiated in both STAs.

In FIG. 51C beacons are transmitted on the sub-6 GHz band with Multi-band element with the Discovery Assistance indicator enabled. The new STA receiving this beacon can transmit a Probe Request frame with Multi-band element and Discovery Assistance Request element. The DN STA responds to that frame by sending a Probe Response frame with Multi-band element and Discovery Assistance Response element. If the request is accepted, mmW MLMEs are initiated in both STAs.

In FIG. 51D the new STA transmits a Probe Request frame with Multi-band element and Discovery Assistance Request element. The DN STA responds to that frame by sending a Probe Response frame with Multi-band element and Discovery Assistance Response element. If the request is accepted, mmW MLMEs are initiated in both STAs.

In FIG. 51E the new STA transmits a Discovery Trigger Request frame with Multi-band element and Discovery Assistance Request element. DN STA responds to that frame by sending Discovery Trigger Response frame with Multi-band element and Discovery Assistance Response element. If the request is accepted, mmW MLMEs are initiated in both STAs.

In FIG. 51F Probe Requests are transmitted on the sub-6 GHz band with Multi-band element with the Discovery Assistance indicator enabled from the new STA. DN STA responds to that frame by sending a Probe Response frame with Multi-band element with the Discovery Assistance indicator enabled to the new STA. The new STA receiving the Probe Response can transmit a Discovery Trigger Request frame with Multi-band element and Discovery Assistance Request element. The DN STA responds to that frame by sending a Discovery Trigger Response frame with Multi-band element and Discovery Assistance Response element. If the request is accepted, mmW MLMEs are initiated in both STAs.

Figure 52:
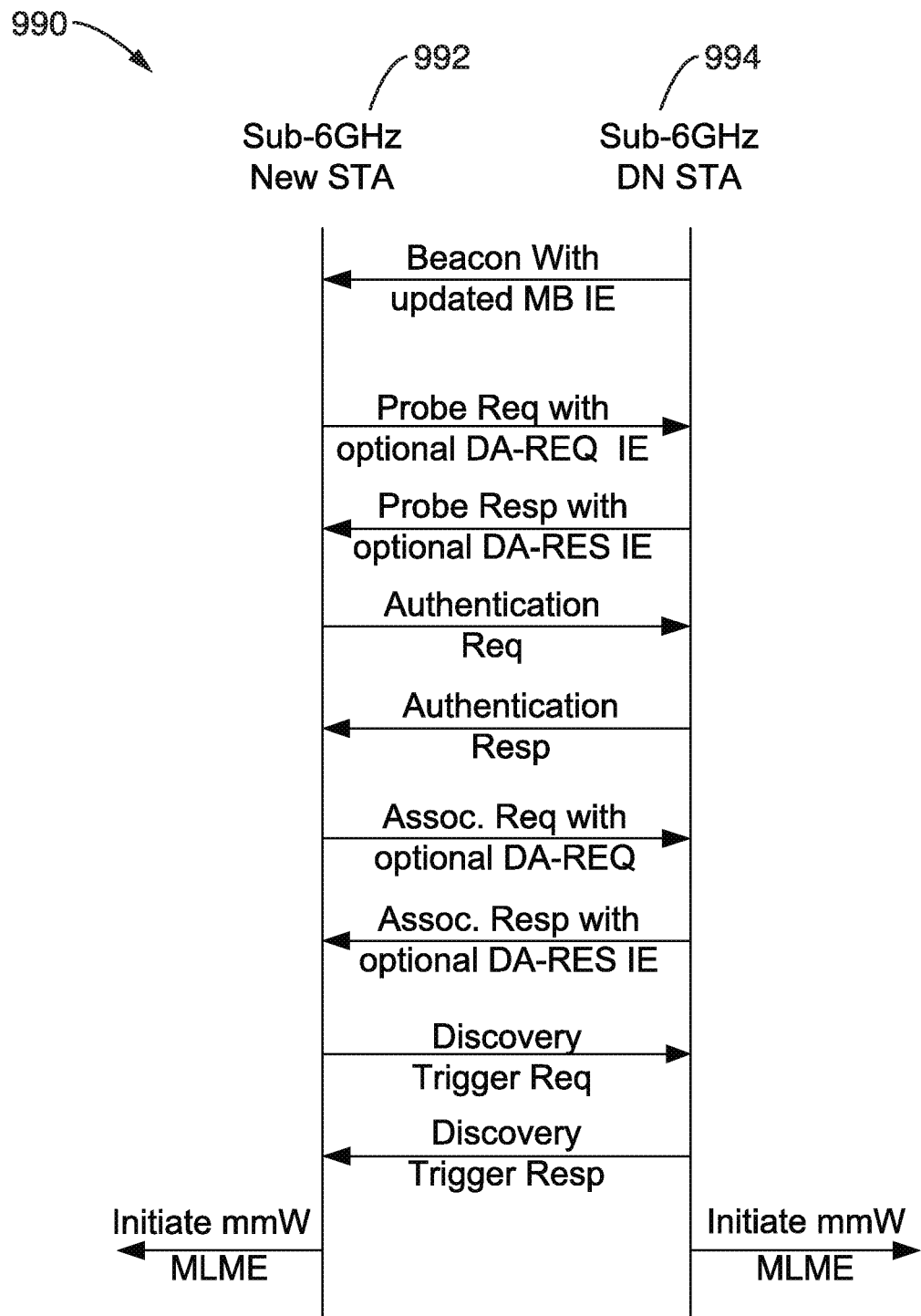
FIG. 52 is a message passing diagram for an option B WLAN implementation example with authentication and association utilized according to an embodiment of the present disclosure.

FIG. 52 illustrates an example embodiment 990 of a WLAN with authentication and association taking place in addition to the discovery assistant between a new STA and a DN STA on the sub 6 GHz band. Beacons are transmitted from the DN STA on the sub-6 GHz band with Multi-band element with the Discovery Assistance indicator enabled. The new STA receiving this beacon can transmit a Probe Request frame with Multi-band element and optional Discovery Assistance Request element. DN STA responds to that frame by sending Probe Response frame with Multi-band element and Discovery Assistance Response element if the Discovery Assistance Request element was received. If the new STA receives the probe request, the new STA and peer STA (DN STA) exchange Authentication requests and responses. If the new STA is authenticated, Association frames are exchanged between the new STA and the peer STA. The new STA transmits an Association Request frame with Multi-band element and Optional Discovery Assistance Request element. DN STA responds to that frame by sending Association Response frame with Multi-band element and Discovery Assistance Response element if the Discovery Assistance Request element was received. If the association process is successful, the new STA transmits a Discovery Trigger Request frame with Multi-band element and Discovery Assistance Request element. The DN STA responds to that frame by sending a Discovery Trigger Response frame with Multi-band element and Discovery Assistance Response element. If the request is accepted, mmW MLMEs are initiated in both STAs.

4.10.6.2 Implementation Procedure Example

Discovery triggering allows a STA of a multi-band capable device to discover another STA on a band other than its intended band of communication. The intended band of communication is referred to as the Communication Band and the MLME associated with it is referred to as the Communication MLME. The other band that is used for discovery is referred to as the Discovery Band and the MLME associated with it is referred to as the Discovery MLME. The Discovery Trigger operation can be used in conjunction with or independent from FST setup protocol and the OCT operation.

The multi-band capable device advertises its multi-band capability and Discovery Assistance Trigger feature on the discovery band if it is supported. This is performed by sending the Multi-band element on the Discovery Band to other STAs with the Discovery Assistance Trigger Field set to 1. Whenever a STA requests discovery assistance on the Discovery Band, the STA offering assistance responds on the Discovery Band by accepting or rejecting that request. The two STAs share some information about their DMG capabilities and identities on the Communication Band on the Discovery band, which includes their training beams and antenna information, frequency band at the Communication Band, MAC addresses, length of the Discovery Assistance procedure, and the scanning mode on the Communication Band.

Figure 53A:
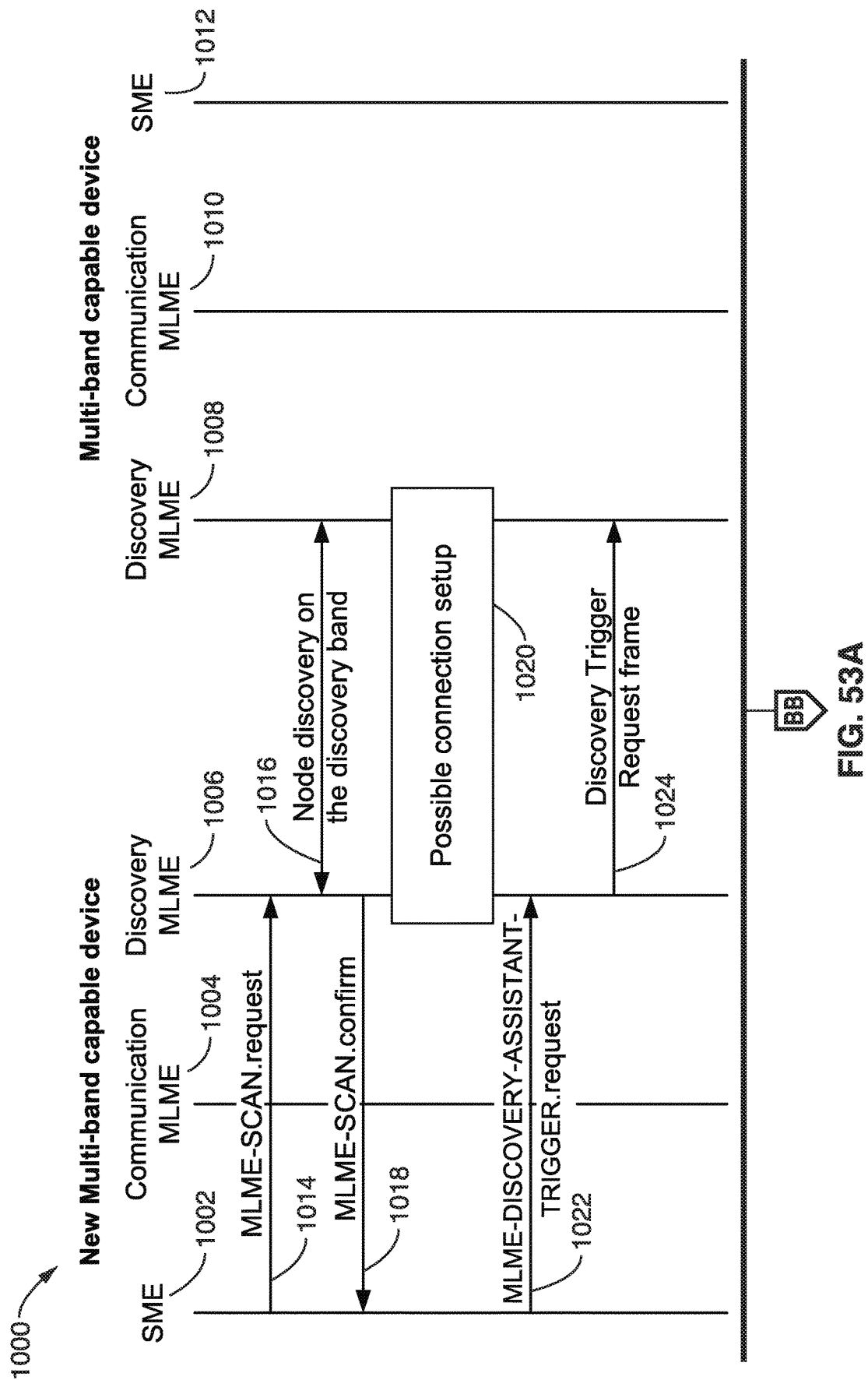
FIG. 53A and FIG. 53B is a message passing diagram for an option B discovery assistance triggering procedure utilized according to an embodiment of the present disclosure.
Figure 53B:
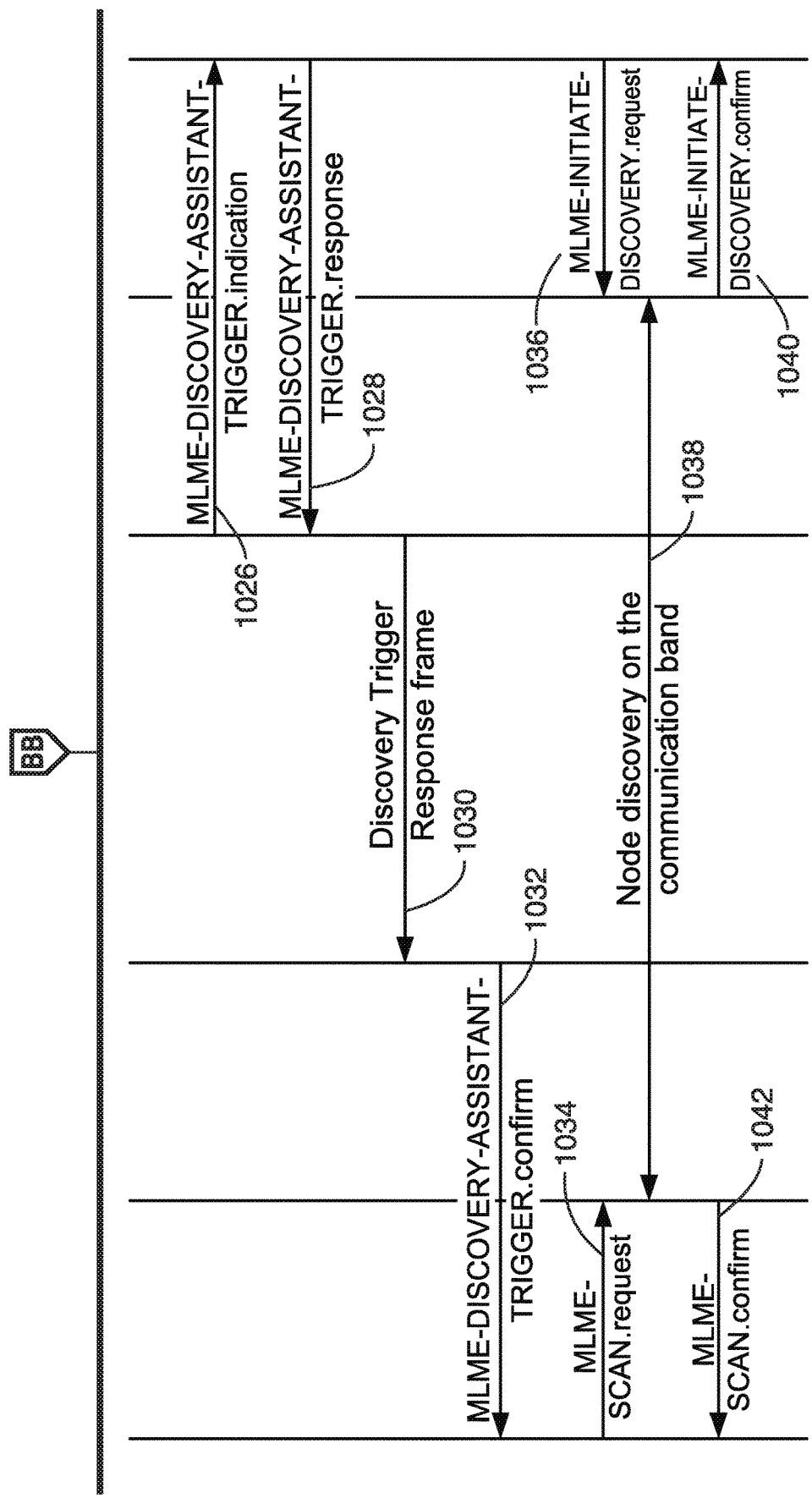

FIG. 53A and FIG. 53B illustrate an example embodiment 1000 of a Discovery Assistance Triggering procedure showing the overall discovery procedure. The interactions are shown between a new multi-band device station management entity (SME) 1002, Communication MLME 1004, and Discovery MLME 106, and an existing multi-band capable device which is already connected on the network, having SME 1008, Communication MLME 1010, and Discovery MLME 1012 portions. The SME of the new Multi-band capable device sends 1014 a MLME-SCAN.request to the Discovery MLME of that device.

A Discovery MLME receiving an MLME-SCAN.request shall scan 1016 the Discovery Band for other STAs that support multi-band and discovery assistance trigger. Once a STA or multiple STAs are found the Discovery MLME shall generate 1018 MLME-SCAN.confirm to the SME of the STA, which processes the MLME-SCAN.confirm as defined in this standard. MLME-SCAN.confirm shall have information about the STAs that support multi-band and discovery assistance trigger. After the scan confirmation there is a possible connection setup 1020, wherein the new STA and the DN (peer) STA might decide to form a connection (authentication and association are performed).

The new multi-band capable device SME receiving an MLME-SCAN.confirm responds by generating 1022 MLME-DISCOVERY-ASSISTANT-TRIGGER.request to the Discovery MLME of this STA. This request includes the peer STA address, the local Multi-Band element and the local Discovery Assistance Trigger Request element.

A Discovery MLME receiving an MLME-DISCOVERY-ASSISTANT-TRIGGER.request transmits 1024 a Discovery Trigger Request frame addressed to the peer Discovery MLME.

In FIG. 53B a Discovery MLME receiving a Discovery Trigger Request frame generates 1026 a MLME-DISCOVERY-ASSISTANT-TRIGGER. indication to the SME of multi-band capable device receiving the frame.

The multi-band capable device SME receiving the MLME-DISCOVERY-ASSISTANT-TRIGGER. indication responds by generating 1028 a MLME-DISCOVERY-ASSISTANT-TRIGGER. response to the Discovery MLME of this STA. This request includes the peer STA address, the local Multi-Band element and the local Discovery Assistance Trigger Response element.

A Discovery MLME receiving an MLME-DISCOVERY-ASSISTANT-TRIGGER.response transmits 1030 a Discovery Trigger Response frame addressed to the peer Discovery MLME.

A Discovery MLME receiving a Discovery Trigger Response frame generates 1032 a MLME-DISCOVERY-ASSISTANT-TRIGGER.confirm to the SME of the multi-band capable device receiving the frame.

The new multi-band capable device SME receiving an MLME-DISCOVERY-ASSISTANT-TRIGGER.confirm responds by generating 1034 an MLME-SCAN.request to the Communication MLME of this STA if assistance discovery was accepted. If the assistance discovery is rejected by the peer STA, the SME does not generate MLME-SCAN.request. This request includes the peer STA address, the local Multi-Band element, the peer Multi-band element and the peer Discovery Assistance Trigger Response element.

A Communication MLME receiving an MLME-SCAN.request shall scan 1038 the Communication Band for the peer STA Communication MLME. The address of the Communication MLME of the peer STA shall be given to the communication MLME of the new multi-band device in the request. The Communication MLME of the STA shall have information about the peer STA multi-band capability and discovery assistance trigger.

A Communication MLME receiving 1036 an MLME-INITIATE-DISCOVERY. request shall trigger discovery on the communication band. If the Discovery Assistance Trigger response element indicates passive scanning, the Communication MLME shall start transmitting beacons or beamforming frames. If the Discovery Assistance Trigger response element indicates active scanning, the Communication MLME shall listen for Probe Request or beamforming frames.

The new multi-band capable device SME receiving 1042 an MLME-SCAN.confirm indicates if the scanning process resulted in finding the peer STA.

The multi-band capable device SME receiving 1040 an MLME-INITIATE-DISCOVERY.confirm indicates if the scanning process resulted in finding the peer STA 4.10.6.3 MLME messages.

4.10.6.3.1 MLME-SCAN. request

The following parameters should be added to the MLME-SCAN.request message defined in IEEE 802.11 standard.

"Multiband Discovery Assistance Request" is a type of Multi-Band Discovery Assistance Request element having a valid range as defined in (Multi-band Discovery Assistance Request element) and which specifies the parameters within the Multi-band Discovery Assistance Request element containing configurations supported by the local MAC entity. The parameter is present if the STA is supporting multi-band assisted discovery.

4.10.6.3.2. MLME-SCAN.confirm

The following parameters should be added to the MLME-SCAN.confirm message defined in IEEE 802.11 standard. "Multiband Discovery Assistance Response" is a type of Multi-Band Discovery Assistance Response element having a valid range as defined in (Multi-band Discovery Assistance Response element) and which responds with values from the Multi-band Discovery Assistance Response element if such an element was present in the Probe Response frame, else null.

4.10.6.3.3 MLME-MB-DISCOVERY-ASSIST.request

Function: This primitive requests transmission of a Discovery Assistance Request element in Discovery Assistance Request frame.

Semantics of the service primitive are as follows:

MLME-MB-DISCOVERY-ASSIST.request
(PeerSTAAddress,DiscoveryAssistanceRequest)

Peer STA Address: a MAC address having an valid individual MAC address which specifies address of the STA to which the discovery assistance request frame is transmitted.

Discovery assistance request: a discovery assistance request element with a range defined in the Discovery Assistance Request element format and which specifies parameters of the requesting discovery assistance.

This primitive is generated by the SME to request that a Discovery

Assistance Request frame be sent to another STA. On receipt of this primitive, the MLME constructs and attempts to transmit a Discovery Assistance Request frame.

4.10.6.3.4 MLME-MB-DISCOVERY-ASSIST. Indication

This primitive indicates that a Discovery Assistance Request frame was received.

Semantics of the service primitive are as follows:

MLME-MB-DISCOVERY-ASSIST.indication
(
PeerMACAddress,
DiscoveryAssistanceRequest
)

Peer MAC Address: is a MAC address having any valid individual MAC address which specifies the MAC address of the STA from which the Discovery Assistance Request frame was received.

Discovery Assistance Request: is a discovery assistance request element with a range defined in the Discovery Assistance Request element format, and which specifies parameters of the requested discovery assistant.

This primitive is generated by the MLME when a Discovery

Assistance Request frame is received. On receipt of this primitive, the SME is notified of the discovery assistance request.

4.10.6.3.5 MLME-MB-DISCOVERY-ASSIST.response

This primitive requests that a Discovery Assistance Response frame be transmitted to a STA that requests discovery assistance.

Semantics of the service primitive are as follows:

MLME-MB-DISCOVERY-ASSIST.response
(
PeerMACAddress,
DiscoveryAssistanceResponse
)

Peer MAC Address: a MAC address with any valid individual MAC address range which specifies the MAC address of the STA to which the discovery assistance response frame is transmitted.

Discovery Assistance Response: is a Discovery Response element having a range defined by the discovery assistance response element format and which specifies parameters of the discovery assistance.

This primitive is generated by the SME to request that a Discovery

Assistance Response frame be transmitted to the STA that requested discovery assistance. On receipt of this primitive, the MLME constructs and attempts to transmit a Discovery Assistance Response frame.

4.10.6.3.6 MLME-MB-DISCOVERY-ASSIST.confirm

This primitive indicates that a Discovery Assistance Response frame was received.

Semantics of the service primitive are as follows:

MLME-MB-DISCOVERY-ASSIST.confirm
(
PeerMACAddress,
DiscoveryAssistanceResponse
)

Peer MAC Address: is a MAC address with a range of any valid individual MAC address and which specifies the MAC address of the STA from which the Discovery Assistance Response frame was received.

Discovery Assistance Response: is a Discovery Assistance Response element with a valid range as defined in the format, with the response specifying the parameters of the discovery assistance.

This primitive is generated by the MLME when a Discovery Assistance Response frame is received.

On receipt of this primitive, the MLME initiates the discovery assistance procedure 4.10.6.3.7 MLME-START-DMG-DISCOVERY-ASSISTANCE.request This primitive requests to start exhaustive sector sweep that helps discovery and beamforming training to a new STA that is joining the BSS.

Semantics of the service primitive are as follows:

```
MLME-START-DMG-DISCOVERY-ASSISTANCE.request
(
NumberOfTxSectors,
NumberOfRxSectors,
DiscoveryAssitanceWindow
)
```

NumberOfTxSectors: Integer with range 1-255 that specifies number of sectors that the STA transmits for discovery assistance and beamforming training.

NumberOfRxSectors: Integer with range 1-255 that specifies number of sectors for which a STA that is joining the BSS will perform receive beamforming training.

DiscoveryAssistanceWindow: Integer with range 1-65, 535 that specifies the time length when the discovery assistance is enabled in unit of TU.

This primitive is generated by the SME to request exhaustive sector sweep that helps discovery and beamforming training to a new STA that is joining the BSS.

On receipt of this primitive, the MLME invokes the MAC sublayer exhaustive sector sweep procedures.

4.10.6.3.8 MLME-START-DMG-DISCOVERY-ASSISTANCE.confirm

This primitive reports the outcome of a requested exhaustive sector sweep procedure.

Semantics of the service primitive are as follows:

```
MLME-START-DMG-DISCOVERY-ASSISTANCE.confirm
(
ResultCode
)
```

ResultCode: is an enumeration type, with range of values in this example of "SUCCESS" or "BF-TIMEOUT", which indicate the results of the exhaustive sector sweep procedure.

This primitive is generated by the MLME to report the result of exhaustive sector sweep. The SME is notified of the result of the procedure.

5. Discover Assistance Using Channel Access and Scheduling Information

5.1. Problem Statement

Requiring STAs in the network to be continue sending discovery signals (beacons or beamforming frames) is not efficient and does not make optimum use of the spectrum, thereby affecting the latency constraints in the system where transmission needs to be interrupted continuously to send beamforming signal even if it is not needed. The new STAs joining new network have no information about the channel access and the scheduling allocation in the channel and network it is connecting to. The new STA might miss the beamforming frames because it's not aware of its transmit time or not ready to receive at that time. Having the new STAs continuous scanning (passive or active) for beamforming frames results in inefficient use of power. It is more efficient if the STA knows when and where the beamforming frames are transmitted or to be transmitted.

5.2. Contribution

A multi-band solution is proposed to assist new node discovery through other bands. New node requests Discovery assistance through the other bands on the intended band of communication. The new STA receives information about the channel access and the channel allocation on the intended band of communication through the other bands where the node was discovered. The new STA uses this information to synchronize with the discovered node on the intended band of communication and accesses the channel on the intended band of communication.

5.3. Multi-band Discovery Assistance

The stations (STAs) in this section are considered to be multi-band (MB) capable devices where each STA has access to at least two bands. One band is easier for the nodes to discovery each other, for example channel characteristic simplify node discovery of each other. That band is referred to herein as the Discovery Band, and can for example be the sub-6 GHz band in 802.11 WLAN frame work, although it may be any other band or combination of bands. The band where nodes are intended to communicate at and where it is required to assist in node discovery is called the Communication Band.

For each of these bands, Discovery band and Communication band, a Discovery MLME is defined in which the MLME is responsible for the discovery band and the communication MLME where it is the MLME that is responsible for the communication band.

The multi-band capability and the discovery assistance feature is announced by a station on the discovery band. The announcement is performed through transmitting a beacon or any announcement frame (e.g., a beacon, probe request, announcement frame or any other frame) on the discovery band that carries a multi-band element. The multi-band element carries information about the other band upon which the STA is capable of communicating. The multi-band element should indicate the STA is offering discovery assistance on the discovery band to achieve communication on the communication band in the network.

The new multi-band capable STAs starts scanning the discovery band (for example 2.4 or 5 GHz WiFi band). If the new STA receives a beacon frame for example with multi-band element and discovery assistance enabled in the intended communication band, the new STA requests assistance. The new STA requests assistance from the discovered STA by exchanging assistance request and assistance response information elements. These elements can be added to any frames exchanged between a discovered STA and the new STA.

By way of example and not limitation, these elements can be exchanged between a new multi-band (MB) capable device and an AP multi-band capable device through the following.

Figure 54:
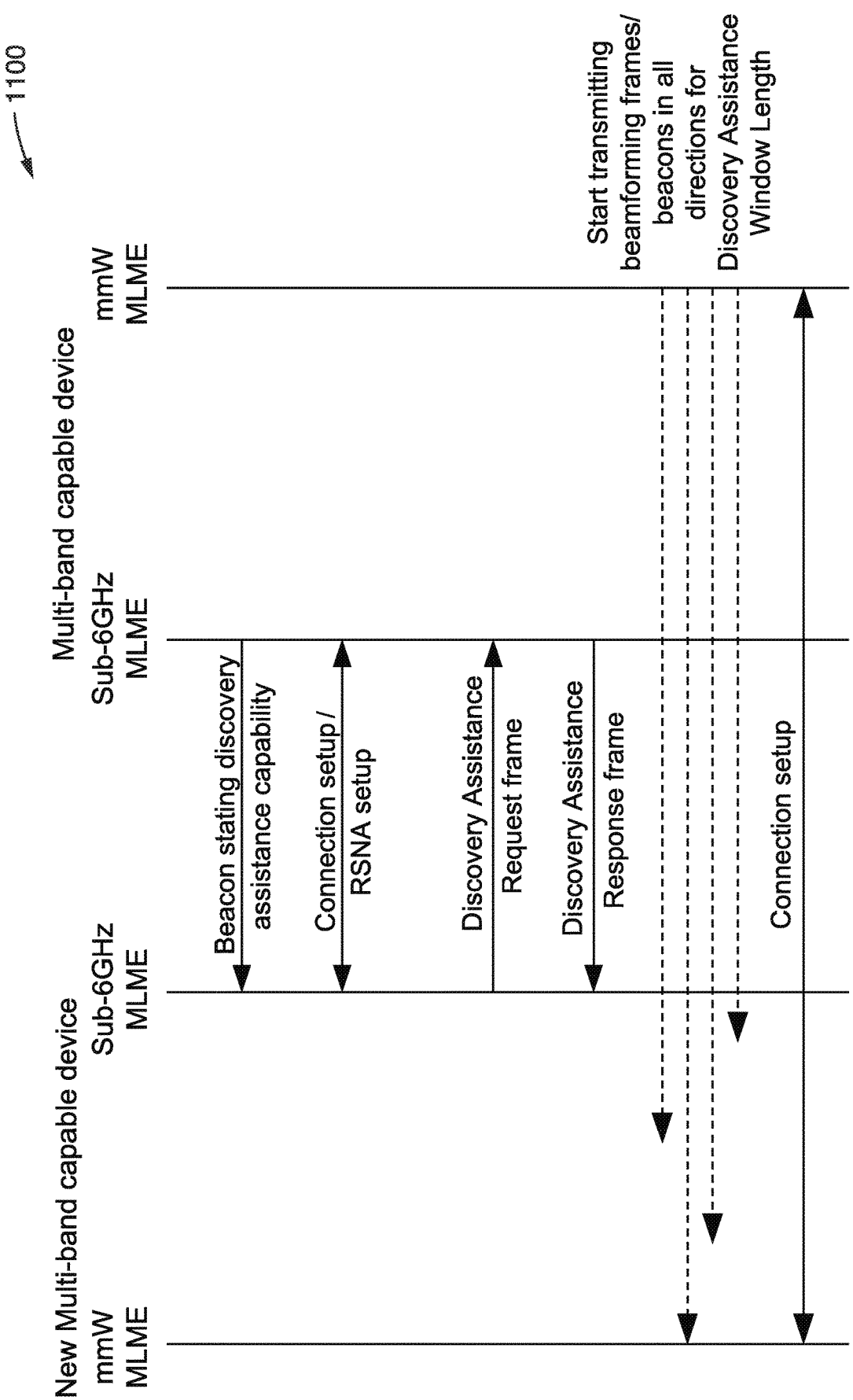
FIG. 54 is a message passing diagram for exchanging Assistance Request and Assistance response frames according to an embodiment of the present disclosure.

FIG. 54 illustrates an example embodiment 1100 of performing the exchange of Assistance Request and Assistance response Frames.

Figure 55:
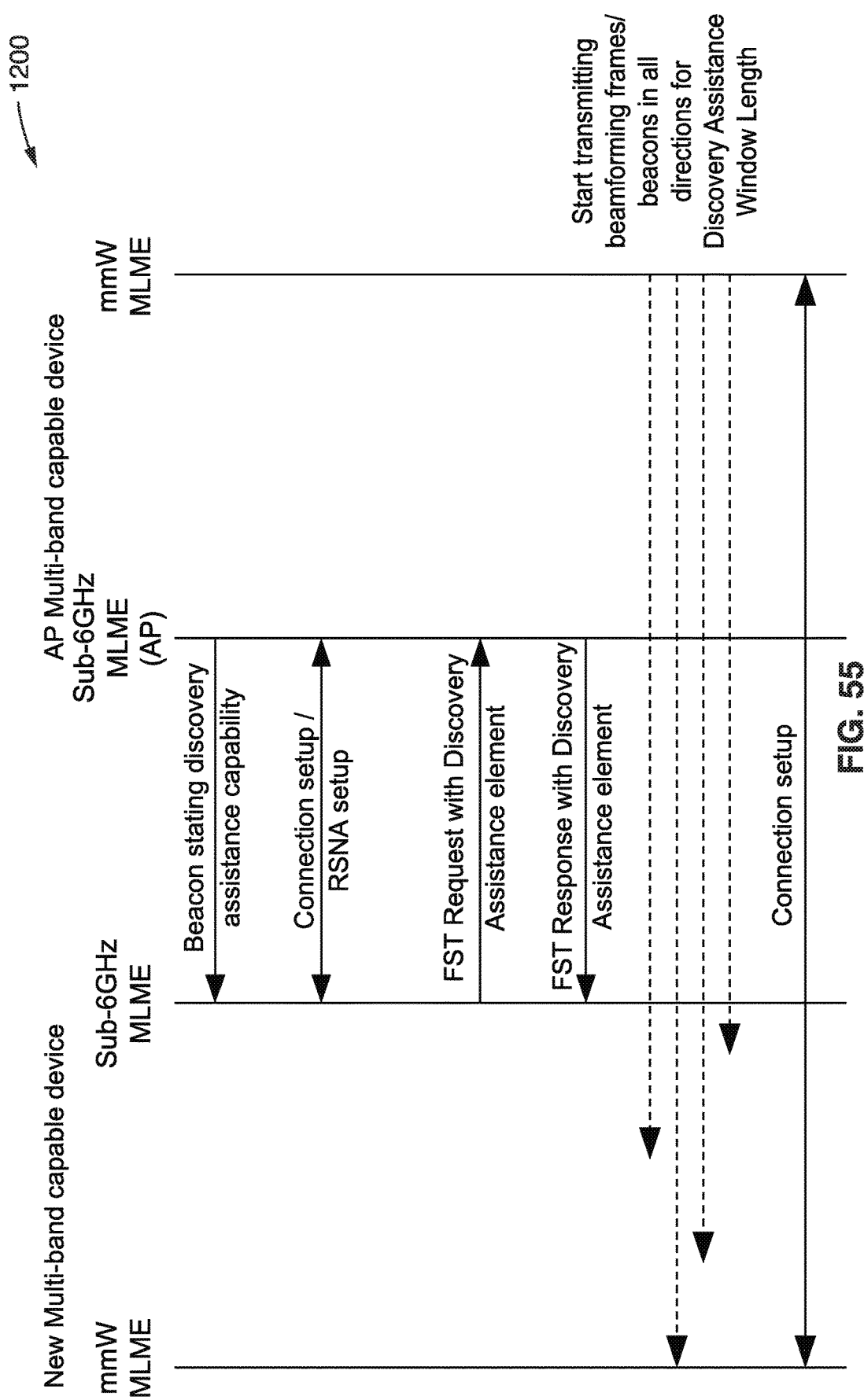
FIG. 55 is a message passing diagram of performing the exchange utilizing Fast Session Transfer (FST) Request and FST Response Frames according to an embodiment of the present disclosure.

FIG. 55 illustrates an example embodiment 1200 of performing the exchange utilizing Fast Session Transfer (FST) Request and FST Response Frames.

Figure 56:
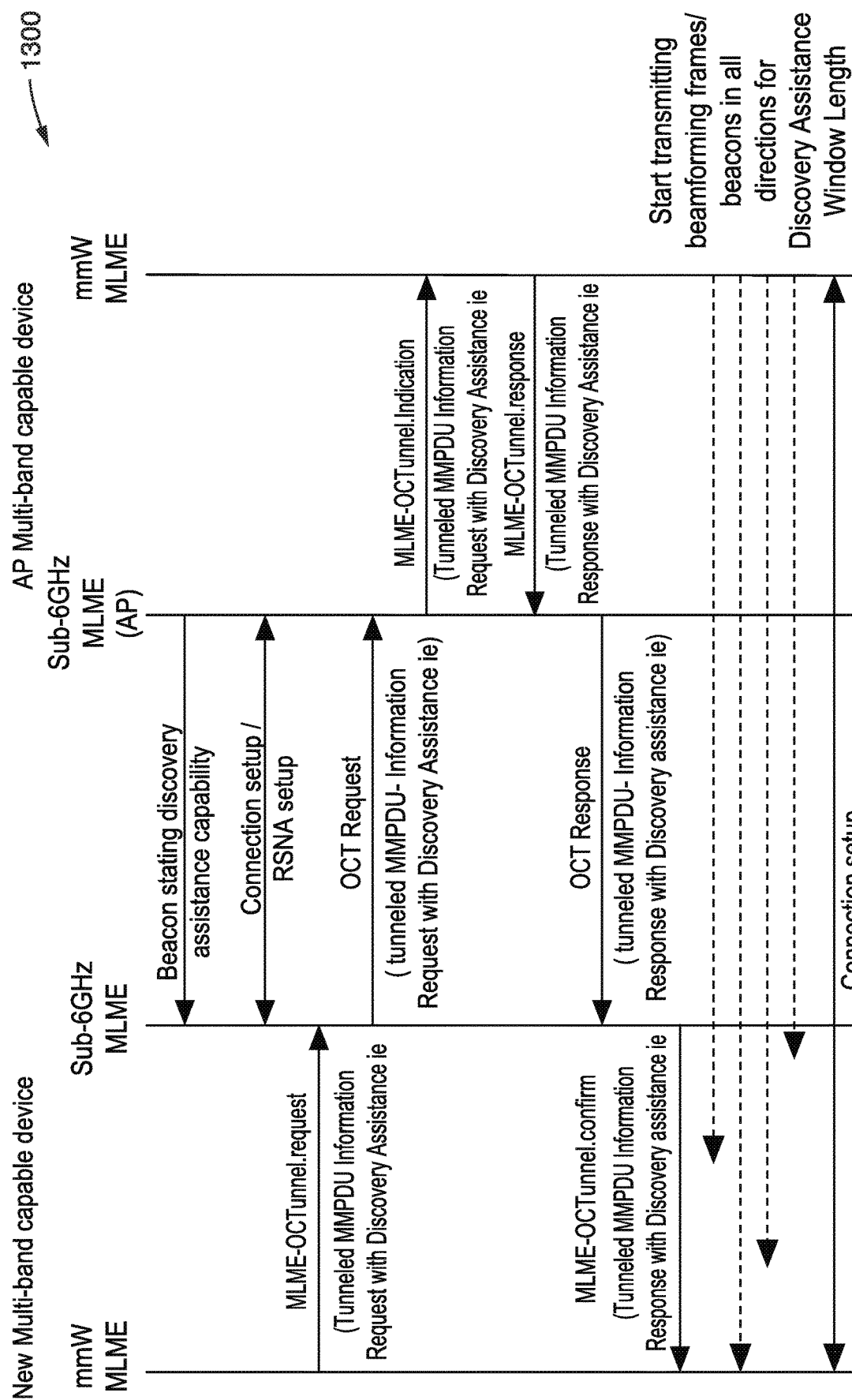
FIG. 56 is a message passing diagram of performing the exchange utilizing Information Request or Information Response frames through On Channel Tunneling (OCT) Request and Response frames according to an embodiment of the present disclosure.

FIG. 56 illustrates an example embodiment 1300 of performing the exchange utilizing Information Request or Information Response frames through On Channel Tunneling (OCT) Request and Response frames.

Figure 57:
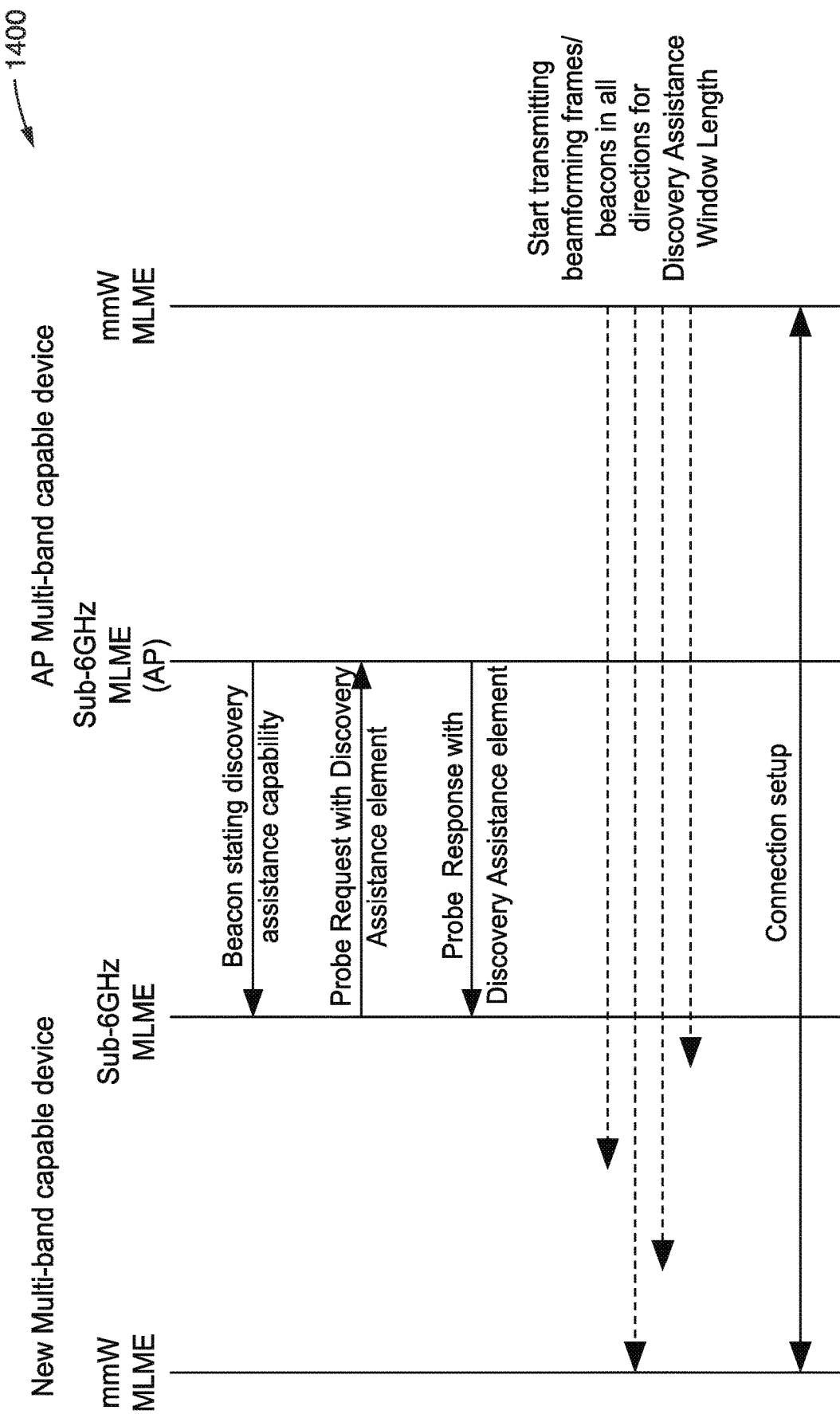
FIG. 57 is a message passing diagram of performing the exchange utilizing Probe Request and Probe Response frames according to an embodiment of the present disclosure.

FIG. 57 illustrates an example embodiment 1400 of performing the exchange utilizing Probe Request and Probe Response frames.

Figure 58:
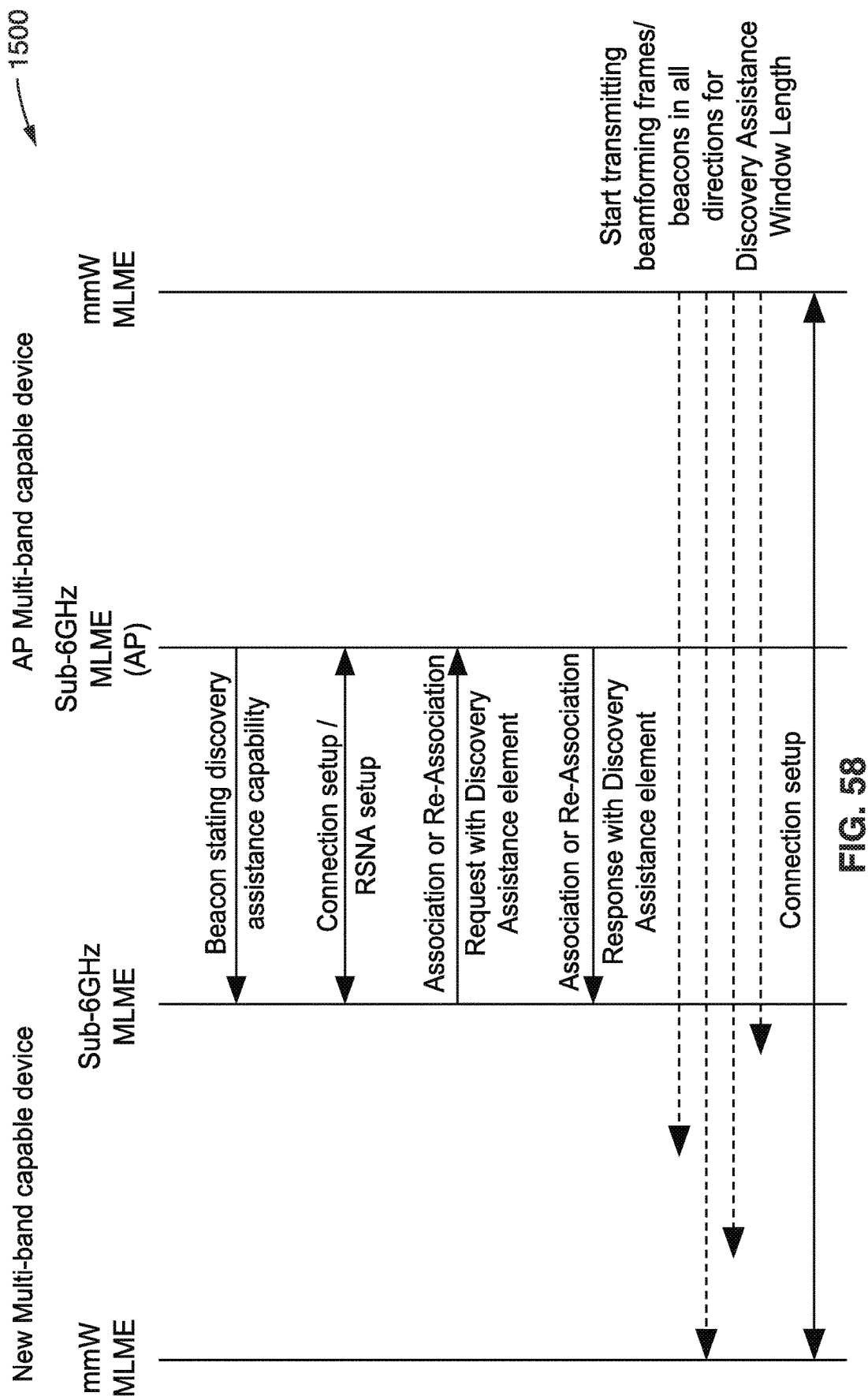
FIG. 58 is a message passing diagram of performing the exchange utilizing Association or Re-association Request or Response Frames according to an embodiment of the present disclosure.

FIG. 58 illustrates an example embodiment 1500 of performing the exchange utilizing Association or Re-association Request or Response Frames.

Each of the above cases depicts the mmW MLME and sub-6 GHz MLME of both the new MB node and a STA in MB node, although this is typically an Access Point transmitting the beacons. In each of these cases the new STA might associate with the discovered STA on the Discovery band prior to exchanging the assistance request and response elements to secure the link between the two STAs.

In at least one embodiment, the Assistance Request and Assistance Response information elements contain the following information: (a) STA address, (b) DMG Capability information, (c) Antenna Capability information, (d) Communication Band information, (e) Communication band scanning mode request and response, (f) Discovery assistance window Request and Response, (g) New node dwelling time request and response, and (h) Assistance request response.

5.4 Scheduling Information Forwarding for Discovery Assistance

The discovered STA provides the new STA with TSF Offset in the multi-band element sent on the discovery band. The TSF offset represents the time offset of the TSF of the BSS on the discovery band relative to the TSF of the BSS corresponding to the communication band. This synchronization information can be very useful for the new STA to be able to access the channel in a more efficient manner. The discovered STA can optionally forward scheduling information to the new STA to inform it about the timing information of transmitting the discovery signal or when it is a possibility for the new STA to communicate with the discovered STA on the communication band. The discovered STA can also send scheduling information of the communication band to the new STA to inform the new STA about different allocations in the communication band. The discovered STA optionally appends this information to the Discovery Assistance Response information element. The new STA might request the discovered STA to transmit scheduling and access information about the communication band through setting a 1-bit flag in the Discovery Assistance element to request channel access and scheduling information forwarding.

5.4.1. Discovery Assistance Request Information Element

Figure 59:
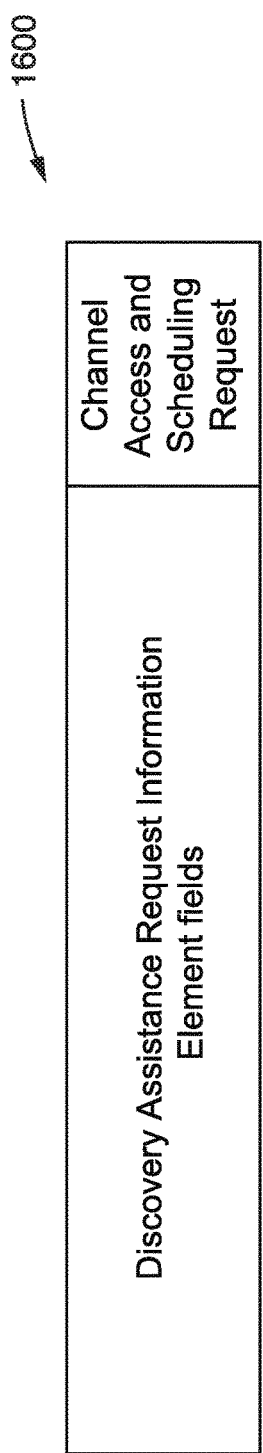
FIG. 59 is a data field diagram of a Discovery Assistance Request information element that includes a new field for requesting the discovered STA to send channel access and scheduling information for the communication band according to an embodiment of the present disclosure.

FIG. 59 illustrates an example embodiment 1600 of a Discovery Assistance Request information element that includes a new field for requesting the discovered STA to send channel access and scheduling information for the communication band. The new STA set this request field to an active state (e.g., 1) if it is requesting the discovered STA to append the channel access and scheduling information to the Discovery Assistance Response information element. The new STA sends the Discovery Assistance Request information element on the discovery band.

The Discovered STA after receiving the Discovery Assistance Request information element optionally appends information regarding the channel access and scheduling regarding the communication band to the Discovery Assistance Response Information element transmitted on the discovery band.

5.4.2. Discovery Assistance Response Information Element

Figure 60:
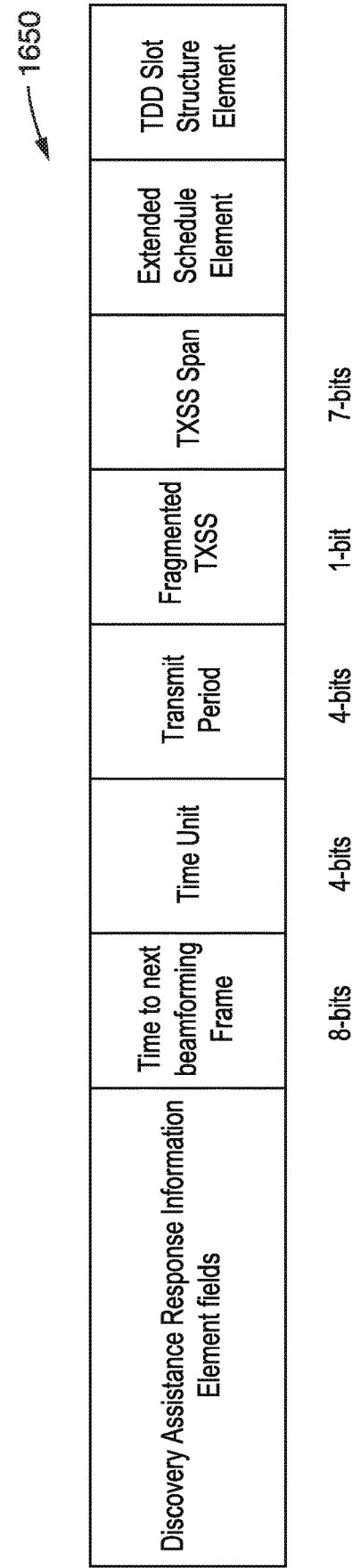
FIG. 60 is a data field diagram of a Discovery Assistance Response information element containing new fields to inform the new STA about timing, scheduling, and channel access information on the communication band according to an embodiment of the present disclosure.

FIG. 60 illustrates an example embodiment 1650 of the Discovery Assistance Response information element containing new fields to inform the new STA about timing, scheduling, and channel access information on the communication band.

The new added fields are described as follows. (a) Time to next beamforming frame: the time to next beamforming frame field indicates the offset, in units of Time Units, between the transmission of the Discovery assistance Response information element and the transmission of the first discovery or beamforming frame from the discovered STA (if TDD channel access or Passive scanning is chosen) or from the new STA (if active scanning is chosen). (b) Time Unit: the time unit field indicates the time unit for the next beamforming frame exchange field. By way of example and not limitation, the values may be 0: 1 μsec; 1: 100 μsec; 2: 400 μsec, with values 3-15 presently being reserved. The new STA uses this field to know the time unit of the next beamforming frame. (c) Transmit period: this field indicates the number of beacon intervals or TDD slots following the Time to next beamforming frame during which the DMG Beacon frame or beamforming frames will not be present. The discovered STA transmits beacons or beamforming frames every Transmit Period. The discovered STA might expect beamforming frames or Probe Request from the new STA every Transmit period. (d) Fragmented TXSS: the Fragmented TXSS subfield is set to a first state (e.g., 1) to indicate the TXSS is a fragmented sector sweep and is set to a second state (e.g., 0) to indicate the TXSS is a complete sector sweep. This is to inform the STA that the beamforming or beacon sweep is spanning multiple beacon intervals in case of passive scanning. (e) TXSS Span: the TXSS Span subfield indicates the number of beacon intervals it takes for the STA sending the DMG Beacon frame to complete the TXSS phase. This subfield is always greater than or equal to one (1). The new STA uses this information to decide on the end of the scanning process much quicker if no beamforming frame was received for the TXSS span period. Also this information can aid in making the beamforming process more efficient. (f) Extended Schedule element: the Extended Schedule element is similar to the element defined in 802.11 standard the element is optionally sent to the new STA on the discovery band. It contains information about the various allocations of the channel in the communication band. The new STA receiving this element can use this information for: (i) deciding when to scan the communication band channel for beamforming frames; and (ii) deciding when it is possible to access the communication band channel and sends beamforming frames. The new STA can decide when is the best time to access the channel to send beamforming frames to the discovered STA on the communication band when it is not occupied with other transmission or reception. (g) TDD Slot structure element: the TDD Slot Structure element is optionally available if the TDD access mode is enabled. It defines the structure of the TDD SP. The new STA uses this information to obtain information about the structure of the TDD slots and intervals, which can aid in scanning for beamforming frames in case the first beamforming frame is lost.

5.5. Discovery Assistance Examples
5.5.1. TDD SP Channel Access

Figure 61:
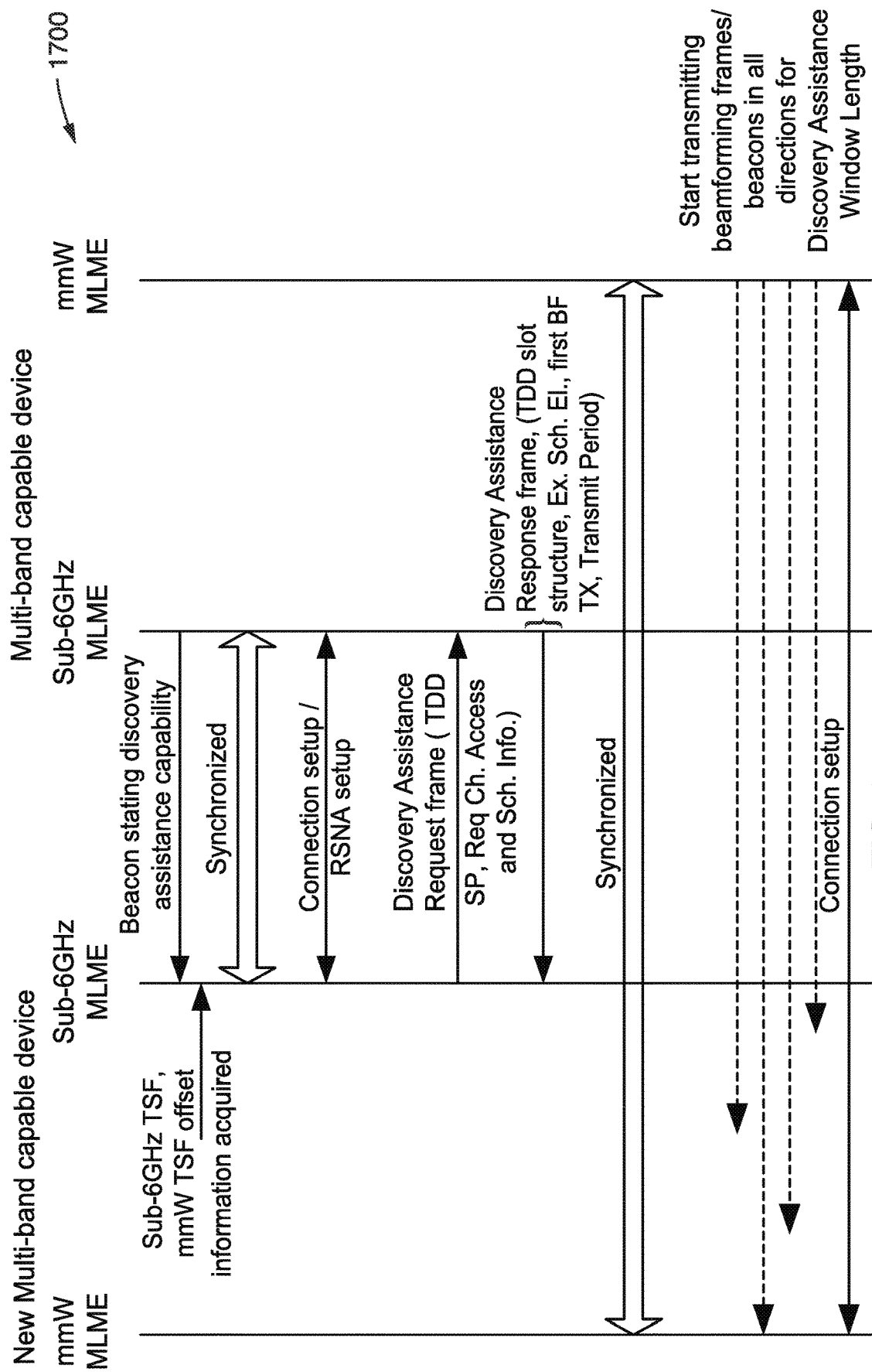
FIG. 61 is a message passing diagram of a TDD SP channel access using discovery assistance and requesting scheduling and channel access information as performed according to an embodiment of the present disclosure.

FIG. 61 illustrates an example embodiment 1700 of a TDD SP channel access using discovery assistance and requesting scheduling and channel access information. New STA using the sub-6 GHz band for discovery, Multi-band STA is transmitting beacons with multi-band information element indicating discovery assistance feature. The new STA extracts the TSF information of the sub-6 GHz band BSS and the TSF offset of the mmW band BSS as well. The new STA might establish a connection with the discovered STA on the sub-6 GHz band. The new STA sends the Discovery Assistance request information element to the discovered node on the sub-6 GHz band, for example through one of the options described previously. The Discovery Assistance Request information element includes an indication of a request for a TDD SP channel access and a request to send channel access and scheduling information.

The discovered STA receives the Discovery Assistance Request information element and responds by sending the Discovery Assistance response information element on the sub-6 GHz band, such as through one of the options previously described. The Discovery Assistance Response information element includes the extended scheduling element to indicate when the TDD SP is scheduled as well as the Slot Structure element to inform the new STA of the slot structure. The Time to next beamforming frame field indicates the time when the first beamforming frame is expected to be transmitted in Time Units. The Transmit Period is showing the period of transmitting the next set of beamforming frames in number of slots. The new STA uses this information to synchronize with the discovered STA on the mmW band and scan for the beamforming frames.

5.5.2. Passive Scanning Discovery

Figure 62:
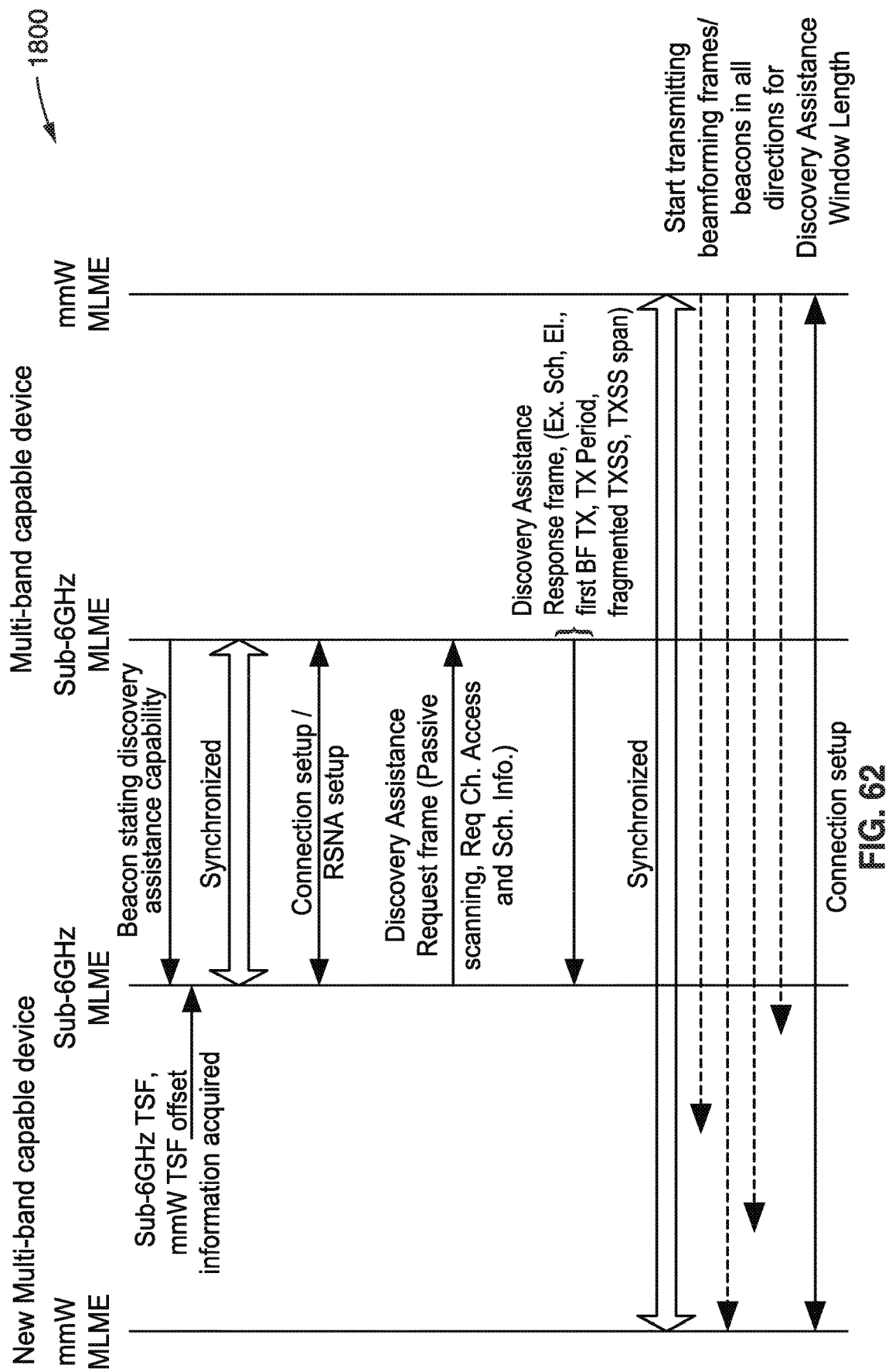
FIG. 62 is a message passing diagram of Passive scanning discovery using discovery assistance and requesting scheduling and channel access information as performed according to an embodiment of the present disclosure.

FIG. 62 illustrates an example embodiment 1800 of Passive scanning discovery using discovery assistance and requesting scheduling and channel access information. The new STA using the sub-6 GHz band for discovery of the Multi-band STA is transmitting beacons with multi-band information element indicating discovery assistance feature. The New STA extracts the TSF information of the sub-6 GHz band BSS and the TSF offset of the mmW band BSS as well. The new STA might establish a connection with the discovered STA on the sub-6 GHz band. The new STA sends the Discovery Assistance request information element to the discovered node, for example through one of the options previously described for the sub-6 GHz band. The Discovery Assistance Request information element includes an indication of a request for passive scanning assisted discovery and a request to send channel access and scheduling information.

The discovered STA receives the Discovery Assistance Request information element and responds by sending the Discovery Assistance response information element on the sub-6 GHz band in any desired manner, for example through one of the options described in section 5.3. The Discovery Assistance Response information element includes the extended scheduling element to indicate the allocations on this channel. The Time to next beamforming frame field indicates the time when beacons are scheduled to be transmitted to the new STA Time Units. This should match with the start of the beacon interval of the discovered BSS or can be a different scheduled beacon or beamforming frame. The Transmit Period indicates the period of transmitting the next set of beamforming frames in beacon intervals. The fragmented TXSS indicates if the beacons are fragmented over more than one beacon interval, while the TXSS span indicates the number of BI the TXSS is spanning. The new STA utilizes this information to synchronize with the discovered STA on the mmW band and scan for the beamforming frames (beacons for example).

5.5.3. Active Scanning Discovery

Figure 63:
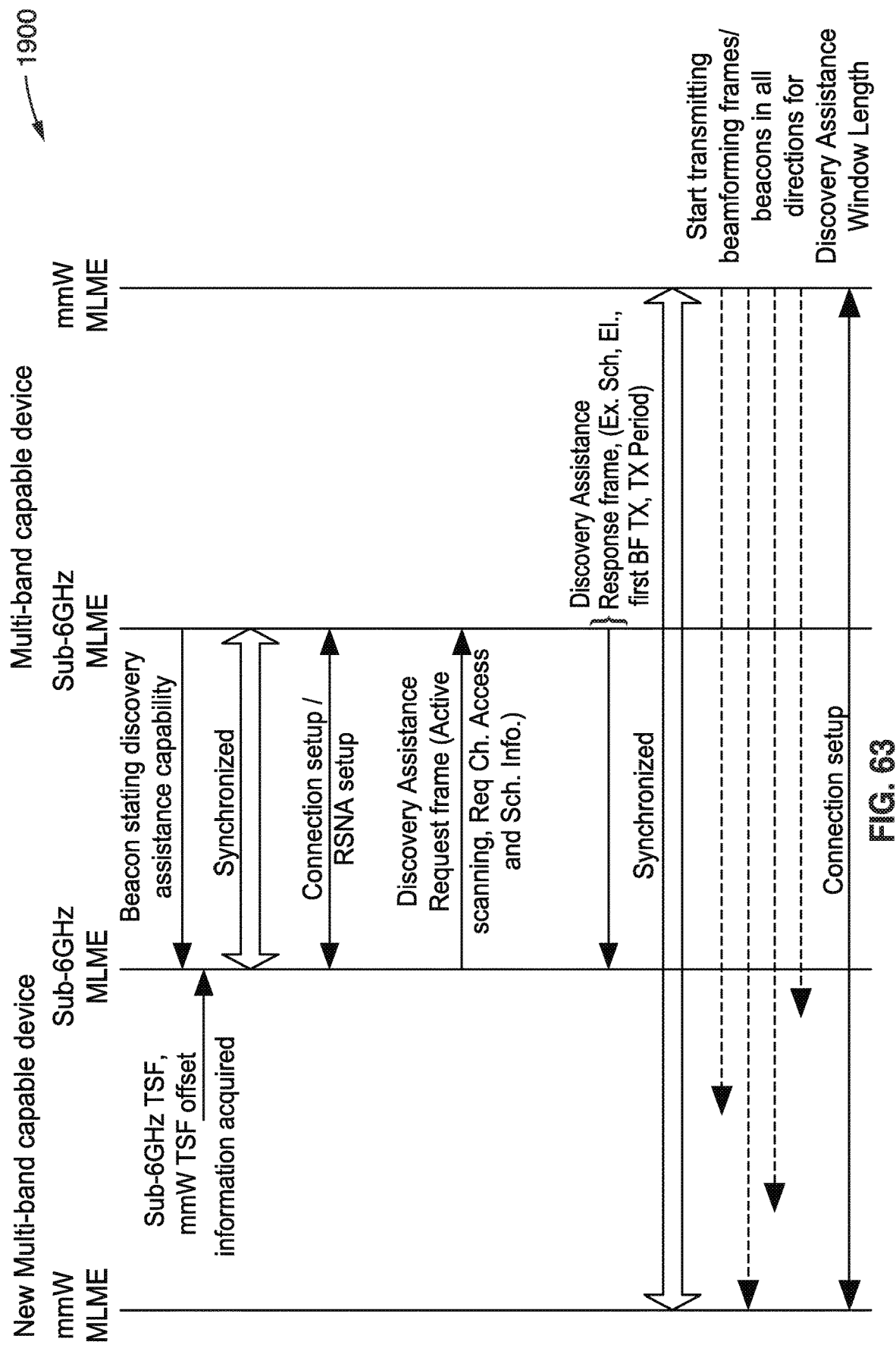
FIG. 63 is a message passing diagram of Active scanning discovery using discovery assistance and requesting scheduling and channel access information as performed according to an embodiment of the present disclosure.

FIG. 63 illustrates an example embodiment 1900 of Active scanning discovery using discovery assistance and requesting scheduling and channel access information. The new STA is using the sub-6 GHz band for discovery, while the Multi-band STA is transmitting beacons with multi-band information element indicating discovery assistance feature. The new STA extracts the TSF information of the sub-6 GHz band BSS and the TSF offset of the mmW band BSS as well. The new STA might establish a connection with the discovered STA on the sub-6 GHz band.

The new STA sends the Discovery Assistance request information element to the discovered node on the sub-6 GHz band, in any desired manner, such as through the options described in section 5.3. The Discovery Assistance Request information element includes an indication of a request for active scanning assisted discovery and a request to send channel access and scheduling information The discovered STA receives the Discovery Assistance Request information element and responds by sending the Discovery Assistance response information element on the sub-6 GHz band through any desired mechanism, such as one of the options previously described.

The Discovery Assistance Response information element includes the extended scheduling element to indicate the allocations in this channel. The new STA uses this information to predict when the discovered STA is possibly available in the mmW band. The Time to next beamforming frame field indicates the time offset in time units when the discovered STA is listening for frames from the new STA. The Discovered STA will not schedule any transmissions or receptions during that time and listens for the new STA requests on the mmW band. The Transmit Period is showing the period of time when the discovered STA is listening again for the new STA in beacon intervals. The new STA utilizes this information to synchronize with the discovered STA on the mmW band and transmit beamforming frames or probe request to the discovered STA on the mmW band.

6. Summary of Disclosure Elements

The following is a partial summary of aspects associated with the present disclosure.

A wireless communication apparatus/system/method utilizing directional transmission over a mmW band performing transmission of signals on a sub-6 GHz band that aids scanning for mmW mesh network discovery. The new node sends assistance requests on the sub-6 GHz band. The network node responds to the assistance request by sending an assistance response on the sub-6 GHz band. Upon exchanging the discovery assistance request and response with the network node on the sub-6 GHz band, the new node switches to the mmW band to discover neighbor(s). The network node upon exchanging the discovery assistance request and response on the sub-6 GHz band switches to mmW band to discover new nodes.

An embodiment in which the discovery assistance request from the new node can be generated by sending a discovery assistance request frame on the sub-6 GHz band to the network node. The network node sends a discovery assistance response by sending a discovery assistance response frame to the new node in response to the sent frame.

An embodiment in which the discovery assistance request from the new node can be performed by associating an element with the probe request transmitted on the sub-6 GHz band to request discovery assistance on the mmW band. The discovery assistance response from the network node can be performed by associating an element with the probe response transmitted on the sub-6 GHz band to respond to a request of discovery assistance on the mmW band.

An embodiment in which the discovery assistance request from the new node can be performed by associating an element with the association, or reassociation, request transmitted on the sub-6 GHz band to request discovery assistance on the mmW band. The discovery assistance response from the network node can be performed by associating, or reassociating, an element with the association response transmitted on the sub-6 GHz band to respond to a request of discovery assistance on the mmW band.

An embodiment in which the discovery assistance request and response can be exchanged between the new node and the network node by initiating an on-channel tunnel request between mmW MLME of the two nodes through the sub-6 GHz MLME of the two nodes. Discovery assistance request and response frames should be exchanged through this tunneled channel.

An embodiment in which STAs with multi-band capabilities which support discovery assistance procedure can broadcast their discovery assistance capabilities on the sub-6 GHz band in conjunction with the multi-band capabilities. This process can be associated to the Beacon frames for example. This can serve as a trigger to request discovery assistance from the new STAs in case the new STAs received this beacon.

An embodiment in which STAs in the network that communicated with the new node through the sub-6 GHz band start assisting the new STAs through sending beamforming frames in all directions or receiving beamforming frames from the new node and beamform with the new node if it is within its mmW coverage area.

An embodiment in which STAs in the network that communicated with the new node through the sub-6 GHz band coordinate with other STAs that are potential neighbors in the network to start assisting the new STAs through sending mmW beamforming frames in all directions or receiving beamforming frames from the new node and beamform with the new node if it is within its mmW coverage area.

An embodiment in which a new STA uses multiple-bands to discover STAs and to request information about channel access and scheduling in its intended band of communication. The discovered STAs sends information about the channel access and scheduling on the intended band of communication through the other band where the STA was discovered. The Discovered STA in addition to the information in the multi-band element informs the new STA about timing of transmitting the beamforming signal and the structure of the signal transmission through the band where it is discovered.

An embodiment in which a new STA utilizes the channel access information from the discovery band to synchronize its signal with the STA on the intended band of communication and to better estimate when and where the beamforming signal is expected to be received of transmitted. For an TDD SP channel access, the network STA informs the new STA through the multi-band signal about the channel allocation, slot structure and when to expect the beamforming signal.

An embodiment in which during passive scanning discovery, the network STA informs the new STA through the multi-band signal about the channel allocation, when to expect the beacons and the beacon sweeping strategy across multiple beacon interval if fragmented beacon transmission is happening.

For active scanning discovery, the network STA informs the new STA through the multi-band signal about the channel allocation and when the discovered STA might be free to receive the beamforming frames or probe request of the new STA.

7. General Scope of Embodiments

The enhancements described in the presented technology can be readily implemented within various wireless (e.g., mmWave) transmitters, receivers and transceivers. It should also be appreciated that modern wireless transmitters, receivers and transceivers are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with various modern wireless communication devices. The presented technology is non-limiting with regard to memory and computer-readable media, insofar as these are non-transitory, and thus not constituting a transitory electronic signal.

It will also be appreciated that the computer readable media (memory storing instructions) in these computational systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, comprising: (a) a wireless communication circuit configured for wirelessly communicating with at least one other wireless communication station having multi-band communications capability; (b) wherein said multi-band communications capability comprise communications over a directional millimeter-wave (mmW) band, and over a sub-6 GHz band; (c) a processor coupled to said wireless communication circuit within a station configured for operating on a wireless network; (d) a non-transitory memory storing instructions executable by the processor; and (e) wherein said instructions, when executed by the processor, perform steps comprising: (e)(i) operating said wireless communication circuit as a new node attempting to join the wireless network, by performing steps comprising: (e)(i)(A) transmitting a message containing a discovery assistance request over the sub-6 GHz band which requests discovery assistance on the mmW band; (e)(i)(B) receiving a discovery assistance response over the sub-6 GHz band from a node on the wireless network; and (e)(i)(C) switching to the mmW band and starting transmission or reception according to information received in the discovery assistance request and discovery assistance response exchange to discover neighboring wireless communication stations during a beamforming process; (ii) operating said wireless communication circuit as a network node already connected to the wireless network and is configured for aiding any new nodes attempting to join the wireless network, by performing steps comprising: (e)(ii)(A) announcing its discovery assistance capability by transmitting a message in the sub-6 GHz band which includes an indication that discovery assistance on mmW band is enabled; (e)(ii)(B) transmitting a message on the sub-6 GHz band which includes a discovery assistance response generated in response to receiving a discovery assistance request from any new node attempting to join the wireless network; and (e)(ii)(C) switching to mmW band and transmitting or receiving messages according to information received in the discovery assistance request and discovery assistance response exchange to discover this new node in a beamforming process.

2. The apparatus or method of any preceding or subsequent embodiment, wherein said instructions as executed by the processor further comprises transmitting a discovery assistance request frame on the sub-6 GHz band when transmitting a message containing an assistance response over the sub-6 GHz band when the wireless communication circuit is operating as a new node.

3. The apparatus or method of any preceding or subsequent embodiment, wherein said instructions as executed by the processor further comprises transmitting a discovery assistance response frame on the sub-6 GHz band when transmitting a message containing an assistance response over the sub-6 GHz band when the wireless communication circuit is operating as the network node.

4. The apparatus or method of any preceding or subsequent embodiment, wherein said instructions as executed by the processor further comprises transmitting a probe request containing a discovery assistance request on the sub-6 GHz band when transmitting a message containing a discovery assistance request over the sub-6 GHz band when the wireless communication circuit is operating as a new node.

5. The apparatus or method of any preceding or subsequent embodiment, wherein said instructions as executed by the processor further comprises transmitting a probe response containing a discovery assistance response on the sub-6 GHz band when transmitting a message containing a discovery assistance response over the sub-6 GHz band when the wireless communication circuit is operating as the network node.

6. The apparatus or method of any preceding or subsequent embodiment, wherein said instructions as executed by the processor further comprises transmitting an association or reassociation request containing a discovery assistance request on the sub-6 GHz band when transmitting a message containing a discovery assistance request over the sub-6 GHz band when the wireless communication circuit is operating as a new node.

7. The apparatus or method of any preceding or subsequent embodiment, wherein said instructions as executed by the processor further comprises transmitting an association or reassociation response containing a discovery assistance response on the sub-6 GHz band when transmitting a message containing a discovery assistance response over the sub-6 GHz band when the wireless communication circuit is operating as the network node.

8. The apparatus or method of any preceding or subsequent embodiment, wherein said instructions as executed by the processor further comprises initiating an on-channel tunnel (OCT) request from a mmW MAC layer management entity (MLME) of the wireless communication circuit operating as the new node, through a sub-6 GHz MLME of the new node to a network node, then sending the discovery assistant request through this tunneled channel.

9. The apparatus or method of any preceding or subsequent embodiment, wherein said instructions as executed by the processor further comprises initiating an on-channel tunnel (OCT) request from a mmW MAC layer management entity (MLME) of the wireless communication circuit operating as the network node, through a sub-6 GHz MLME of the network node to a new node, then sending the discovery assistant response through this tunneled channel.

10. The apparatus or method of any preceding or subsequent embodiment, wherein said instructions as executed by the processor further comprises broadcasting discovery assistance capabilities, or multi-band capabilities, or a combination of discovery assistance capabilities and multi-band capabilities, over the sub-6 GHz band, when the wireless communication circuit is operating as either the new node, or the network node.

11. The apparatus or method of any preceding or subsequent embodiment, wherein said instructions as executed by the processor performs broadcasting discovery assistance capabilities, or multi-band capabilities, or a combination of discovery assistance capabilities and multi-band capabilities, over the sub-6 GHz band by incorporating information about discovery assistance capabilities, or multi-band capabilities, or a combination of discovery assistance capabilities and multi-band capabilities into a beacon or message being transmitted, when the wireless communication circuit is operating as either the new node or the network node.

12. The apparatus or method of any preceding or subsequent embodiment, wherein said beacon or message being transmitted is selected from the group of beacons or messages consisting of Beacon frames, Probe Response, Announce frames, Information Response, Association response, Reassociation response or any frame broadcasted or unicasted to the new node to announce network and STA capabilities.

13. The apparatus or method of any preceding or subsequent embodiment, wherein said instructions as executed by the processor further comprises triggering said transmitting a message containing a discovery assistance request over the sub-6 GHz band in response to receiving a beacon containing discovery assistance capabilities, or multi-band capabilities, or a combination of discovery assistance capabilities and multi-band capabilities when the wireless communication circuit is operating as the new node.

14. The apparatus or method of any preceding or subsequent embodiment, wherein said instructions as executed by the processor further comprises the wireless communication circuit operating as the network node and transmitting beamforming frames in all directions or receiving beamforming frames and beamforming with a new node if it is within its mmW signal coverage area.

15. The apparatus or method of any preceding or subsequent embodiment, wherein said instructions as executed by the processor further comprises the wireless communication circuit operating as the new node and transmitting beamforming frames in all directions or receiving beamforming frames and beamforming with a network node if it is within its mmW signal coverage area.

16. The apparatus or method of any preceding or subsequent embodiment, wherein said instructions as executed by the processor further comprises coordinating with other network nodes which are potential neighbors in the wireless network and assisting any new nodes by mmW beamforming if that new node is within mmW coverage area, when the wireless communication circuit is operating as the network node.

17. A method of wireless communication in a network, comprising:
(a) wirelessly communicating between wireless nodes joined in a network by transmitting over a first communications band which is configured for directional transmission and/or reception; (b) wirelessly communicating with new nodes attempting to join the network utilizing communications over a second wireless communications band; (c) transmitting a message containing a discovery assistance request, and associated fields of information for aiding the discovery process, over said second wireless communications band for requesting discovery assistance on the first communications band by a new node attempting to join the network; (d) receiving said discovery assistance request by a network node which has already joined the network, and responding by transmitting a discovery assistance response, and associated fields of information for aiding the discovery process, over the second communications band to the new node; (e) switching to using directional communications on said first communications band and generating directional transmissions according to information received in said associated fields of information from the discovery assistance request and response exchange to discover neighboring wireless communication stations in response to a beamforming process.

18. The apparatus or method of any preceding or subsequent embodiment, wherein said first communications band comprises a directional millimeter-wave (mmW) band.

19. The apparatus or method of any preceding or subsequent embodiment, wherein said second communications band is configured for non-directional communication in a sub-6 GHz band.

20. The apparatus or method of any preceding or subsequent embodiment, wherein said discovery assistance request and said discovery assistance response are exchanged by: (a) utilizing a specific discovery assistance request frame and discovery assistance response frame containing the associated fields of information for aiding the discovery process; or (b) incorporating said discovery assistance request and said discovery assistance response, along with said associated fields of information for aiding the discovery process, in other beacons or messages communicated over said second communications band; or (c) communicating said discovery assistance request and said discovery assistance response in other beacons or messages which trigger the communications of another beacon or message containing said associated fields of information for aiding the discovery process; or (d) communicating said discovery assistance request and said discovery assistance response along with said associated fields of information for aiding the discovery process, over on-channel tunnel (OCT)

established between a first communication band MAC layer management entities; or (e) combinations of the above.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
   (a) a wireless communication circuit configured for wirelessly communicating under the IEEE 802.11 protocol with at least one other wireless communication station having multi-band communications capability;
   (b) wherein said multi-band communications capability comprise communications over a directional millimeter-wave (mmW) band, and over a sub-6 GHz band;
   (c) a processor coupled to said wireless communication circuit within a station configured for operating on a wireless network;
   (d) a non-transitory memory storing instructions executable by the processor; and
   (e) wherein said instructions, when executed by the processor, perform steps comprising:
      (i) operating said wireless communication circuit as a new node attempting to join the wireless network, by performing steps comprising:
         (A) transmitting a message containing a discovery assistance request over the sub-6 GHz band which requests discovery assistance on the mmW band;
         (B) receiving a discovery assistance response over the sub-6 GHz band from a node on the wireless network; and
         (C) switching to the mmW band and starting transmission or reception according to information received in the discovery assistance request and discovery assistance response exchange to discover neighboring wireless communication stations during a beamforming process;
      (ii) operating said wireless communication circuit as a network node already connected to the wireless network and is configured for aiding any new nodes attempting to join the wireless network, by performing steps comprising:
         (A) announcing discovery assistance capability by transmitting a message in the sub-6 GHz band which includes an indication that discovery assistance on mmW band is enabled;
         (B) transmitting a message on the sub-6 GHz band which includes a discovery assistance response generated in response to receiving a discovery assistance request from any new node attempting to join the wireless network; and
         (C) switching to mmW band and transmitting or receiving messages according to information received in the discovery assistance request and discovery assistance response exchange to discover the any new node in a beamforming process.

2. The apparatus of claim 1, wherein said instructions as executed by the processor further comprises transmitting a discovery assistance request frame on the sub-6 GHz band when transmitting the message containing the assistance response over the sub-6 GHz band when the wireless communication circuit is operating as the new node.

3. The apparatus of claim 1, wherein said instructions as executed by the processor further comprises transmitting a discovery assistance response frame on the sub-6 GHz band when transmitting the message containing the assistance response over the sub-6 GHz band when the wireless communication circuit is operating as the network node.

4. The apparatus of claim 1, wherein said instructions as executed by the processor further comprises transmitting a probe request containing a discovery assistance request on the sub-6 GHz band when transmitting the message containing a discovery assistance request over the sub-6 GHz band when the wireless communication circuit is operating as the new node.

5. The apparatus of claim 1, wherein said instructions as executed by the processor further comprises transmitting a probe response containing a discovery assistance response on the sub-6 GHz band when transmitting a message containing a discovery assistance response over the sub-6 GHz band when the wireless communication circuit is operating as the network node.

6. The apparatus of claim 1, wherein said instructions as executed by the processor further comprises transmitting an association or reassociation request containing a discovery assistance request on the sub-6 GHz band when transmitting a message containing a discovery assistance request over the sub-6 GHz band when the wireless communication circuit is operating as the new node.

7. The apparatus of claim 1, wherein said instructions as executed by the processor further comprises transmitting an association or reassociation response containing a discovery assistance response on the sub-6 GHz band when transmitting a message containing a discovery assistance response over the sub-6 GHz band when the wireless communication circuit is operating as the network node.

8. The apparatus of claim 1, wherein said instructions as executed by the processor further comprises initiating an on-channel tunnel (OCT) request from a mmW MAC layer management entity (MLME) of the wireless communication circuit operating as the new node, through a sub-6 GHz MLME of the new node to the node on the wireless network, then sending the discovery assistance request through the on-channel tunnel (OCT).

9. The apparatus of claim 1, wherein said instructions as executed by the processor further comprises initiating an on-channel tunnel (OCT) request from a mmW MAC layer management entity (MLME) of the wireless communication circuit operating as the network node, through a sub-6 GHz MLME of the network node to the new node, then sending the discovery assistant response through the on-channel tunnel (OCT).

10. The apparatus of claim 1, wherein said instructions as executed by the processor further comprises broadcasting discovery assistance capabilities, or multi-band capabilities, or a combination of discovery assistance capabilities and multi-band capabilities, over the sub-6 GHz band, when the wireless communication circuit is operating as either the new node, or the network node.

11. The apparatus of claim 10, wherein said instructions as executed by the processor performs broadcasting discovery assistance capabilities, or multi-band capabilities, or a combination of discovery assistance capabilities and multi-band capabilities, over the sub-6 GHz band by incorporating information about discovery assistance capabilities, or multi-band capabilities, or a combination of discovery assistance capabilities and multi-band capabilities into a beacon or message being transmitted, when the wireless communication circuit is operating as either the new node or the network node.

12. The apparatus of claim 11, wherein said beacon or message being transmitted is selected from the group of beacons or messages consisting of Beacon frames, Probe Response, Announce frames, Information Response, Association response, Reassociation response or any frame broadcasted or unicasted to the new node to announce network and STA capabilities.

13. The apparatus of claim 11, wherein said instructions as executed by the processor further comprises triggering said transmitting a message containing a discovery assistance request over the sub-6 GHz band in response to receiving a beacon containing discovery assistance capabilities, or multi-band capabilities, or a combination of discovery assistance capabilities and multi-band capabilities when the wireless communication circuit is operating as the new node.

14. The apparatus of claim 1, wherein said instructions as executed by the processor further comprises the wireless communication circuit operating as the network node and transmitting beamforming frames in all directions or receiving beamforming frames and beamforming with a new node if it is within its mmW signal coverage area.

15. The apparatus of claim 1, wherein said instructions as executed by the processor further comprises the wireless communication circuit operating as the new node and transmitting beamforming frames in all directions or receiving beamforming frames and beamforming with a network node if it is within its mmW signal coverage area.

16. The apparatus of claim 1, wherein said instructions as executed by the processor further comprises coordinating with other network nodes which are potential neighbors in the wireless network and assisting any new nodes by mmW beamforming if that new node is within mmW coverage area, when the wireless communication circuit is operating as the network node.

17. A method of wireless communication in a network, comprising:
  (a) wirelessly communicating under the IEEE 802.11 between wireless nodes joined in a network by transmitting over a first communications band which is configured for directional transmission and reception;
  (b) wirelessly communicating with new nodes attempting to join the network utilizing communications over a second wireless communications band;
  (c) transmitting a message, from a new node attempting to join the wireless network, containing a discovery assistance request, and associated fields of information for aiding the discovery process, over said second wireless communications band for requesting discovery assistance on the first communications band by the new node attempting to join the wireless network;
  (d) receiving said discovery assistance request by a network node which has already joined the network, and responding by transmitting a discovery assistance response, and associated fields of information for aiding the discovery process, over the second communications band to the new node;
  (e) switching to using directional communications on said first communications band and generating directional transmissions according to information received in said associated fields of information from the discovery assistance request and response exchange to discover neighboring wireless communication stations in response to a beamforming process.

18. The method as recited in claim 17, wherein said first communications band comprises a directional millimeter-wave (mmW) band.

19. The method as recited in claim 17, wherein said second communications band is configured for non-directional communication in a sub-6 GHz band.

20. The method as recited in claim 17, wherein said discovery assistance request and said discovery assistance response are exchanged by: (a) utilizing a specific discovery assistance request frame and discovery assistance response frame containing the associated fields of information for aiding the discovery process; or (b) incorporating said discovery assistance request and said discovery assistance response, along with said associated fields of information for aiding the discovery process, in other beacons or messages communicated over said second communications band; or (c) communicating said discovery assistance request and said discovery assistance response in other beacons or messages which trigger the communications of another beacon or message containing said associated fields of information for aiding the discovery process; or (d) communicating said discovery assistance request and said discovery assistance response along with said associated fields of information for aiding the discovery process, over on-channel tunnel (OCT) established between a first communication band MAC layer management entities; or (e) combinations of the above.

\* \* \* \* \*